(12) United States Patent
Nelson et al.

(10) Patent No.: US 10,979,241 B2
(45) Date of Patent: Apr. 13, 2021

(54) ELECTRONIC FURNITURE SYSTEMS WITH INTEGRATED ARTIFICIAL INTELLIGENCE

(71) Applicant: THE LOVESAC COMPANY, Stamford, CT (US)

(72) Inventors: Shawn Nelson, St. George, UT (US); David Underwood, St. George, UT (US); Brian Kuchler, Stamford, CT (US)

(73) Assignee: The Lovesac Company, Stamford, CT (US)

(*) Notice: Subject to any disclaimer, the term of this patent is extended or adjusted under 35 U.S.C. 154(b) by 0 days.

(21) Appl. No.: 15/786,922

(22) Filed: Oct. 18, 2017

(65) Prior Publication Data
US 2018/0041354 A1 Feb. 8, 2018

Related U.S. Application Data

(63) Continuation-in-part of application No. 15/348,068, filed on Nov. 10, 2016, now Pat. No. 10,212,519, (Continued)

(51) Int. Cl.
*H04L 12/28* (2006.01)
*A47C 1/024* (2006.01)
(Continued)

(52) U.S. Cl.
CPC .......... *H04L 12/282* (2013.01); *A47C 1/0242* (2013.01); *A47C 7/72* (2013.01);
(Continued)

(58) Field of Classification Search
None
See application file for complete search history.

(56) References Cited

U.S. PATENT DOCUMENTS 988,059 A 3/1911 Allen
2,625,983 A * 1/1953 Slyter .................. A47C 3/027
297/263.2
(Continued)

FOREIGN PATENT DOCUMENTS

CN 203563950 U 10/1996
CN 101005741 7/2007
(Continued)

OTHER PUBLICATIONS 2009113319 with English abstract and International Search Report (47 pages), WO, dated May 15, 2014, Sakuji et al.
(Continued)

*Primary Examiner* — Jonathan C Kim

(57) ABSTRACT

An electronic furniture assembly of the present invention comprises: (i) a furniture assembly comprising: (A) a base (e.g., a seat portion), (B) at least one transverse member (e.g., a side, armrest or backrest), and (C) a coupler for selectively coupling the base to the transverse member; and (ii) artificial intelligence mounted within one or more portions of the furniture assembly. A speaker system can also be provided within the furniture assembly. The artificial intelligence (AI) can respond to and/or obey voice or other commands from a user. The AI can provide numerous functions, e.g., control of the speaker system within the furniture assembly, control of a recliner assembly that is part of the furniture system, or the like. The furniture assembly can include a selectively dockable speaker as part of a speaker system.

22 Claims, 25 Drawing Sheets

Related U.S. Application Data which is a continuation-in-part of application No. 15/270,339, filed on Sep. 20, 2016, now Pat. No. 10,236,643.

(60) Provisional application No. 62/417,091, filed on Nov. 3, 2016, provisional application No. 62/257,623, filed on Nov. 19, 2015.

(51) Int. Cl.
*G06F 3/16* (2006.01)
*H04R 1/02* (2006.01)
*H04R 5/02* (2006.01)
*A47C 7/72* (2006.01)

(52) U.S. Cl.
CPC .......... *G06F 3/167* (2013.01); *H04L 12/2829* (2013.01); *H04R 1/025* (2013.01); *H04R 5/023* (2013.01); *H04R 2201/028* (2013.01); *H04R 2420/07* (2013.01)

(56) References Cited

U.S. PATENT DOCUMENTS

| | | | |
|---|---|---|---|
| 2,653,648 A * | 9/1953 | Marshall | A47C 1/11 297/344.19 |
| 3,113,633 A * | 12/1963 | Eberhardt | H04R 5/02 181/145 |
| 3,870,297 A * | 3/1975 | Elder | A63B 22/0023 482/7 |
| 3,880,152 A | 4/1975 | Nohmura | |
| 3,893,731 A * | 7/1975 | Maggs | A47C 7/38 297/452.17 |
| 4,120,017 A | 10/1978 | Sickles | |
| 4,124,249 A * | 11/1978 | Abbeloos | A47C 21/003 297/217.4 |
| 4,321,717 A * | 3/1982 | Serra | A47C 17/16 5/26.1 |
| 4,507,816 A | 4/1985 | Smith, Jr. | |
| 4,734,946 A | 4/1988 | Saputo | |
| 4,846,525 A * | 7/1989 | Manning | A47C 1/14 297/180.15 |
| 5,106,153 A * | 4/1992 | Durling | A47C 7/68 297/135 |
| 5,362,296 A * | 11/1994 | Wang | A63B 21/04 482/121 |
| 5,367,727 A | 11/1994 | Dyer, Jr. | |
| 5,368,359 A * | 11/1994 | Eakin | A61H 23/0236 297/184.14 |
| 5,544,938 A * | 8/1996 | Saul | A47C 13/005 297/248 |
| 5,624,156 A * | 4/1997 | Leal | A47C 7/72 297/217.4 |
| 5,681,179 A * | 10/1997 | Lane | H01R 13/5812 439/393 |
| 5,683,139 A * | 11/1997 | Golynsky | A47C 3/026 16/386 |
| 5,735,573 A * | 4/1998 | Vredevoogd | A47C 1/0242 297/188.01 |
| 5,790,993 A * | 8/1998 | Roma | A47C 17/1756 5/37.1 |
| 5,828,766 A * | 10/1998 | Gallo | H04R 17/00 381/190 |
| 5,895,365 A * | 4/1999 | Tomlinson | A47C 20/027 297/149 |
| 5,967,820 A * | 10/1999 | Siegal | A47B 37/00 439/214 |
| 5,995,634 A * | 11/1999 | Zwolski | H04R 1/028 181/155 |
| 6,000,353 A * | 12/1999 | De Leu | B63B 34/50 114/61.1 |
| 6,000,758 A * | 12/1999 | Schaffner | A47C 1/0345 297/180.12 |
| 6,073,723 A * | 6/2000 | Gallo | H04R 1/288 181/146 |
| 6,092,867 A * | 7/2000 | Miller | A63F 13/98 297/188.14 |
| 6,322,146 B1* | 11/2001 | Fisher, Jr. | B60N 2/0232 297/362.11 |
| 6,814,709 B2* | 11/2004 | Schwartz | A47C 7/725 5/633 |
| 7,003,832 B2 | 2/2006 | Wilson | |
| 7,090,297 B2 | 8/2006 | Mohn et al. | |
| 7,172,196 B2* | 2/2007 | Randall | A63F 3/00643 273/237 |
| 7,213,885 B2* | 5/2007 | White, III | A47C 13/005 248/188 |
| D547,087 S | 7/2007 | Natuzzi | |
| 7,312,393 B2* | 12/2007 | McCarthy | A47B 21/06 174/480 |
| 7,419,220 B2 | 9/2008 | White et al. | |
| 7,421,608 B2* | 9/2008 | Schron | A61C 1/0007 601/1 |
| 7,547,073 B2 | 6/2009 | White et al. | |
| 7,553,288 B2 | 6/2009 | Cohen | |
| 7,575,279 B2 | 8/2009 | Robertson | |
| 7,631,937 B2 | 12/2009 | Robertson | |
| 7,699,389 B2 | 4/2010 | Robertson | |
| 7,735,912 B2 | 6/2010 | Robertson | |
| 7,766,421 B2 | 8/2010 | Lawson | |
| 7,871,280 B2* | 1/2011 | Henriott | A47B 21/06 108/50.02 |
| 7,918,308 B2 | 4/2011 | Cohen | |
| 7,963,612 B2 | 6/2011 | Nelson et al. | |
| 7,982,436 B2* | 7/2011 | Randall | G06F 1/1626 320/113 |
| 8,061,864 B2 | 11/2011 | Metcalf et al. | |
| 8,074,581 B2* | 12/2011 | Epstein | A47B 37/00 108/50.01 |
| 8,132,856 B2 | 3/2012 | Wilson et al. | |
| 8,146,229 B2 | 4/2012 | Henriott et al. | |
| 8,228,026 B2 | 7/2012 | Johnson et al. | |
| 8,421,407 B2 | 4/2013 | Johnson | |
| 8,668,045 B2 | 3/2014 | Cohen | |
| 8,783,778 B2 | 7/2014 | Nelson et al. | |
| 8,920,191 B2* | 12/2014 | Carpanzano | H01R 13/74 439/491 |
| 8,935,985 B2 | 1/2015 | Hjelm | |
| 9,010,851 B2 | 4/2015 | LaPointe | |
| 9,088,117 B2* | 7/2015 | Rosenblum | H01R 25/006 |
| 9,095,209 B2* | 8/2015 | Mirth | A47B 13/16 |
| 9,119,000 B2* | 8/2015 | Tracy | H04R 1/26 |
| 9,124,308 B2 | 9/2015 | Metcalf | |
| 9,185,988 B1* | 11/2015 | Sanchez | A47C 7/66 |
| 9,277,826 B2 | 3/2016 | Nelson et al. | |
| 9,529,431 B2* | 12/2016 | Bleacher | G06K 9/00832 |
| 9,585,468 B2* | 3/2017 | Udagawa | H02G 3/0487 |
| 9,788,092 B2* | 10/2017 | Rawls-Meehan | H04R 5/02 |
| 9,984,686 B1* | 5/2018 | Mutagi | G10L 15/22 |
| 10,123,621 B2 | 11/2018 | Nelson et al. | |
| 10,143,307 B2 | 12/2018 | Nelson et al. | |
| 10,212,519 B2 | 2/2019 | Nelson et al. | |
| 10,236,643 B2 | 3/2019 | Nelson et al. | |
| 2001/0020810 A1* | 9/2001 | Kennedy | A47B 21/00 312/223.3 |
| 2002/0063454 A1 | 5/2002 | Illulian | |
| 2003/0025366 A1 | 2/2003 | Barreiro, Jr. | |
| 2003/0102657 A1* | 6/2003 | Kuo | B62H 1/12 280/755 |
| 2003/0139693 A1* | 7/2003 | Swift | A61G 15/00 601/15 |
| 2004/0026998 A1* | 2/2004 | Henriott | A47B 21/06 307/9.1 |
| 2004/0061943 A1* | 4/2004 | Bosch | B60R 11/00 359/599 |
| 2004/0095000 A1 | 5/2004 | Durling | |
| 2005/0007067 A1 | 1/2005 | Baarman | |
| 2005/0008147 A1* | 1/2005 | Lee | H04M 1/05 379/431 |

(56) References Cited

U.S. PATENT DOCUMENTS

| | | | |
|---|---|---|---|
| 2005/0053252 A1* | 3/2005 | Cohen | A61H 23/0236 381/333 |
| 2005/0096098 A1* | 5/2005 | Woods | A61G 5/042 455/569.1 |
| 2005/0185801 A1* | 8/2005 | McCarty | H04N 5/64 381/87 |
| 2005/0264044 A1* | 12/2005 | Lee | A47C 7/407 297/85 R |
| 2006/0036201 A1* | 2/2006 | Cohen | A61H 23/0236 601/47 |
| 2006/0076813 A1* | 4/2006 | Mohn | A61G 5/14 297/330 |
| 2006/0238087 A1* | 10/2006 | Holt | A47B 21/00 312/321.5 |
| 2006/0279124 A1* | 12/2006 | White, III | A47C 13/005 297/440.14 |
| 2007/0001494 A1 | 1/2007 | Hoover | |
| 2007/0164178 A1* | 7/2007 | Beilstein | H01R 13/745 248/200 |
| 2008/0012404 A1* | 1/2008 | Dewert | A47C 1/0242 297/217.3 |
| 2008/0122241 A1* | 5/2008 | Blackmore | B60N 3/101 296/37.8 |
| 2008/0150329 A1* | 6/2008 | Lawson | A47C 1/0355 297/84 |
| 2008/0220646 A1* | 9/2008 | Leddusire | H01R 13/567 439/535 |
| 2008/0262657 A1* | 10/2008 | Howell | A47C 20/041 700/275 |
| 2009/0001775 A1* | 1/2009 | Smith | A47B 83/02 297/135 |
| 2009/0032660 A1* | 2/2009 | Wadsworth | H01R 13/74 248/231.9 |
| 2009/0072782 A1* | 3/2009 | Randall | G06F 1/1616 320/107 |
| 2009/0096255 A1* | 4/2009 | Robertson | A47C 1/0242 297/85 M |
| 2009/0212638 A1* | 8/2009 | Johnson | H02J 7/0044 307/104 |
| 2009/0212639 A1 | 8/2009 | Johnson | |
| 2009/0212737 A1* | 8/2009 | Johnson | A47B 96/02 320/108 |
| 2009/0250982 A1 | 10/2009 | Cohen | |
| 2010/0055928 A1 | 3/2010 | Randall | |
| 2010/0178797 A1* | 7/2010 | Byrne | H05K 5/03 439/540.1 |
| 2010/0290215 A1* | 11/2010 | Metcalf | A47B 21/00 362/127 |
| 2010/0320819 A1* | 12/2010 | Cohen | A61H 23/0236 297/217.4 |
| 2011/0012403 A1* | 1/2011 | Wilson | A47C 17/86 297/217.3 |
| 2011/0025915 A1 | 2/2011 | Daban | |
| 2011/0109211 A1* | 5/2011 | Kirkeby | A47B 81/00 312/223.6 |
| 2011/0110075 A1* | 5/2011 | Smith | A47B 67/04 362/127 |
| 2011/0298340 A1* | 12/2011 | Nelson | A47C 13/005 312/111 |
| 2012/0026724 A1 | 2/2012 | Metcalf et al. | |
| 2012/0051579 A1* | 3/2012 | Cohen | A61H 23/0236 381/388 |
| 2012/0200129 A1* | 8/2012 | Wilson, Jr. | A47C 7/72 297/217.3 |
| 2012/0286557 A1* | 11/2012 | Hoffman | A47C 1/0355 297/85 M |
| 2012/0316884 A1* | 12/2012 | Rozaieski | A61G 5/10 704/275 |
| 2013/0002001 A1 | 1/2013 | Allen et al. | |
| 2013/0066636 A1* | 3/2013 | Singhal | H04R 1/32 704/275 |
| 2013/0137524 A1* | 5/2013 | Scott | A63F 13/08 463/47 |
| 2013/0177198 A1 | 7/2013 | Hogue et al. | |
| 2013/0199421 A1* | 8/2013 | Hjelm | A47B 21/06 108/50.11 |
| 2013/0207478 A1* | 8/2013 | Metcalf | A47C 7/70 307/104 |
| 2013/0234481 A1 | 9/2013 | Johnson | |
| 2013/0249257 A1* | 9/2013 | Suhre | B60N 3/004 297/169 |
| 2013/0333940 A1* | 12/2013 | Stencil | H02G 3/18 174/503 |
| 2014/0010387 A1* | 1/2014 | Cohen | A61H 23/0236 381/151 |
| 2014/0197666 A1* | 7/2014 | Koch | A47C 7/506 297/217.3 |
| 2014/0285140 A1* | 9/2014 | Jung | H02J 7/0021 320/108 |
| 2014/0368476 A1* | 12/2014 | Rauch | H02J 1/00 345/204 |
| 2015/0061258 A1* | 3/2015 | Flores | A61G 5/10 280/304.1 |
| 2015/0069965 A1* | 3/2015 | Verschueren | H02J 50/10 320/108 |
| 2015/0076881 A1* | 3/2015 | LaPointe | A47C 1/032 297/316 |
| 2015/0076891 A1* | 3/2015 | LaPointe | A47C 31/008 297/85 M |
| 2015/0230622 A1 | 8/2015 | Orbelian | |
| 2015/0255914 A1* | 9/2015 | Kong | H01R 13/5227 439/108 |
| 2015/0300627 A1* | 10/2015 | Wang | F21V 33/0012 108/23 |
| 2015/0334482 A1 | 11/2015 | Rawls-Meehan et al. | |
| 2016/0136529 A1* | 5/2016 | Weston | A63G 31/007 472/117 |
| 2016/0174715 A1* | 6/2016 | Nelson | A47C 31/003 297/440.14 |
| 2016/0379631 A1* | 12/2016 | Wang | B60N 2/0232 704/275 |
| 2017/0143122 A1* | 5/2017 | Nelson | A47C 1/0352 |
| 2017/0149181 A1* | 5/2017 | Nelson | H01R 13/73 |
| 2017/0150264 A1* | 5/2017 | Nelson | A61H 23/0236 |
| 2017/0214197 A1* | 7/2017 | Suri | A47B 97/00 |
| 2017/0221340 A1 | 8/2017 | Rhoads, Jr. et al. | |
| 2017/0295941 A1* | 10/2017 | King | A47C 7/54 |
| 2018/0000244 A1* | 1/2018 | Nelson | A47C 1/0352 |
| 2018/0158192 A1 | 6/2018 | Rocque et al. | |
| 2019/0222935 A1 | 7/2019 | Nelson et al. | |
| 2020/0100030 A1 | 3/2020 | Nelson et al. | |
| 2020/0100031 A1 | 3/2020 | Nelson et al. | |
| 2020/0221227 A1 | 7/2020 | Nelson et al. | |

FOREIGN PATENT DOCUMENTS

| | | |
|---|---|---|
| CN | 201135239 | 10/2008 |
| CN | 201178847 Y | 1/2009 |
| CN | 201282826 | 8/2009 |
| CN | 203609079 U | 9/2009 |
| CN | 201518894 | 7/2010 |
| CN | 202211357 | 5/2012 |
| CN | 2236262 Y | 10/2012 |
| CN | 201341645 Y | 11/2012 |
| CN | 101909490 | 3/2013 |
| CN | 202817641 | 3/2013 |
| CN | 201452358 U | 4/2013 |
| CN | 202553058 U | 6/2013 |
| CN | 202907151 U | 4/2014 |
| CN | 202981088 U | 5/2014 |
| DE | 102012211865 A1 | 5/2013 |
| GB | 2300329 A | 10/1996 |
| JP | 47-004753 | 2/1972 |
| JP | 56-087863 | 12/1979 |
| JP | 59-067079 | 5/1984 |
| JP | S59-107523 | 7/1984 |
| JP | H6-79086 | 11/1994 |
| JP | 3047023 | 3/1998 |

(56) References Cited

FOREIGN PATENT DOCUMENTS

| | | | |
|---|---|---|---|
| JP | 2001-285976 | 10/2001 | |
| JP | 2004097273 A | 4/2004 | |
| JP | 2007-003994 | 1/2007 | |
| JP | 2008-513138 | 5/2008 | |
| JP | 2008-545504 | 12/2008 | |
| JP | 2013-094405 | 5/2013 | |
| JP | 2014-230026 | 12/2014 | |
| JP | 2015-126460 | 7/2015 | |
| WO | WO 2006/135509 | 12/2006 | |
| WO | WO-2009113319 A1 * | 9/2009 | ............ A47C 7/72 |
| WO | 2012093398 | 10/2012 | |
| WO | 2017087266 | 4/2013 | |
| WO | 2017087268 | 6/2013 | |
| WO | 2012093398 | 5/2017 | |

OTHER PUBLICATIONS 2014072975 and International Search Report (57 pages), WO, dated Nov. 28, 2012, Ozana et al.

Curry, M. "Its Speakers Sound Good Even in Terrible Listening Environments, i.e. Your Apartment;" Core77; Article [online]. Sep. 29, 2015 [retrieved Jan. 30, 2017]. Retrieved from the Internet: <URL: http://www.core77.com/posts/41080/Sonos-Debuts-Software-That-Makes-Its-Speakers-Sound-Good-Even-in-Terrible-Listening-Environments-ie-Your-Apartment; p. 2, paragraph 2 to p. 4, paragraph 1.

Invitation to Pay Additional Fees and, Where Applicable, Protest Fee, from International Application No. PCT/US16/61491, dated Jan. 24, 2017.

Notification of Transmittal of the International Search Report and the Written Opinion of the International Searching Authority, or the Declaration, from International Application No. PCT/US16/61085, dated Jan. 31, 2017, 11 pages.

Notification of Transmittal of the International Search Report and the Written Opinion of the International Searching Authority, or the Declaration for PCT/US2016/061491, dated Apr. 3, 2017 with Search History (25 pages).

Notification of Transmittal of the International Search Report and the Written Opinion of the International Searching Authority, or the Declaration for PCT/2016/061508, dated Apr. 19, 2017 with Search History (12 pages).

Office Action from U.S. Appl. No. 13/869,600, dated Dec. 15, 2015 (9 pages).

The Wall Street Journal newspaper article entitled, "Wireless Charging Everywhere," dated Dec. 30, 2015.

U.S. Appl. No. 60/778,761, entitled Power Delivery Surface Power Supply Safety, dated Mar. 3, 2006 (59 pages).

U.S. Appl. No. 15/270,339, Jun. 22, 2017, Office Action.

U.S. Appl. No. 15/348,068, Nov. 1, 2017, Office Action.

U.S. Appl. No. 15/348,068, Oct. 2, 2018, Office Action.

Office Action issued in U.S. Appl. No. 15/270,339 dated Aug. 6, 2018.

Notification of Transmittal of the International Search Report and the Written Opinion of the International Searching Authority, or the Declaration from PCT/US16/61508, dated Apr. 19, 2017 (12 pages).

Notification of Transmittal of the International Search Report and the Written Opinion of the International Searching Authority, or the Declaration, from PCT/US16/61491 dated Apr. 3, 2017 (25 pages).

9963786 (with International Search Report) 33 pages, WO, dated Dec. 9, 1999, Gallo.

2017087224 (with International Search Report) 36 pages, WO, May 25, 2017, Nelson et al.

U.S. Appl. No. 15/270,339, Mar. 12, 2018, Final Office Action.

U.S. Appl. No. 15/348,068, Apr. 2, 2018, Final Office Action.

"WISA Wireless Speaker & Audio," retrieved on Nov. 7, 2016 at www.wisaassociation.org, 3 pages.

"The Wireless Speaker and Audio (WISA®) Association," retrieved Nov. 7, 2016 at www.wisaassocation.org, 2 pages.

Leviton, "Product Bulletin for Recessed Devices Cat. Nos. 689 and 690," Copyright 2008, published and available, on information and belief, at least as early as 2008 (2 pages).

Leviton, "2-Gang White Duplex Outlet/Quick Port Plate Recessed Device," retrieved Nov. 17, 2017 at homedepot.com, (2 pages).

U.S. Appl. No. 15/348,068, Dec. 12, 2018, Notice of Allowance.

U.S. Appl. No. 15/270,339, Jan. 24, 2019, Notice of Allowance.

U.S. Appl. No. 15/270,339, Feb. 27, 2019, Issue Notification.

U.S. Appl. No. 15/348,068, Jan. 30, 2019, Issue Notification.

Office Action dated Jun. 16, 2020 from U.S. Appl. No. 16/276,773, filed Feb. 12, 2019.

Amendment and Response to Office Action for U.S. Appl. No. 16/273,773 dated May 11, 2020.

U.S. Appl. No. 16/273,773, dated Feb. 12, 2020, Final Office Action.

Restriction Requirement dated Aug. 2, 2017 from U.S. Appl. No. 15/348,068, filed Nov. 10, 2016.

Notice of Allowance dated Aug. 27, 2020 from U.S. Appl. No. 16/696,712, filed Nov. 26, 2019.

U.S. Appl. No. 16/696,712, dated Dec. 30, 2020, Notice of Allowance.

U.S. Appl. No. 16/696,696, filed Jan. 14, 2021, Office Action.

Bose Corporation, Wikipedia, http://en.wikipedia.org/wiki/Bose_Corporation, Apr. 25, 2012.

U.S. Appl. No. 16/389,916, filed Jan. 28, 2021, Office Action.

U.S. Appl. No. 13/869,600, filed Sep. 14, 2016, Final Office Action.

U.S. Appl. No. 16/273,773, filed Oct. 25, 2019, Final Office Action.

U.S. Appl. No. 16/273,773, filed Jun. 16, 2020, Office Action.

U.S. Appl. No. 16/273,773, filed Oct. 13, 2020, Final Office Action.

* cited by examiner

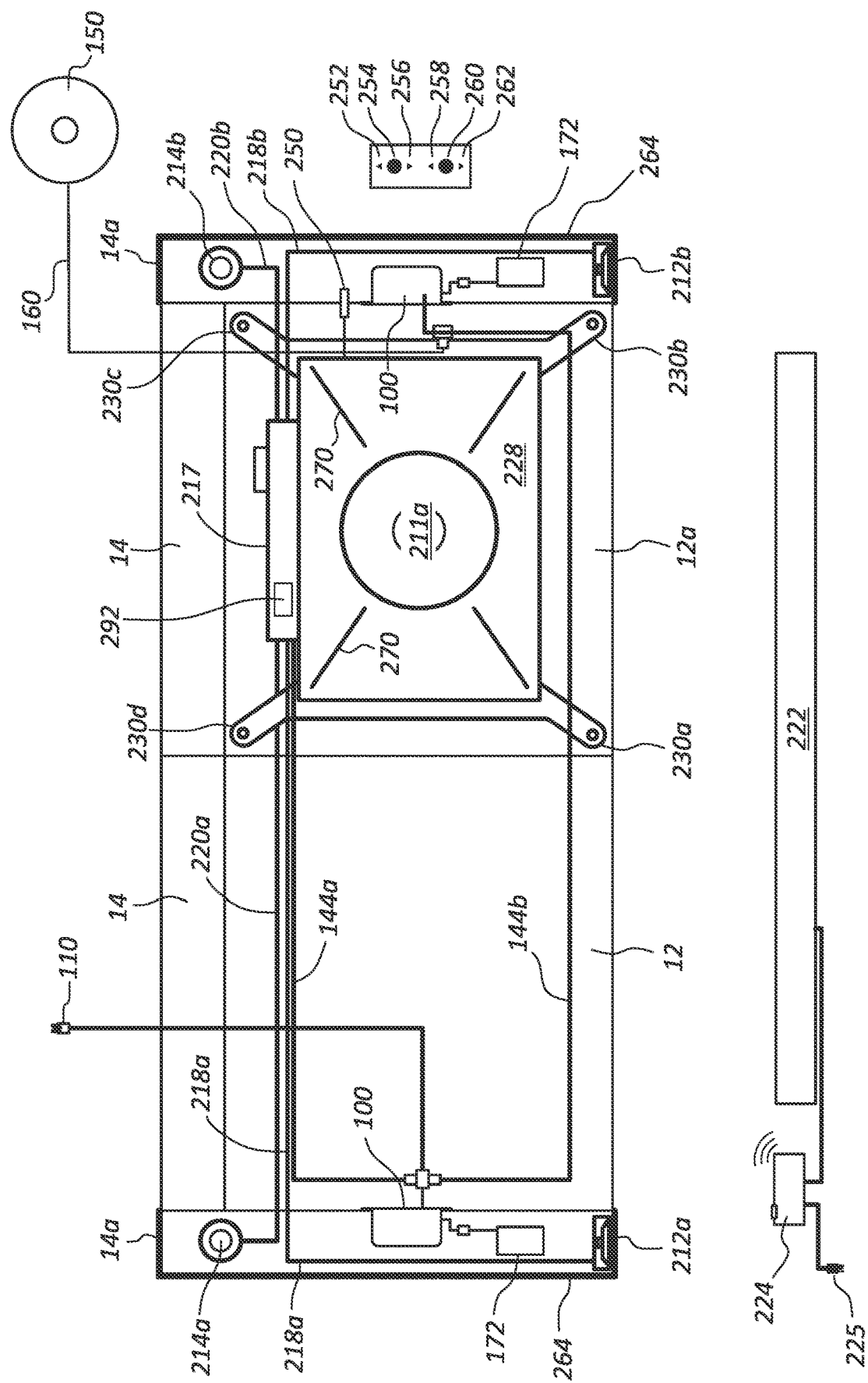

ELECTRONIC FURNITURE SYSTEMS WITH INTEGRATED ARTIFICIAL INTELLIGENCE

CROSS-REFERENCE TO RELATED APPLICATIONS

This application is a continuation-in-part of U.S. patent application Ser. No. 15/348,068, filed on Nov. 10, 2016, which is a continuation-in-part of U.S. patent application Ser. No. 15/270,339, filed on Sep. 20, 2016, entitled ELECTRICAL HUB FOR FURNITURE ASSEMBLIES, which claims priority to and the benefit of U.S. Provisional Patent Application Ser. No. 62/257,623, filed on Nov. 19, 2015, entitled FURNITURE WITH ELECTRONIC ASSEMBLIES, each of which are incorporated herein in their entireties by reference.

U.S. patent application Ser. No. 15/348,068 also claims priority to and the benefit of U.S. Provisional Patent Application Ser. No. 62/417,091, filed on Nov. 3, 2016, entitled ELECTRONIC FURNITURE SYSTEMS WITH INTEGRATED INTERNAL SPEAKERS, which is incorporated herein in its entirety by reference.

THE FIELD OF THE INVENTION

This Invention is in the field of furniture with built-in electronic assembly (e.g., speaker) systems.

THE RELEVANT TECHNOLOGY

Speaker systems are widely used for home, business, social activities, entertainment and for practical, commercial, and household uses. Unfortunately, speaker systems take up a great deal of space in a home, office, or business environment, and even if small, they are often unsightly. Moreover, wiring and cabling associated with such systems is also unsightly and cumbersome.

Furniture also tends to take up a great deal of space in a home, office or business environment. When sitting on furniture, it is often desirable to listen to music, watch TV, or watch a movie in a home theater environment, or employ one or more electronic components. Improved furniture is needed with improved electronic assembly systems that can be used in association with modern furniture assemblies or devices.

BRIEF SUMMARY OF THE INVENTION

The present invention relates to space-saving furniture systems with associated electrical assembly systems, including integrated, embedded internal speaker systems, internal electrical power sources, electrical devices, and other electrical components associated with furniture that can be conveniently used by individuals while sitting on the furniture.

The audio-enhanced furniture system conveniently provides furniture for comfortably sitting, as well as integrated internal speakers for convenient, space saving high-fidelity listening, and a power source for providing electrical power to the speakers and other electrically powered objects, e.g., phones, computers, lighting systems, and recharging systems for recharging such devices as a user is comfortably sitting on the furniture.

One electronic furniture system of the present invention comprises: (i) a furniture assembly comprising: (A) a base (e.g., a seat portion), (B) at least one transverse member (e.g., an armrest or backrest), and (C) a coupler for coupling the base to the transverse member; (ii) an electrical hub configured to selectively reside within the furniture assembly; and (iii) a speaker system mounted within one or more portions of the furniture assembly. The electrical hub acts as a source of electrical power for the speaker system and may be selectively positioned, for example, within a cavity in a transverse member of the furniture assembly.

In one embodiment, the speaker system includes one or more speakers mounted to a frame of the transverse member and one or more speakers mounted to a frame of the base member. Embedding the speakers within the base and transverse members saves vast amounts of space within a room while also hiding the speakers, using the same footprint of space for the combined furniture and speaker systems.

A subwoofer speaker can be mounted within the base of a furniture assembly, while transverse members coupled to the base on opposing sides of the base acting as armrests include one or more speakers each (e.g., two speakers each) embedded therein. The combined base, transverse members, and associated internal speakers form a high-fidelity surround sound experience for a user. This enables a user to use furniture and speakers in the same footprint, saving valuable space for other objects in a room while simultaneously providing a high fidelity listening experience.

The subwoofer may include an amplifier assembly comprising one or more amplifiers, an audio receiver and/or a controller for amplifying and controlling the outputs of the speakers in the transverse members and/or base.

In one embodiment, the electrical hub, which provides electrical power to the speakers, comprises: (a) an electrical outlet assembly having a housing; (b) a securement panel linked to and offset from the electrical outlet assembly such that at least one outlet of the electrical outlet assembly is spaced away from the securement panel; and (c) an installation clip mounted to the electrical outlet assembly. The offset securement panel of the electrical hub forms a protective area within which to connect one more electrical cords (e.g. electrical cords of the speakers, amplifiers, audio receiver, controller or other objects, e.g., phones, etc.) to the outlet assembly. The installation clip can be selectively moved to mount the electrical hub within a cavity of a transverse member of the furniture assembly.

An example of a furniture system of the present invention comprises: (A) a base; (B) a transverse member; and (C) a speaker system comprising at least one speaker positioned within one of the base and the transverse member. A coupler selectively couples the base to the transverse member. The speaker system comprises one or more speakers mounted within at least one of: (i) the base; or (ii) the transverse member of the furniture assembly, the speaker system comprising at least one speaker mounted within the furniture assembly. Embedding the speakers in the modular or assemble-able furniture assembly serves to hide the speakers and associated wiring and cabling from view, and provides high quality sound without using any additional space beyond that already occupied by the footprint of the furniture assembly.

In order to provide power to the speaker system, the electrical hub is configured to be coupled to at least one of: (i) the transverse member; or (ii) the base. The hub may be selectively mounted within a cavity of the transverse member, for example. The hub may be selectively mounted adjacent the coupler within the transverse member. Other components may be connected to the hub in order to receive electrical power, such as cell phone, computers, lamps and/or an induction charger mounted within the furniture assembly for recharging other electrical devices, for example.

The audio enhanced furniture system of the present invention thus conveniently provides furniture for comfortably sitting, as well as speakers for convenient listening and a power source for providing electrical power to the speakers and other electrically powered objects, e.g., phones, computers, lighting systems, and recharging systems for recharging such devices.

A major advantage of the present invention is that the speaker systems and electronic assembly systems employed in the present invention are concealed from the view of the typical user and potential consumer, avoiding some of the unsightly and cluttered images of speakers and electronics that fill many of the spaces in modern homes and businesses.

Furniture cavities, provided within the base member and the transverse member, may enhance the sound of the speakers mounted therein. Thus, the user may experience a quality sound and musical experience using the base and transverse members of the present invention. The speakers are tuned in order to compensate for the sound being emitted through the fabric which covers the speakers embedded within the bases and/or transverse members.

One major benefit of the present invention is the concealment of the speakers within the bases and transverse members of the present invention. This enables significant space saving and aesthetics within a home, business, office or other location by using the space that speakers would normally take up for furniture. The sofa of the present invention thus provides extensive space efficiencies. Speakers can be concealed behind home decorative fabric. Such fabrics may not be acoustically transparent. Given frequencies emitted by the speakers are tuned in order to compensate for the fact that the emitted sound extends through the interface of the fabric, optimizing the sound as it extends through the fabric layer.

The speaker system of the present invention can be used in a couch, in a chair, in sectional systems, and in sectional systems having a variety of different components, such as recliners, seats, foot rests and a vast variety of configurations.

An embodiment can include artificial intelligence (e.g., such as SIRI, ALEXA, or the like) positioned within the modular furniture. For example, such artificial intelligence could be positioned within the hub, elsewhere within the transverse member, within the base member (e.g., within an amplifier or speaker enclosure of the base member), or within a transmitter apart from the furniture assembly, e.g., positioned at or near a TV.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 15A-15C show examples of wiring diagrams for the sofa of FIG. 14.

DETAILED DESCRIPTION OF THE PREFERRED EMBODIMENTS

Figure 1A:
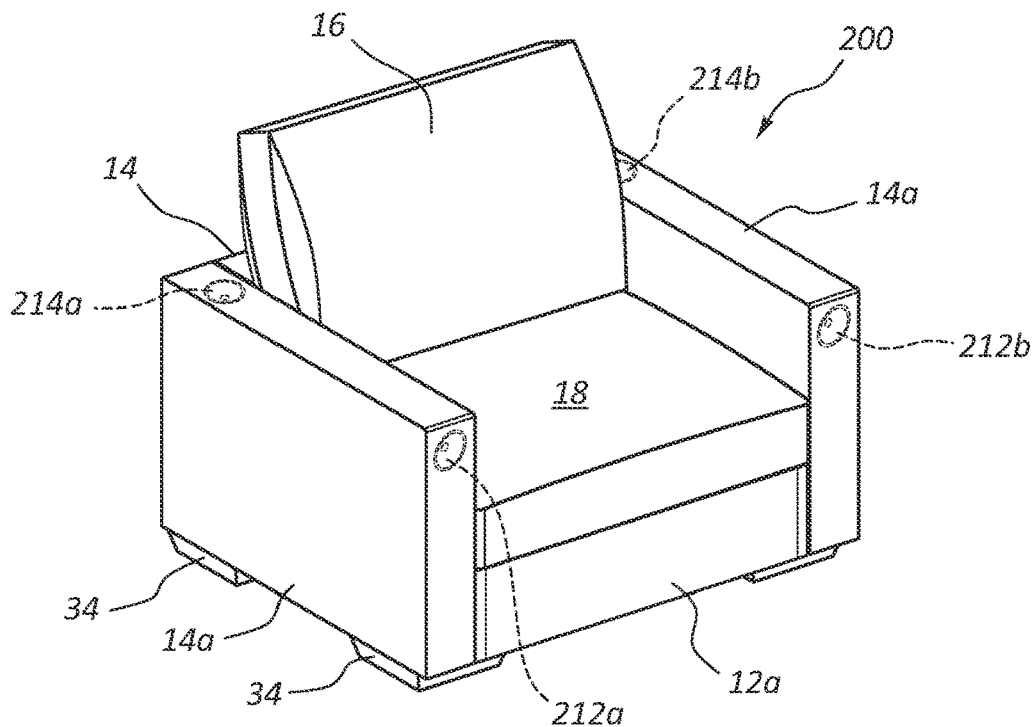
FIG. 1A is a perspective view of a modular furniture assembly in the form of a surround sound chair of the present invention having audio speakers in the transverse members thereof to form a surround sound speaker system, the position and orientation of the speakers reflected in phantom lines in the transverse members.
Figure 1B:
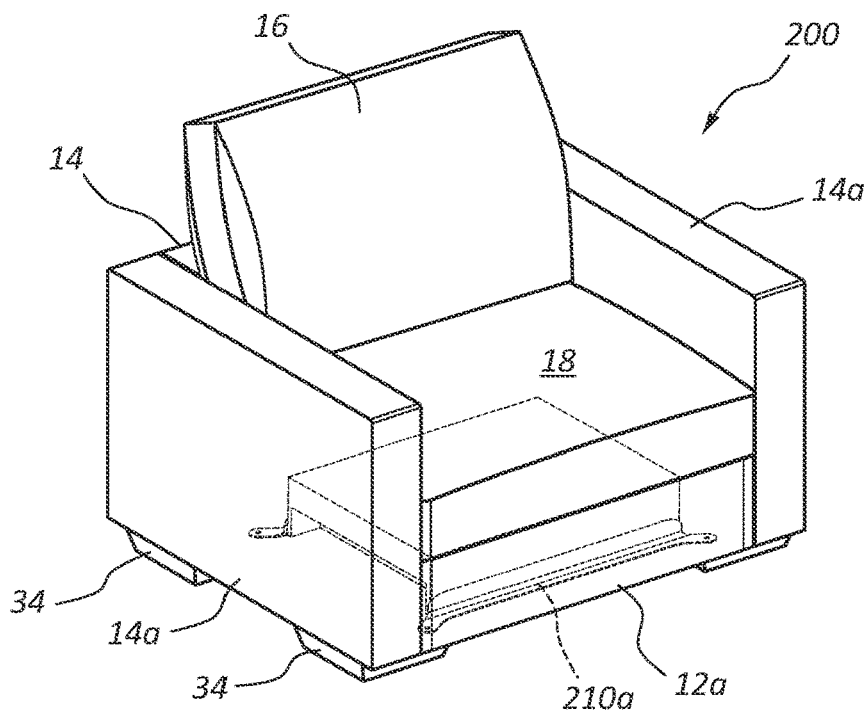
FIG. 1B is a perspective view of the modular furniture assembly of FIG. 1A in the form of the chair, wherein the surround sound chair also has a subwoofer speaker in the base thereof, the subwoofer speaker shown in phantom lines in the base.
Figure 2:
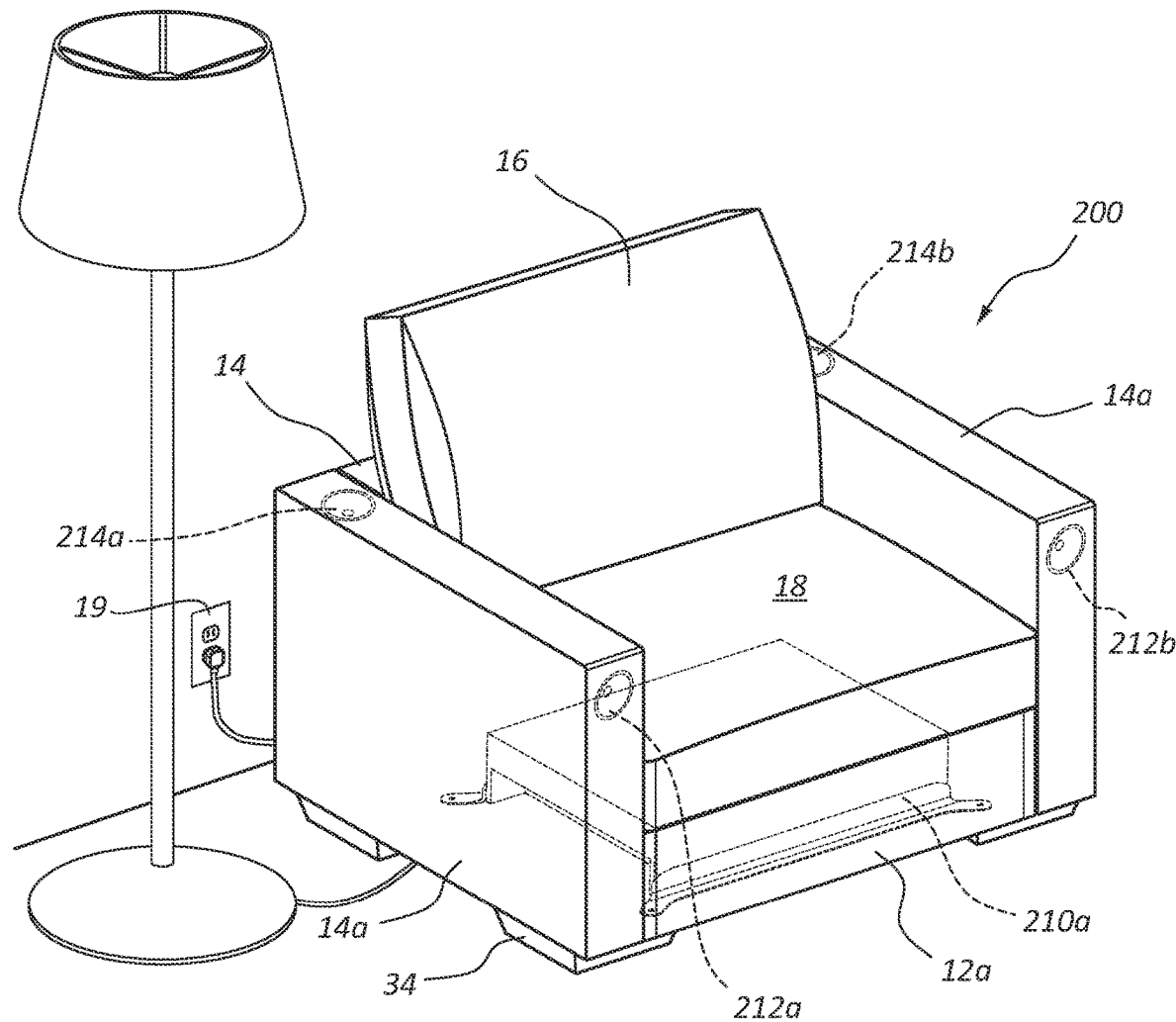
FIG. 2 shows an embodiment of the surround sound chair of FIGS. 1A-B with an adjacent lamp that is electrically coupled to the hub of the chair.
Figure 3:
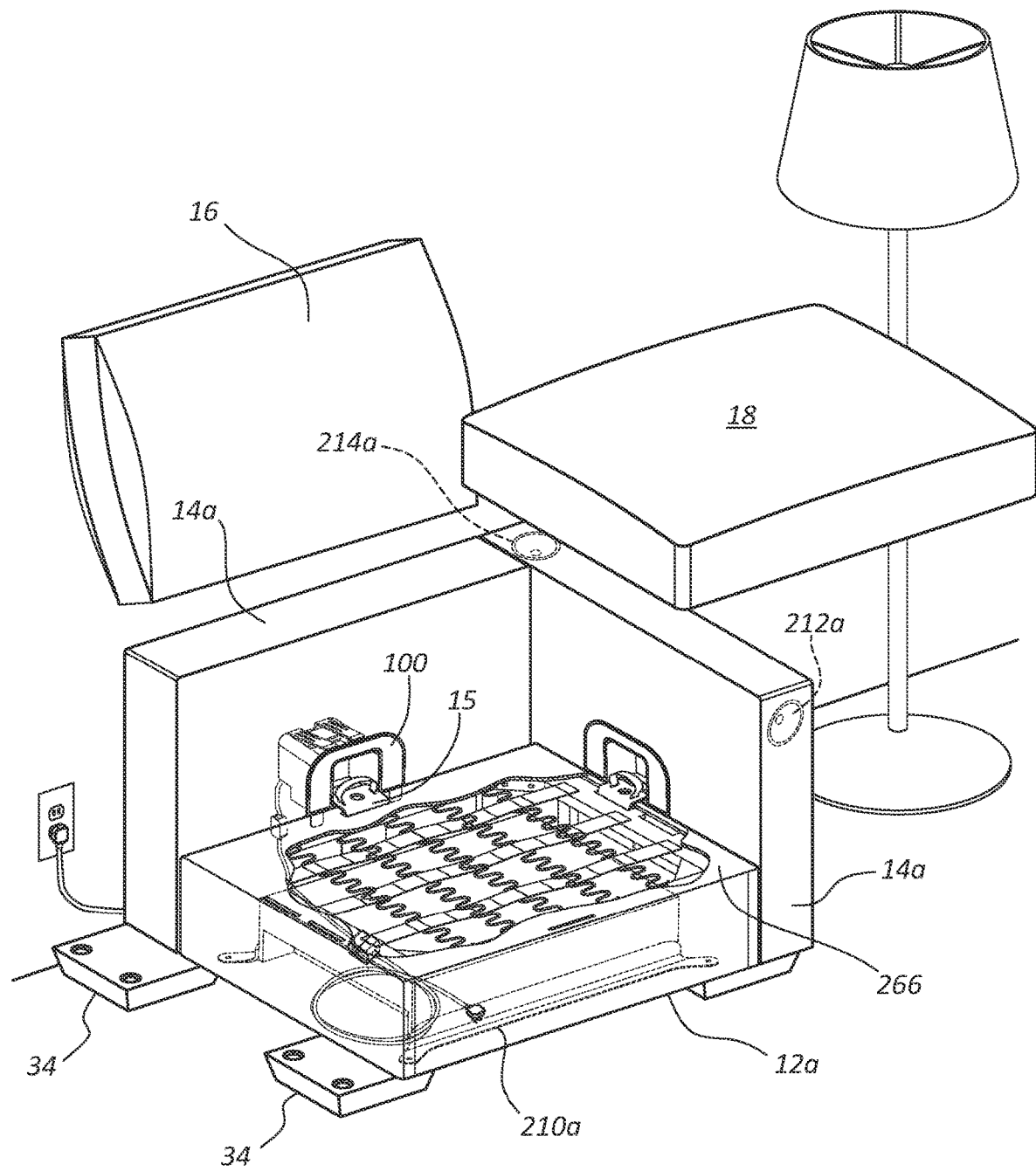
FIG. 3 is a chair having a surround sound speaker system as in FIGS. 1A-B, the cushions exploded therefrom and a cutaway view of the base shown.

FIGS. 1-3: Modular Furniture System w/Surround-Sound Speakers

FIG. 1A is a perspective view of a modular furniture assembly in the form of a chair of the present invention having audio speakers embedded in the transverse members thereof to form a surround sound speaker system, the speakers reflected in phantom lines in the transverse members.

FIG. 1B is a perspective view of the modular furniture assembly of FIG. 1A in the form of the chair, wherein the chair also has a subwoofer speaker in the base thereof, the subwoofer speaker shown in phantom lines in the base.

As shown in FIGS. 1A and 1B, the present invention relates to an audio-enhanced, modular furniture system 200 comprising a speaker-containing base member 12a selectively coupled to speaker-containing transverse members 14a and a non-speaker containing transverse member 14. The speaker-containing base member 12a and speaker-containing transverse members 14a and transverse member 14 are connected to each other as shown in FIGS. 1A and 1B.

Audio-enhanced, modular furniture system 200 advantageously includes one or more speakers positioned therein and as shown in FIGS. 1A-B, has a set of speakers in each armrest transverse member 14a and a subwoofer 210 in base 12a.

In the embodiment of FIGS. 1A-1B, furniture system 200 comprises an integrated internal subwoofer 210a and four integrated, internal non-subwoofer speakers 212a-b, 214a-b. The non-subwoofer speakers 212a-b, 214a-b, as shown in FIG. 1A, include two front speakers 212a-b and two surround, rear speakers 214a-b which are oriented upwardly in the embodiment of FIG. 1A. The subwoofer 210a may handle low frequency sounds (e.g., from about 20 Hz up to about 120 Hz, up to about 100 Hz, or up to about 80 Hz), while the front and rear speakers 212a-b, 214a-b may handle higher frequencies (e.g., from a cut-off frequency of the subwoofer up to about 20 kHz). Any of the speakers may include cone drivers, dome drivers, ribbon drivers, horn drivers, any other driver configuration, or a combination of drivers.

As illustrated in FIGS. 1A and 1B, the footprint of system 200 having speakers 210a-214b therein, has the same mathematical specifications as the footprint of a modular furniture assembly not having speakers therein. Thus, the addition of speakers within system 200 does not add any additional space requirements to a home or office. In addition, wiring and/or cabling typically associated with speakers is also hidden within the furniture assembly itself, presenting a very clean, aesthetically desirable appearance, while at the same time providing high quality stereo, surround, or other sound playback.

Instead, the use of the speakers mounted within the furniture system 200 efficiently uses furniture and provides a high-quality, high-fidelity listening experience to the user. The speakers are hidden within certain discrete portions of the transverse members 14a and within the base 12a, thereby enabling efficient use of space.

In the illustrated embodiment of FIGS. 1A-1B, speakers 212a and 212b are shown mounted in a front facing surface of transverse members 14a. As discussed in further detail herein, in one embodiment, such front-facing placement of speakers 212a and 212b works in conjunction with a front wall, flat screen television or other surface which aids in reflection of the front directed sound from front-facing speakers 212a and 212b, the sound being reflected back to the user seated on furniture assembly 200, the reflected sound potentially having the advantages of reflected sound, which may, in some embodiments, include improved sound quality. For example, sound reflected back to the seated user may mimic sound coming from front speakers actually positioned in front of the seated user.

The subwoofer assembly within base 12a is hidden inside the frame of base 12a and is therefore underneath the seat cushion 18.

FIG. 2 shows an embodiment of the surround sound chair of the furniture system 200 of FIGS. 1A-B with an adjacent lamp that is electrically coupled to an integral electrical hub mounted internally within the chair. Details of the internal electrical hub 100 will be discussed further with respect to FIGS. 5-7.

FIG. 3 is a furniture system 200 in the form of a chair having a surround sound speaker system as in FIGS. 1A-B, the cushions exploded therefrom and a cutaway view of the base 12a shown.

FIG. 3 shows an exploded view of the surround sound chair of the furniture system 200 of FIGS. 1A-B and FIG. 2, showing use of: (1) selectively mounting couplers 15 which couple transverse members 14, 14a to base 12a; (2) integral electrical hubs 100 mounted internally within the furniture system 200 to provide a source of electrical power; as well as (3) details of base 12a, including cushioning assemblies and integral, internal speaker assemblies of base 12a.

Figure 4A:
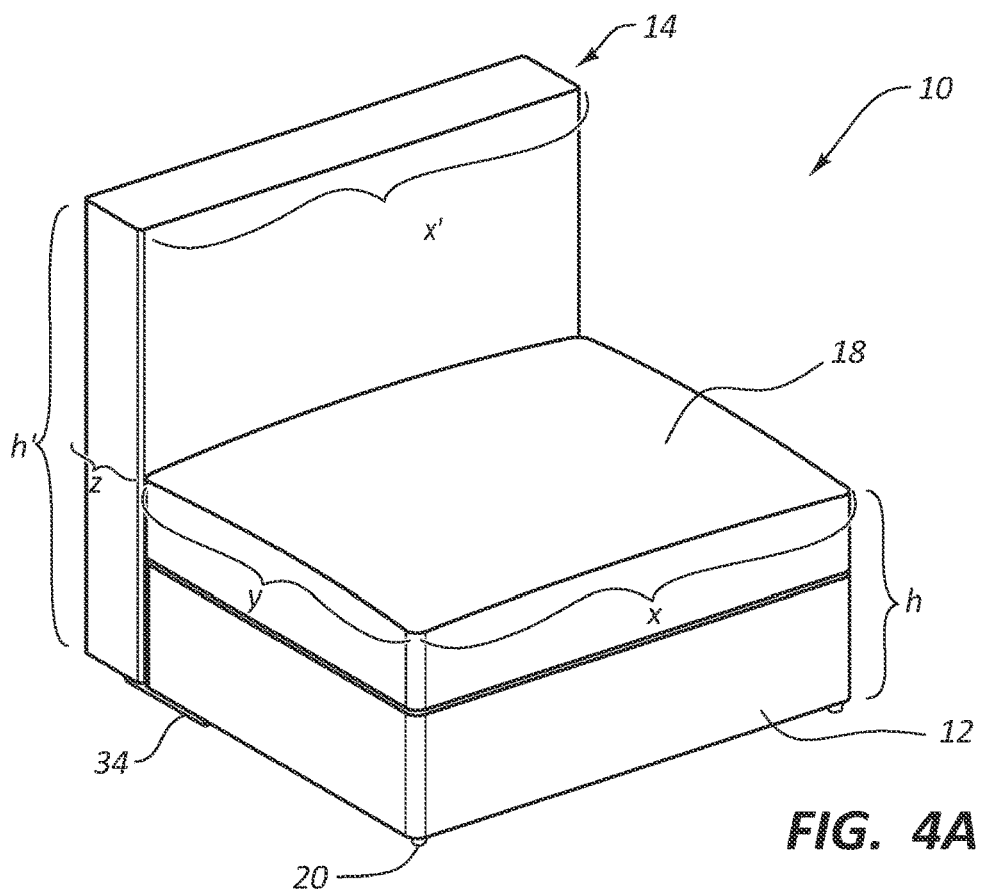
FIGS. 4A-4B illustrate a modular furniture assembly of the present invention.
Figure 4B:
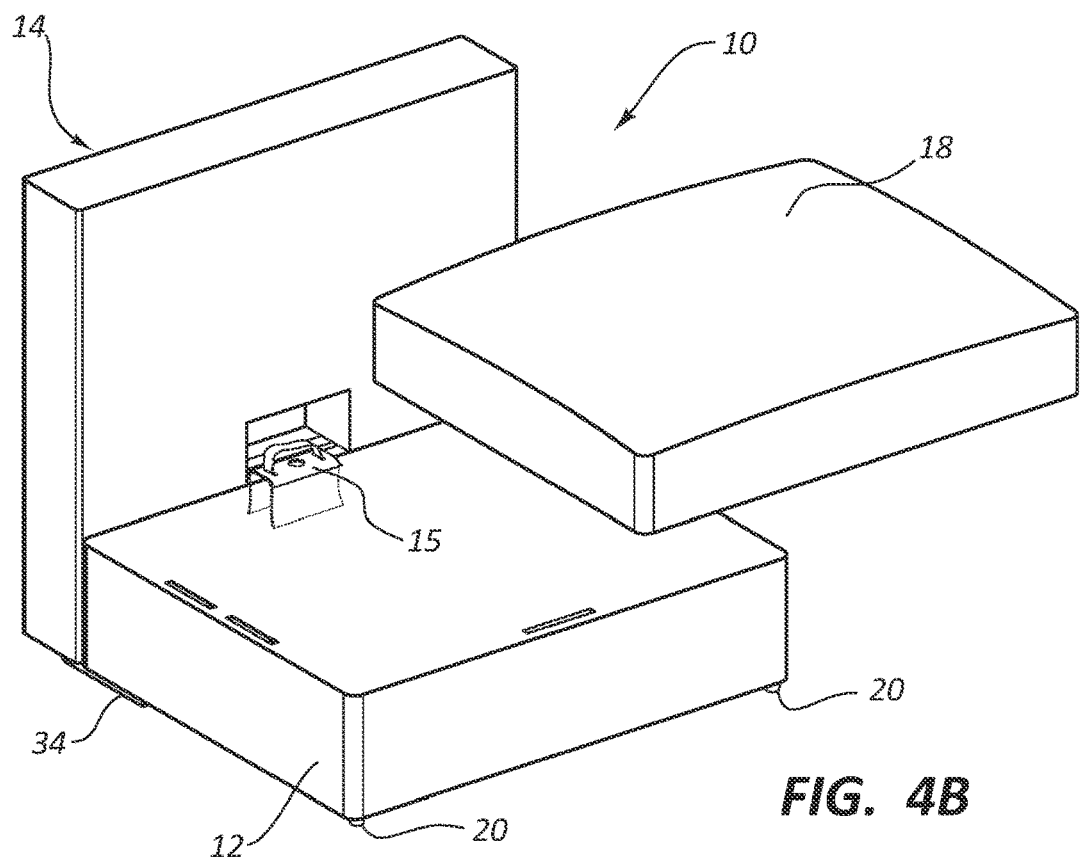

Audio-enhanced modular furniture system 200 has bases 12a and transverse members 14a that are similar to base 12 and transverse member 13 of FIGS. 4A-B. Base 12a connects to transverse member 14a and 14 in the same or similar manner to that of base 12 and transverse member 14 shown in FIGS. 4A-B, which will now be discussed.

FIGS. 4-7: Coupling and Electrical Power

Figure 5:
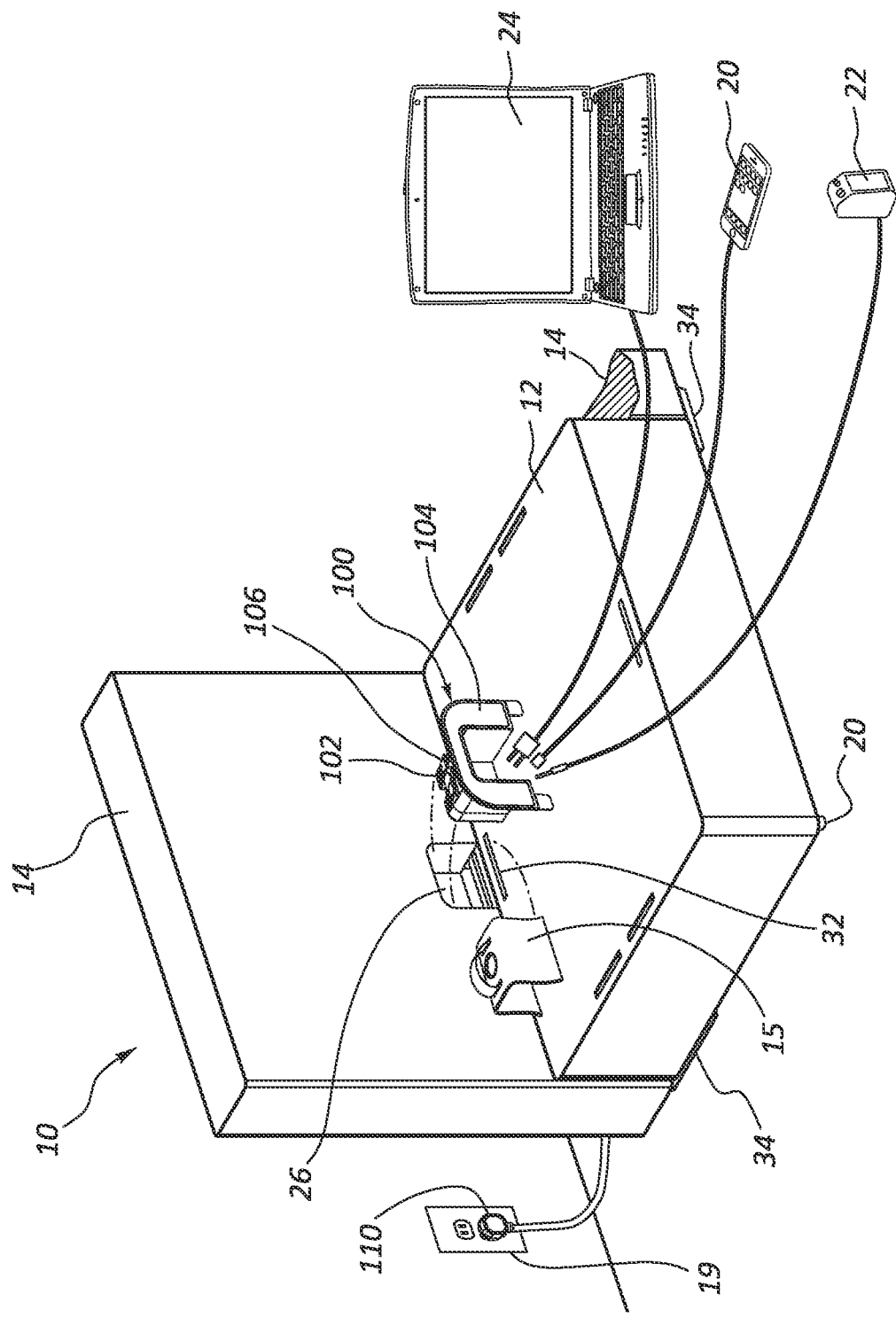
FIG. 5 illustrate the modular furniture assembly of FIGS. 2A-2B in an exploded view with the addition of certain electronic assemblies which connect to an electrical hub configured to be mounted within the modular furniture assembly.
Figure 6:
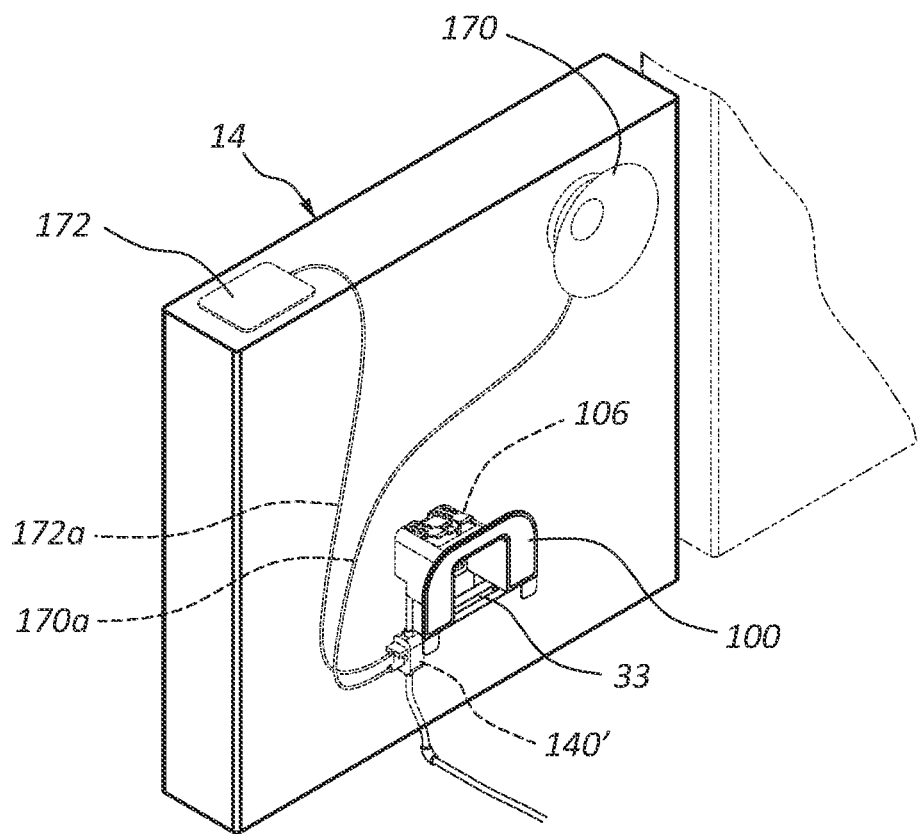
FIG. 6 is a perspective view of a transverse member of the present invention, including phantom views of certain electronic components internally mounted and connected to a hub of the present invention. An adjacent transverse member is also depicted.
Figure 7:
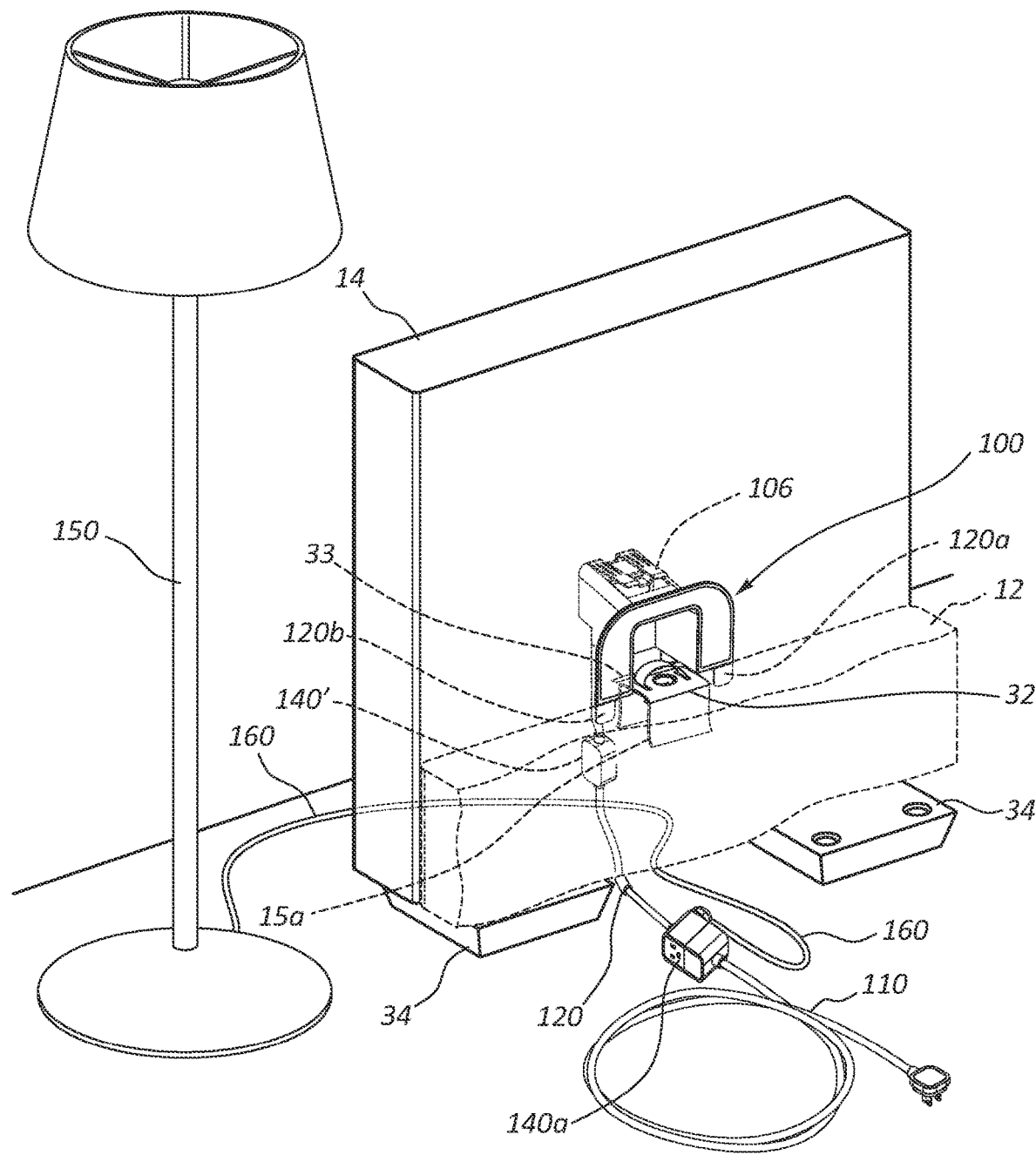
FIG. 7 is a perspective view of a transverse member and a hub mounted within the transverse member, including a lamp electrically coupled to the hub.

Additional details of each of the components reflected in FIG. 3 will be discussed in additional detail with reference to FIGS. 4A-4B, 5-7, and 8A-8H. For example, FIGS. 4A-4B shows additional details relating to the use of couplers 15 and the coupling of a base 12 to a transverse member 14. FIG. 5 shows further details relating to couplers 15, as well as details relating to electrical hub 100, which acts as a source of electrical power for the speakers and other electrically powered devices, such as phones, computers, lamps, recharging systems, and other electrical devices that can be conveniently used by a user sitting on the modular furniture assembly depicted in FIG. 5. FIG. 6 shows the coupling of electrical hub 100 within a transverse member 14, as well as the advantageous use of electrical hub 100 to power a speaker 170 and an induction charger 172 that can be used to wirelessly charge electrical devices, e.g., phones, etc., placed on or within a transverse member 14, e.g., when transverse member 14 is being used as an armrest. FIG. 7 shows the use of hub 100 to power a lamp. FIGS. 8A-8H demonstrate an embodiment of a speaker system coupled within base 12a. FIGS. 9A-12 demonstrate embodiments of speaker systems within transverse members 14a.

The coupling together of components of the modular furniture assembly of the present invention and the electrical power system within the modular furniture assembly will now be discussed with detailed reference to FIGS. 4A-7. The principles of coupling using coupler 15 and the use of hub 100 to provide electrical power can be employed in conjunction with speaker-containing bases 12*a* and transverse members 14*a* and/or in conjunction with non-speaker containing bases and transverse members.

FIGS. 4A-4B: Modular Furniture Configuration and Coupling

FIGS. 4A-4B illustrate a modular furniture assembly 10 of the present invention. Modular furniture assembly 10 of FIGS. 4A-B illustrates the configuration of base 12 and transverse member 14 and the coupling of base 12 and transverse member 14 to each other. Once base 12 is placed adjacent transverse member 14, coupler 15 selectively couples base 12 to transverse member 14. Coupler 15 can also be used to couple speaker-containing base 12*a* to speaker-containing transverse member 14.

In one embodiment, neither base 12 nor transverse member 14 of FIGS. 4A-4B have a speaker, electrical hub, or other electrical component therein, whereas, in another embodiment, base 12 and transverse member 14 of FIGS. 4A-4B each may have one or more speakers, an electrical hub, or other electrical component therein. FIGS. 4A-4B are shown in order to illustrate the use of coupler 15 to couple a non-speaker-containing base/transverse member combination or a speaker-containing base/transverse member combination.

As shown in FIGS. 4A-4B, each of the modular furniture assemblies 10 have a seat cushion 18 on base 12 thereon for sitting on by a user. In addition, foot couplers 34 are shown for coupling the bottom portions of transverse members 14 and bases 12 to each other.

Further discussion and disclosure relating to the modular furniture assemblies 10 and their connection to each other and to the transverse members 14 are shown and discussed in the following patents and patent applications, each of which are incorporated herein by reference: (i) U.S. patent application Ser. No. 14/332,705, filed Jul. 16, 2014, entitled MOUNTING PLATFORM FOR MODULAR FURNITURE ASSEMBLY, (ii) U.S. Pat. No. 8,783,778, entitled MOUNTING PLATFORM FOR MODULAR FURNITURE ASSEMBLY, (iii) U.S. Pat. No. 7,963,612 entitled MODULAR FURNITURE ASSEMBLY, (iv) U.S. patent application Ser. No. 11/449,074, filed Jun. 8, 2006, entitled MODULAR FURNITURE ASSEMBLY, now U.S. Pat. No. 7,547,073, (v) U.S. Pat. No. 7,213,885 entitled MODULAR FURNITURE ASSEMBLY, (vi) U.S. Provisional Application No. 62/354,426 filed Jun. 24, 2016 entitled MODULAR FURNITURE ASSEMBLY CORNER SEATING SYSTEM; (vii) U.S. Provisional Patent Application Ser. No. 62/257,623, filed on Nov. 19, 2015, entitled FURNITURE WITH ELECTRONIC ASSEMBLIES; (viii) U.S. patent application Ser. No. 15/270,339, filed on Sep. 20, 2016, entitled ELECTRICAL HUB FOR FURNITURE ASSEMBLIES; (ix) U.S. patent application Ser. No. 15/276,524, filed Sep. 26, 2016, entitled Modular Furniture Assembly Corner Seating System; and (x) U.S. patent application Ser. No. 15/342,800, filed Nov. 3, 2016, entitled Furniture System with Recliner Assembly, each of which are incorporated herein by reference.

The bases and transverse members of the present invention can include one or more covers (e.g., an inner cover and an outer cover). Such covers have various advantageous, such as that the outer covers are conveniently removable so that the user can remove the covers, wash them, and swap them with other covers as desired. In one embodiment, the speakers used in the present invention are frequency tuned so that there is a high quality sound emitted through the inner and/or the outer removable covers.

FIG. 5: Electrical Power Hub for Modular Furniture

FIG. 5 illustrates the modular furniture assembly of FIGS. 4A-4B in an exploded view with the addition of certain electronic assemblies which connect to an electrical hub configured to be mounted within the modular furniture assembly.

Hub 100 of FIG. 5 is used to provide electrical power to the speakers of furniture system 200 and other electrical components. Base 12 of furniture assembly 10 is selectively coupled to first and second transverse members 14 of furniture assembly 10, a second transverse member being shown in a partial view in FIG. 5.

Each transverse member 14 has a cavity 26 in a middle, lower portion thereof. A U-shaped coupler 15, selectively couples an upper portion of a base 12 to a middle, lower portion of a transverse member 14. Foot couplers 34 selectively couple respective feet of base 12 to respective feet of the transverse members 14. Foot couplers 34 have apertures therein that receive the feet of respective adjacent bases and transverse members, coupling them to each other.

In one embodiment, a foot coupler such as coupler 34 can be placed under a foot of a base that is not adjacent a transverse member or other base, for aesthetic continuity and/or to provide a level surface of all four corners of the base. Furniture assembly 10 is a modular furniture assembly that can be assembled as illustrated in FIG. 5, for example.

As illustrated in FIG. 5, a U-shaped coupler 15 selectively connects a portion of base 12 to a portion of a transverse member 14 by placing one plate of the U-shaped coupler 15 within an aperture 32 in the frame of base 12 and another plate of the U-shaped coupler 15 within an aperture 33 (see FIG. 7) in the frame of transverse member 14 that is in the cavity 26 of transverse member 14, thereby selectively coupling base 12 to transverse member 14. The second transverse member 14, shown in partial view in FIG. 5, and/or additional transverse members 14, can be selectively coupled similarly or in exactly the same manner to base 12.

Base 12 is used as a seat member and/or for receiving a cushion 18 to be used as a seat member while transverse member 14 can be used as a backrest and/or arm rest. Various combinations of bases, transverse members, and U-shaped couplers and foot couplers can be used in varying numbers to create a variety of different furniture assemblies of the present invention, as discussed and illustrated in the patents and patent applications that are incorporated herein by reference.

Electrical hub 100 is also shown in an exploded view in FIG. 5, electrical hub 100 being selectively mounted within the cavity 26 of transverse member 14 and a portion of an electrical hub 100 being selectively sandwiched between a portion of base 12 and a portion of transverse member 14, thereby maintaining hub 100 in a convenient, stable position within furniture assembly 10. Hub 100 acts as a convenient power source for electrical devices 20, 22, and 24. As described in further detail herein, hub 100 may also provide power for speakers and/or other audio components (e.g., an audio receiver).

When cushion 18 of FIG. 4B is placed onto base 12 and adjacent transverse member 14 of FIG. 5, hub 100 is not visible to the user, with the exception of the portion of the electrical cord 110 that extends from behind furniture assembly 10 and into the electrical wall outlet 19. For example, when cushion 18 of FIG. 3 is placed on the base 12a and adjacent transverse member 14a, hub 100 is not visible to the user, as shown in FIG. 2.

An electronic furniture assembly of FIG. 5 thus comprises: (i) a furniture assembly 10 comprising: (A) a base 12, (B) a transverse member 14, and (C) a coupler 15 for coupling the base 12 to the transverse member 14; and (ii) an electrical hub 100 as shown in FIG. 5 configured to selectively reside within the furniture assembly 10. As shown in FIGS. 1A, 1B and 2, electrical hub 100 enables the resulting electronic furniture assembly of FIGS. 1A, 1B and 2 to conveniently receive and act as a source of electrical power for personal objects, such as all phones, computers and other accessories used while sitting on the furniture assembly 10. Power available through hub 100 may also be used to power speakers and other audio components embedded within the furniture assembly in a manner that during normal use (e.g., with cushion 18 is in place), the speakers, hub 100, and even any wiring/cabling associated therewith is hidden from view.

The electrical hub 100 comprises one or more electrical outlets. Hub 100 is configured to be selectively integrated into furniture assembly 10. One or more electrical hubs 100 is configured to be selectively integrated into a variety of other furniture assemblies, having one or multiple transverse members 14, such as the furniture assemblies disclosed in U.S. Pat. No. 8,783,778, entitled MOUNTING PLATFORM FOR MODULAR FURNITURE ASSEMBLY and (vii) Provisional Patent Application Ser. No. 62/257,623, filed on Nov. 19, 2015, entitled "Furniture with Electronic Assemblies," each of which are incorporated herein by reference. The electrical hubs 100 described herein are compatible to communicate with the transverse member cavities disclosed in the aforementioned patents and applications.

Hub 100 can be conveniently used within the transverse members of the furniture assemblies disclosed in U.S. Pat. No. 7,213,885 entitled MODULAR FURNITURE ASSEMBLY, wherein the furniture assemblies have a configuration such that the length X of the base and the length X' of the transverse member are equal to each other and wherein the length X of the base is equal to the width of the base and the width of the transverse member, such that X=Y+Z and X=X' as disclosed in U.S. Pat. No. 7,213,885 entitled MODULAR FURNITURE ASSEMBLY, which is incorporated herein by reference.

The drawings provided herein show hub 100 in use in connection with modular furniture. However, hub 100 is conveniently used in connection with various types of furniture, including: (i) fixed, non-configurable furniture; (ii) furniture that is assembled by a consumer (known as "assemble-able furniture); and furniture that can be configured into a variety of different configurations (known as "modular furniture"). Assemble-able furniture includes (i) modular furniture that can be configured into a variety of different configurations and (ii) furniture that can only be assembled into a single configuration. Hub 100 is conveniently used in connection with various types of furniture, including (i) fixed-nonconfigurable, (ii) assembleable-modular and (iii) assembleable-non-modular furniture.

Although FIG. 5 illustrates a furniture assembly 10 that includes two transverse members 14, and a base member 12, in other embodiments, the hub 100 or hubs 100 may be used in other combinations of transverse members 14 and base members 12, such as those disclosed in the aforementioned patents and applications, hub 100 being configured to be disposed partially within at least one of the transverse members 14 of such assemblies. When positioned thereon, cushion 18 hides the hub 100 from view. A number of mobile, computing and/or other electronic devices 20, 22, 24 are plugged in to the hub 100 that resides at least partially within the transverse member 14 behind the cushion 18.

FIG. 5 illustrates a mobile phone 20, a speaker 22, and a laptop computer 24 electrically connected to the hub 100. Other electrical devices that may be plugged into the hub 100 may include, but are not limited to, table lamps, induction chargers, couch and/or chair lamps, reading and/or floor lamps, mobile computing devices, speakers, stereo systems, vacuums, heaters, fans, electric blankets, and the like for use by a user using furniture assembly 10.

FIG. 5 also illustrates a hub electrical cord 110 plugged into a wall outlet 19. The hub electrical cord 110 provides electrical power to the hub 100, which in turn provides electrical power to the one or more electronic devices 20, 22, 24 that are plugged or otherwise connected into the hub 100. In this way, electronic devices 20, 22, 24 are powered via the hub 100 in a visually pleasing and convenient way. For example, the electrical outlets of hub 100 and connections of the electrical devices to the hub 100 are typically not seen by the user when the user is seated on the couch or by others in the room when the cushion(s) is on the base 12. The hub electrical cord 110 thus provides power to multiple electronic devices 20, 22, 24 from a single a power source. A person sitting on or otherwise using the illustrated furniture assembly 10 has access to his or her electronic devices 20, 22, 24 while they are being powered through the hub 100 without the need for multiple electrical cords or other power strips separate from the furniture assembly 10.

As shown in FIG. 5, in one embodiment, the electrical hub 100 comprises: (a) an electrical outlet assembly 102; (b) a securement panel 104 wherein a rear face of the securement panel 104 is linked to the electrical outlet assembly 102, such that at least one outlet of the electrical outlet assembly 102 is spaced away and offset from the securement panel 104; and (c) an installation clip 106 mounted to the electrical outlet assembly 102, the installation clip 106 being moveable with respect to the electrical outlet assembly 102, the installation clip 106 having an extended position and being capable of being moved to a compressed position when it is desired to move the hub into cavity 26. Electrical outlet assembly 102 includes electrical cord 110 and at least one electrical outlet in electrical communication with cord 110.

The free end of the installation clip 106 is movable with respect to the assembly and is configured to be normally in the extended position absent any other force, and is selectively moved by a user from the extended position to the compressed position in order to mount the electrical hub 100 within the furniture assembly 10. Clip 106 is further configured to be selectively moved by a user from the extended position to the compressed position in order to remove the electrical hub 100 from the furniture assembly. Hub 100 is configured to be selectively mounted within a furniture assembly 100 in order to provide a source of electrical power for one or more electrical devices 20, 22, 24 adjacent the furniture assembly, as illustrated in FIG. 5.

Additional information regarding hub 100 is disclosed in U.S. patent application Ser. No. 15/270,339, filed on Sep. 20, 2016, entitled "Electrical Hub for Furniture Assemblies," which is incorporated herein by reference.

FIGS. 6-7: Electrical Components Coupled to Electrical Hub 100

FIG. 6 is a perspective view of a transverse member of the present invention, including phantom views of certain electronic components connected to a hub of the present invention. An optional adjacent transverse member is also depicted.

FIG. 6 illustrates a transverse member 14 of the present invention having an electrical hub 100 mounted therein, wherein a speaker 170 and an induction charger 172 are fed electrical power through the electrical hub, the speaker and induction charger being mounted within the transverse member.

Various electronic devices can be electrically coupled to the outlets of the electrical outlet assembly 102 or to the interior outlet 140' shown in FIGS. 5-6, such as speakers, induction chargers (e.g., under the fabric of a transverse member serving as an arm rest), refrigerators, amplifiers for a surround sound system, and a vast number of other electrical devices that are convenient to have in a furniture assembly. In various embodiments, outlet 140' has one, two, or more than two electrical outlets.

In addition, one or more additional transverse members with a hub 100, a speaker 170, and a charger 172 can also be provided in order to provide stereo and surround sound and in order to provide a conveniently wired electrical furniture assembly.

Using induction charger 172 mounted within a transverse member 14, a user seated on a furniture assembly 10 can conveniently recharge an electrical device, such as a cellular phone, while seated on the modular furniture assembly.

Wireless qi charging, e.g., via induction charger 172 embedded within the transverse member or other devices is used to charge mobile devices, such as cellular phones, computers, lighting systems, lamps, or other electronic devices. As shown in FIG. 6, the qi charger, also known as an induction charger, may be hidden under furniture covers and/or embedded within the wooden frame of an embodiment of transverse member 14. In one embodiment, the induction charger is mounted on an upper surface of one or more transverse members under a thin cover in order to provide easy access for mobile devices, such as cellular phones, etc.

The induction charger charges though layers of fabric when desired. The induction charger may be placed in a variety of locations such as within the transverse member or the base.

Other embedded devices that may be employed in transverse member 14 or in a base 12, including ambience lights, heating systems, cooling systems and motion sensors, for example.

FIG. 7 is a cutaway perspective view of a transverse member 14 and a hub 100 mounted within the transverse member 14, including a lamp 150 electrically coupled to the hub 100. As shown in FIG. 7, the hub electrical cord 110 extends from the hub 100, through the transverse member 14, out of a hole in the bottom portion of the frame of the transverse member 14 and below transverse member 14, so that the hub electrical cord 110 can be plugged in to an external power source. The illustrated hub electrical cord 110 is flexible and in some of the embodiments shown, e.g., in FIG. 7 is comprised of a plurality of extension cords.

An electrical device such as lamp 150 has a cord 160 thereof conveniently connected to floor resting cord outlet 140a as shown in FIG. 7. Electrical cord 110 is thus advantageous because cord outlets such as floor resting cord outlet 140a can power an electrical device such as lamp 150 and hide at least a portion of the corresponding electrical cord 160 from view, providing a more functional furniture assembly and a more pleasing aesthetic appearance.

Cord elbow 120 extending about electrical cord 110 is also illustrated. The cord elbow 120 is a rigid or semi-rigid component (comprised, e.g., of a hard plastic) positioned about cord 110 in a bending, elbow shape along the length of the hub electrical cord 110. The cord elbow 120 is positioned about the hub electrical cord 110 so as to facilitate a convenient permanent bending of the hub electrical cord 110 while simultaneously protecting the bent portion of cord 110. In one embodiment, the cord elbow 120 bends the hub electrical cord 110 at a position where the hub electrical cord 110 reaches the floor or other surface when extending between the electrical outlet assembly 102 and a power source, such as a wall outlet 19.

Elbows such as cord elbow 120 provide a protected, smooth transition from a vertical orientation to a horizontal orientation, and may be comprised of a variety of different materials, such as a hard plastic, or a rubber, neoprene, silicone or other material that can be wrapped around and electrical cord and form a rigid or semi-rigid tubular member wrapped around the cord.

Elbows such as cord elbow 120 extending about cord thus protect the electrical cord from breaking or fraying while bending, minimize the amount of electrical cord seen, and in some instances hides the electrical cord from view.

Also as shown in FIG. 7, one coupler plate 15a of coupler 15 is configured to fit within a corresponding aperture 32 of base 12 while another plate of coupler 15 fits within a corresponding aperture 33 of transverse member 14 to thereby selectively connect base 12 to member 14. As shown, in one embodiment, U-shaped coupler 15 has a ribbon handle attached thereto for removing coupler 15 from respective apertures 32, 33 and may have a hole in a top portion thereof, which assists in reducing the weight of the coupler 15. In other embodiments, the hole and ribbon are not employed.

FIG. 7 further shows the convenience and utility of internal cord outlet 140a or 140' mounted within the body of transverse member 14, which accepts the cord 160 of a lamp 150, and/or the respective cords 170a, 172a (FIG. 6) of one or more speakers 170 and one or more wireless electrical induction chargers 172 mounted within transverse member 14.

Induction charger 172 can be mounted under the fabric within a transverse member 14, for example for conveniently, wirelessly charging electronic devices wireless, e.g. a phone and/or computer placed by a user on a transverse member 14.

One or more tabs 120a-b extend from the panel 104 of the hub 100 and are configured to reside between the transverse member 14 and the base member 12 when transverse member 14 and base member 12 are coupled together. In this way, the tabs 120a-b are press fitted between the transverse member 14 and base member 12 so as to help secure the hub 100 at least partially within the cavity 26 in transverse member 14.

Coupler 15 and similar couplers and hub 100 and similar hubs can be employed to provide coupling and electrical power in conjunction with speaker-containing bases 12a and transverse members 14a and/or in conjunction with non-speaker containing bases and transverse members.

FIGS. 8A-8H: Base 12a with Speaker System

FIGS. 8A-8H demonstrate an example of the base 12a of the furniture system 200 in the form of the chair of FIGS. 1A-FIG. 3 of the present invention and the subwoofer speaker system mounted within the frame of the base 12a.

FIGS. 8A-8H illustrate how subwoofer 210a is mounted and positioned within base 12a. As shown in FIGS. 8A-8H, base member 12a includes a frame assembly 216 into which subwoofer 210a is mounted. Subwoofer 210a can receive its audio signal wirelessly (e.g., from transmitter 224, or from receiver/amplifier 217), or through a wired connection (e.g., from audio receiver 217). Power for a powered subwoofer may be provided from hub 100. If the subwoofer is passive (e.g., no internal amplifier), the amplified signal may be provided from receiver/amplifier 217.

FIGS. 8A-H illustrate how subwoofer 210a is embedded into the frame assembly 216 of base 12. Frame assembly 216 of base 12a has a cavity 226 within frame assembly 216, within which subwoofer 210a is positioned.

Subwoofer speaker 210a is comprised of a subwoofer speaker driver 211a, including electronics and other structure typically associated with such a speaker driver, such as its magnet. Speaker driver 211a is coupled to a speaker housing 228 on which driver 211a is mounted. Speaker housing 228 provides a given, desired internal volume associated with subwoofer speaker 210a. In the illustrated embodiment, housing 228 is separately defined from the cavity 226 within frame assembly 216.

The configuration of speaker housing 228 enables speaker 210a to be removed from the cavity 226 of base member 12a so as to allow a user to remove subwoofer assembly 210a from a given base member 12a and install it into another base member 12, for example, which may not have previously included a subwoofer speaker 210a therein. Subwoofer assembly 210a is thus entirely self-contained. Enclosure 228 may be sealed or ported, as desired.

Subwoofer speaker 210a further includes elongate attachment arms 230a and 230b mounted on opposing sides of speaker housing 228. Arms 230a and 230b are attached to the enclosure 228 and couple enclosure 228 to frame assembly 216 of base 12a.

In the illustrated embodiment, arms 230a and 230b each include an angled terminal extension 232 at each end thereof and a mounting hole 232a associated therewith. The positioning and orientation of holes 232a are configured to allow subwoofer speaker 210a to be received within cavity 226 of frame assembly 216 in a manner that holes 232a align with the holes for mounting feet 20a of base member 12a.

Each of the arms 230a-b are comprised of an L-shaped shaft body having an approximately 90 degree angled L-shaped cross section, each shaft body having terminating extensions 232 extending from the shaft body. The terminating extensions 232 are angled to extend laterally outward from the shaft body as shown in FIG. 8H. As shown in FIG. 8H, the terminating extensions 232 extend in the same plane as one of the legs of the L-shaped shaft body. Using the arms 230a-b, the associated speakers can be quickly and efficiently coupled to the frame assembly of the base and can be readily removed therefrom in order to selectively replace the speakers.

Thus, in one embodiment of the present invention, the speaker system comprises one or more arms configured to couple one or more speakers to a frame of a portion of the furniture assembly, the one or more arms comprised of an L-shaped shaft body having an angled L-shaped cross section, the shaft body having terminating extensions extending from the shaft body, the terminating extensions being angled to extend laterally outward from the shaft body, the terminating extensions extending in the same plane as one of the legs of the L-shaped shaft body.

Figure 8A:
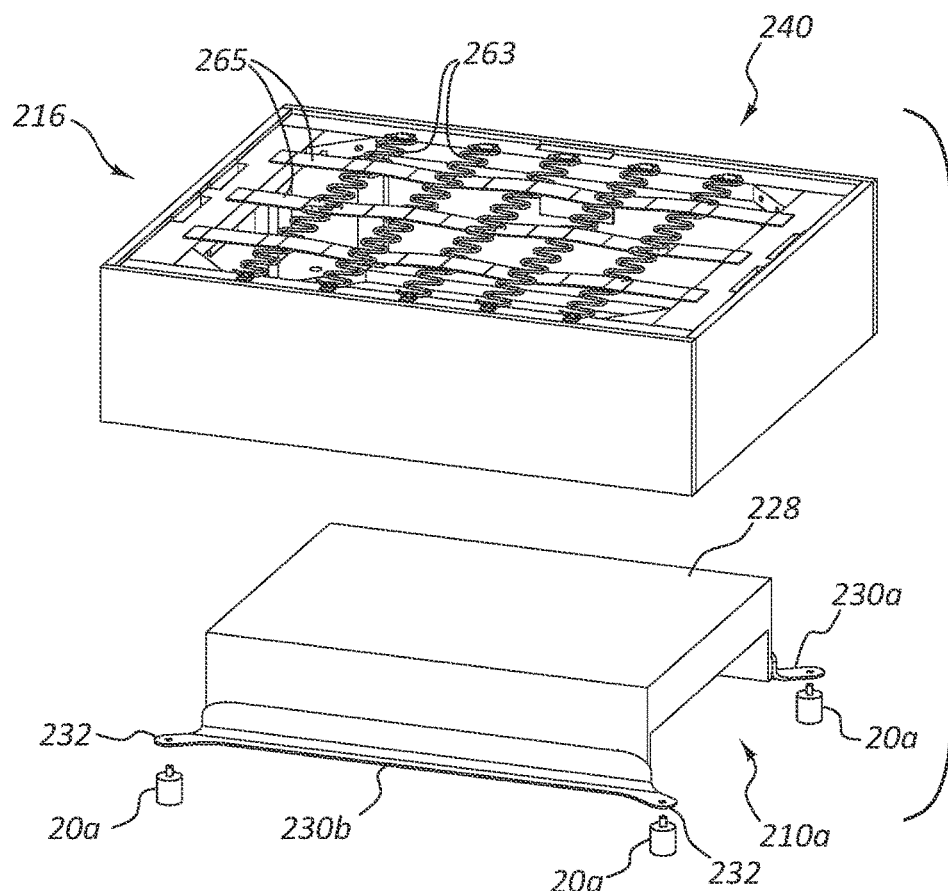
FIGS. 8A-8H demonstrate the speaker-containing base of the chair of FIGS. 1A-1B of the present invention with the subwoofer speaker system mounted within the frame of the base. An outer and inner cover and feet members associated with components of the base are depicted in FIG. 8F.
Figure 8B:
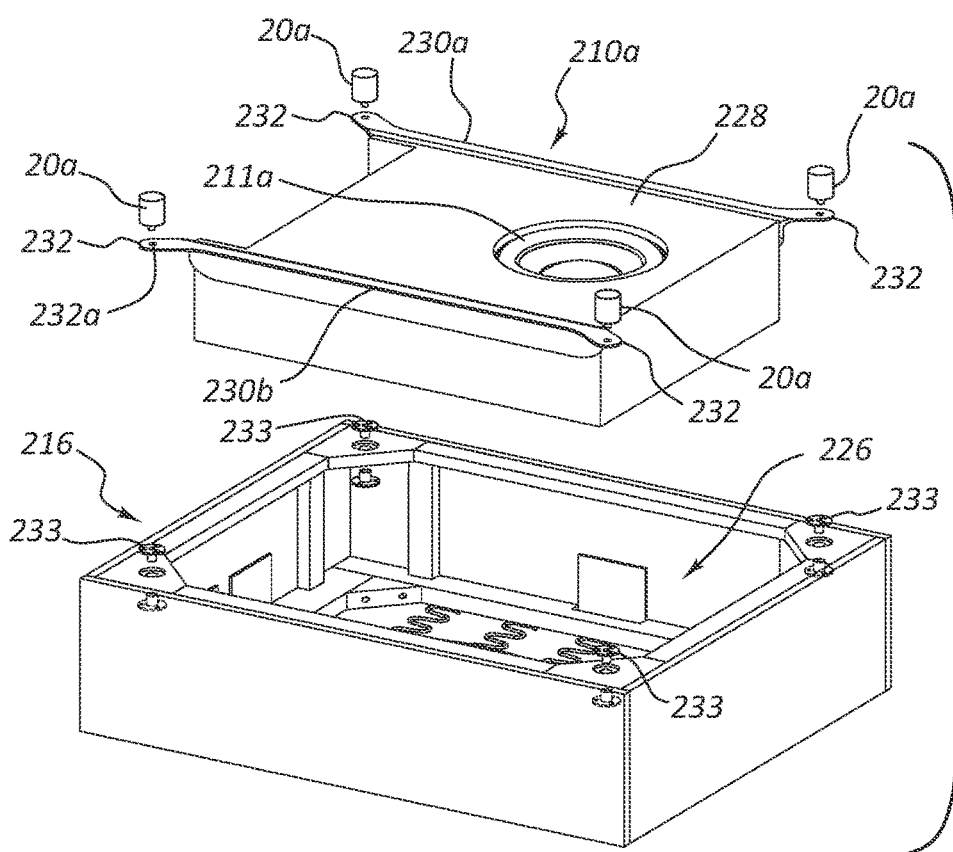
Figure 8C:
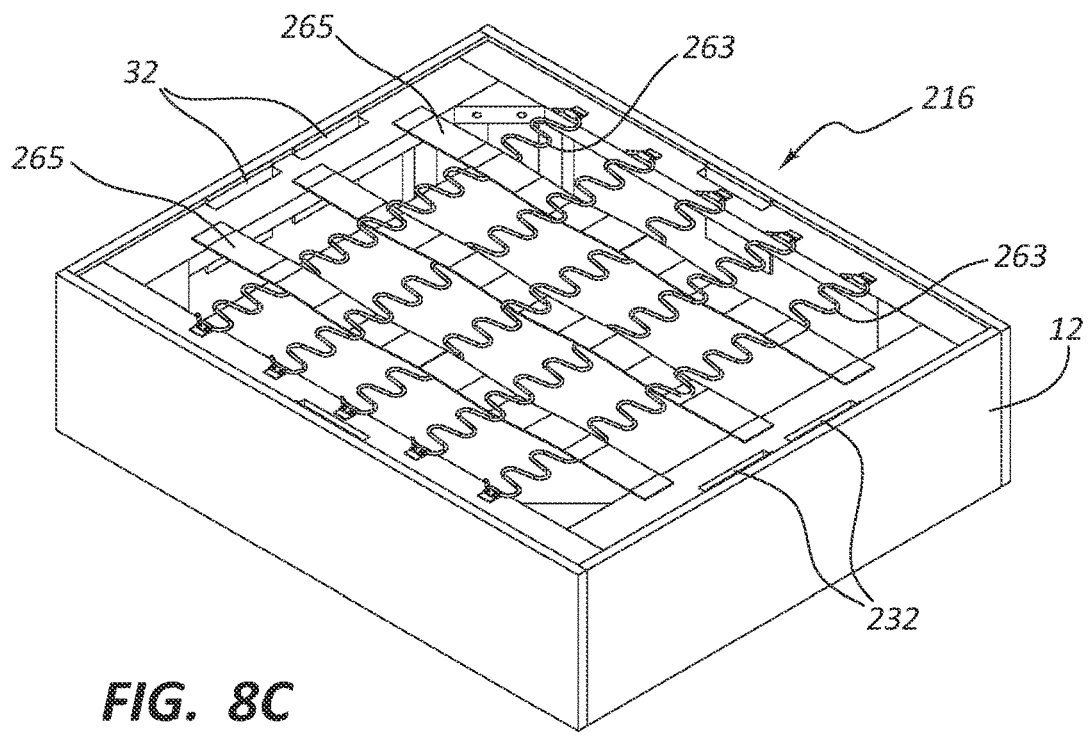
Figure 8D:
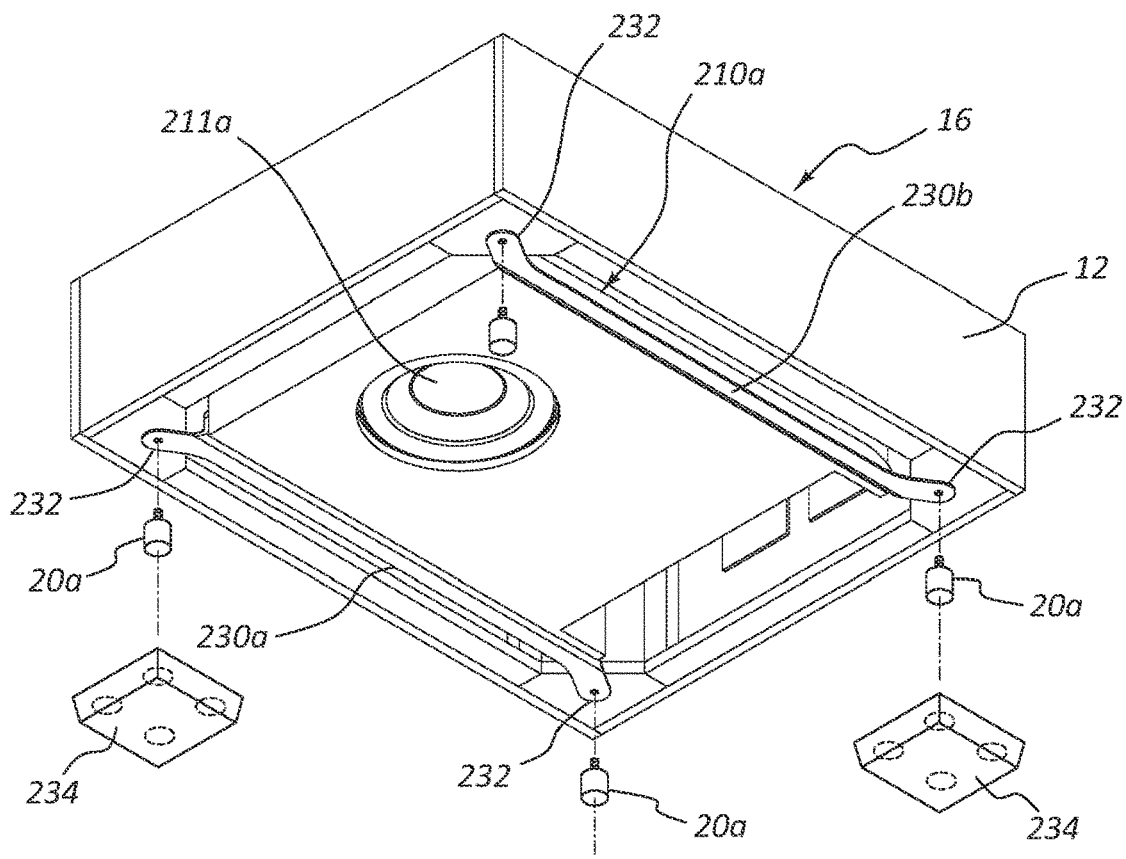
Figure 8E:
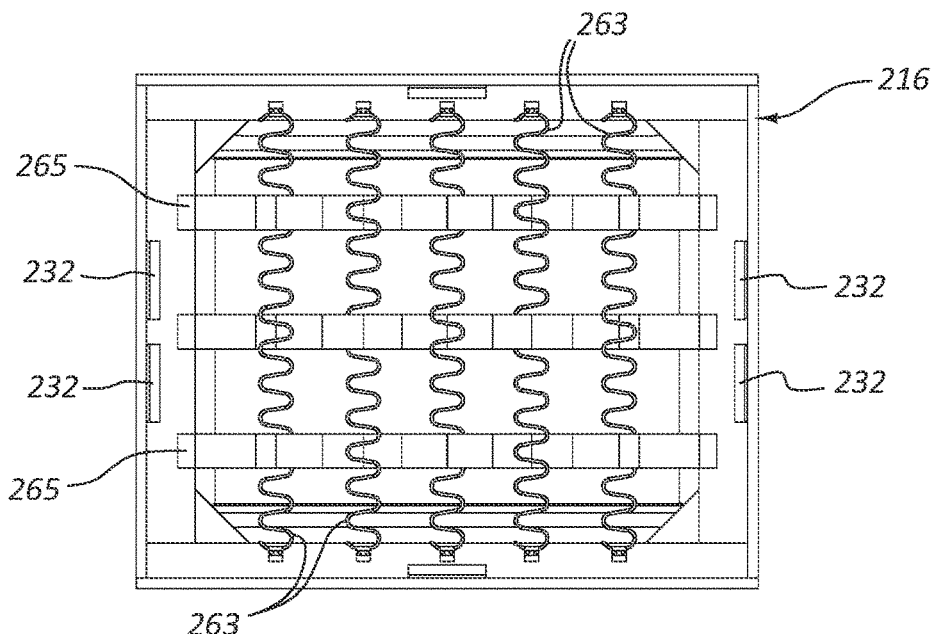
Figure 8F:
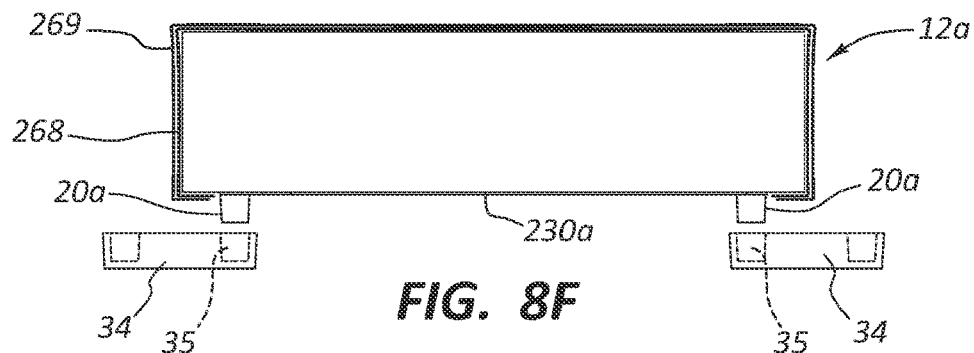
Figure 8G:
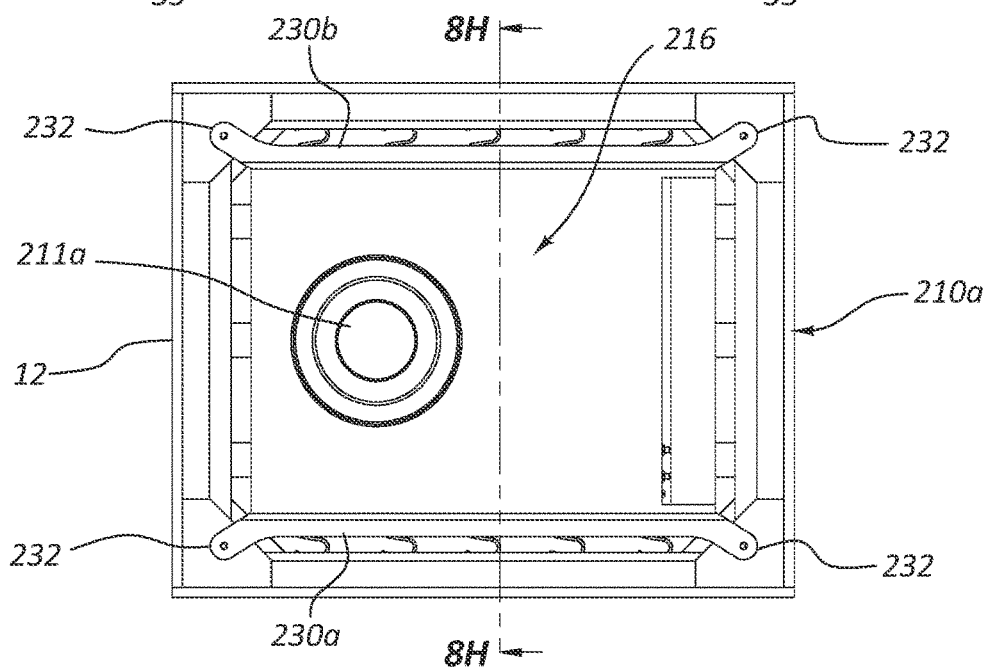
Figure 8H:
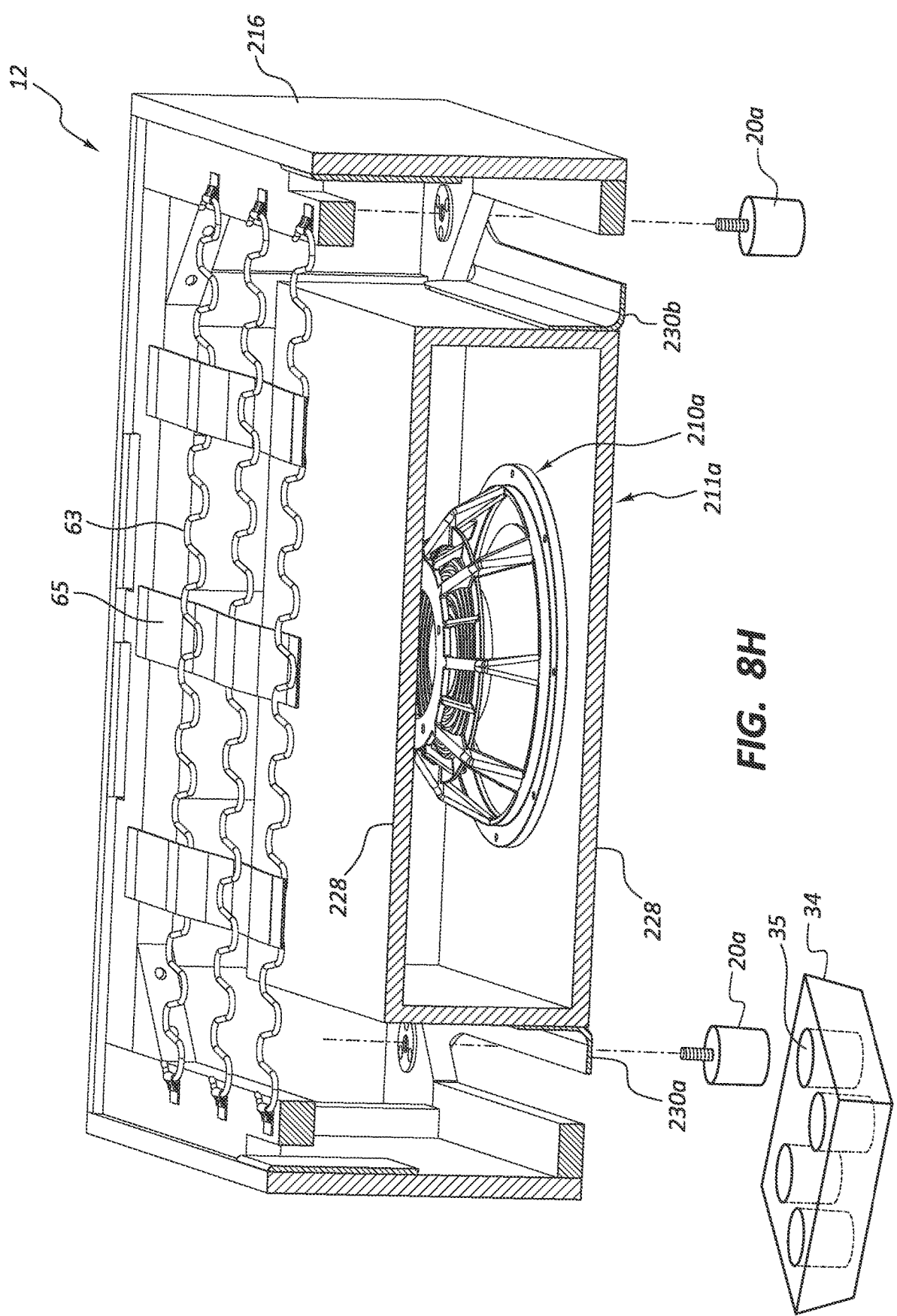

This relationship is further shown in FIGS. 8A-8H in which the positioning of feet 20a is depicted. Feet 20a of base member 12a are shown as being configured to be mounted to the respective four corners of frame assembly 216 with arms 230a and 230b being sandwiched between the respective feet 20a and a hole in frame assembly 216 into which feet 20a are threadedly received, for example. FIG. 8B illustrates the positioning of upper and lower internally threaded hubs 233 that sandwich corner portions of frame assembly 216. Feet 20a can be selectively threaded into hubs 233 within the corner portions of frame assembly 216.

As further shown in FIGS. 8A-H, the subwoofer speaker 210a is shown positioned within frame assembly 216 of base 12 in an orientation so that the driver 211a of subwoofer speaker 210a is oriented downwards, for example, in the same direction as feet 20a (towards the floor).

In other words, the cone of driver 211a associated with subwoofer 210a is shown as directing sound downward towards the floor or other support surface when assembled within base 12a.

Other configurations are possible. For example, the driver 211a can alternatively be flipped over so that the cone of driver 211a associated with subwoofer speaker 210a is oriented upwardly within base 12a, in other words, toward the seated user.

Each of these different configurations provides a different sound-enhanced experience for the user. For example, when driver 211a is pointed downward towards the floor, sound is reflected off the floor, the reflected sound potentially having the advantages of reflected sound, which may, in some embodiments, include improving the sound quality.

When driver 211a is pointed upwardly toward the user sitting on the base 12a, it may be possible for the user to feel and experience an increased amount of reverberation, improving the fourth dimensional experience for the user who can, in some embodiments, feel the sound of the speaker more intensely.

The illustrated configuration provides a high degree of protection for the driver 211a of subwoofer speaker 210a, while also providing excellent sound quality. In some embodiments, as frequencies of 120 Hz or less, or 80 Hz or less are largely omni-directional, a user seated on couch 200 cannot readily tell from which direction such sounds are coming.

Providing a full enclosure housing 228 for subwoofer speaker 210a, in addition to using an enclosure associated with frame assembly 216 of base 12a, provides additional protection to the driver 211a of subwoofer speaker 210a.

For example, the top side of enclosure 228 is spaced apart from the springs 263 coupled to the top of frame assembly 216 on which the cushion is positioned. The space thus provided between the top of enclosure 228 and the springs 263 coupled to the top of frame assembly 216, so that when a user sits on a cushion 18 positioned on the springs 263 coupled to the top of frame assembly 216 (or on fabric cover 266 or other cover over the springs 263), there is little risk of damage to driver 211a of subwoofer speaker 210a.

For example, such a space or clearance between the springs 263 and the housing 228 may be at least about 2 inches to about 5 inches, for example.

As shown in FIGS. 8A and 8B, one or more internally threaded hubs 233 are coupled to each of the corners of base frame 226. In one embodiment, corresponding upper and lower hubs 233 are mounted within a corner such that each corner has an upper hub and a lower hub in an aperture thereof. Feet 20a are threadedly coupled to corresponding corners by being threaded within corresponding upper and/or lower hubs 233.

In the embodiment of FIG. 8D, foot couplers 234 are shown. Foot couplers 234 are further shown in FIGS. 8F and 8H. In one embodiment, the diameter of each of the holes of foot couplers 234 are larger than the outer diameter of the feet 20a, such that the rim and body portions of the foot couplers 234 contact the corners 232 of the arms 230a-230b, such that weight of the arm's base frame 216 and an individual sitting on the base 12a are received by the foot couplers 234 and not by the feet 20.

FIG. 8F shows an example of an inner and outer cover 268, 269 mounted on base frame 216 and having ends that extend slightly onto the underside of base frame 216, as shown in FIG. 8F. Covers 268, 269 may be comprised of a variety of different fabrics. Additional covers or shielding members can be used to protect base frame 216 and/or speaker system 210a, such as a metal or plastic mesh or caging material to cover driver 211a on the bottom of frame assembly 216. A removable outer cover 269 is selectively, removably mounted on the undersurface of frame 216 and/or on inner cover 268 in order to protect inner cover 268 and frame 216 and in order to provide a selectively changeable aesthetic appearance. Covers 268, 269 may be secured over frame assembly 216 with attachment members, such as with one or more two-part attachment members, such as VEL-CRO, snaps, or with a variety of different attachment members. Staples or other attachment members may be used to connect inner cover 268 to frame 216.

As shown in FIGS. 8A-8H, at the top end of frame assembly 216, serpentine springs 63 and/or Italian webbing 65 are mounted on frame assembly 216. Such resilient cushioning structures provide support to a cushion 18 placed over frame assembly 216 and may also help to ensure that even if a user were to step or jump on the top of frame assembly 216 or a cushion placed thereon, the springs and webbing 263 and 265 will not be pressed against enclosure housing 228.

Even in the unlikely event that a user were able to depress springs 263 and/or webbing 265 to a top surface of housing 228, the rigid enclosure housing 228 will still protect subwoofer driver 211a from any damage. Thus, the configuration of housing 228 and the space between housing 228 and springs 263 provides dual layers of protection for subwoofer driver 211a.

As further illustrated in FIGS. 8F and 8H, the foot couplers 34, used to couple adjacent base members 12a and/or transverse member 14a to one another have apertures 35 that are large enough to surround feet 20a without contacting feet 20a, such that the upper surfaces of foot couplers 34 contact the surface of arms 230a and 230b on the respective corners of base 12a, along with other surfaces of the corners, so that more of the force and strain associated with base members 12a is carried by arm members 230a and 230b, and frame assembly 216 and foot couplers 34, rather than all of the force being concentrated within foot members 20.

FIGS. 9A-12 Transverse Member with Speakers

Figure 9A:
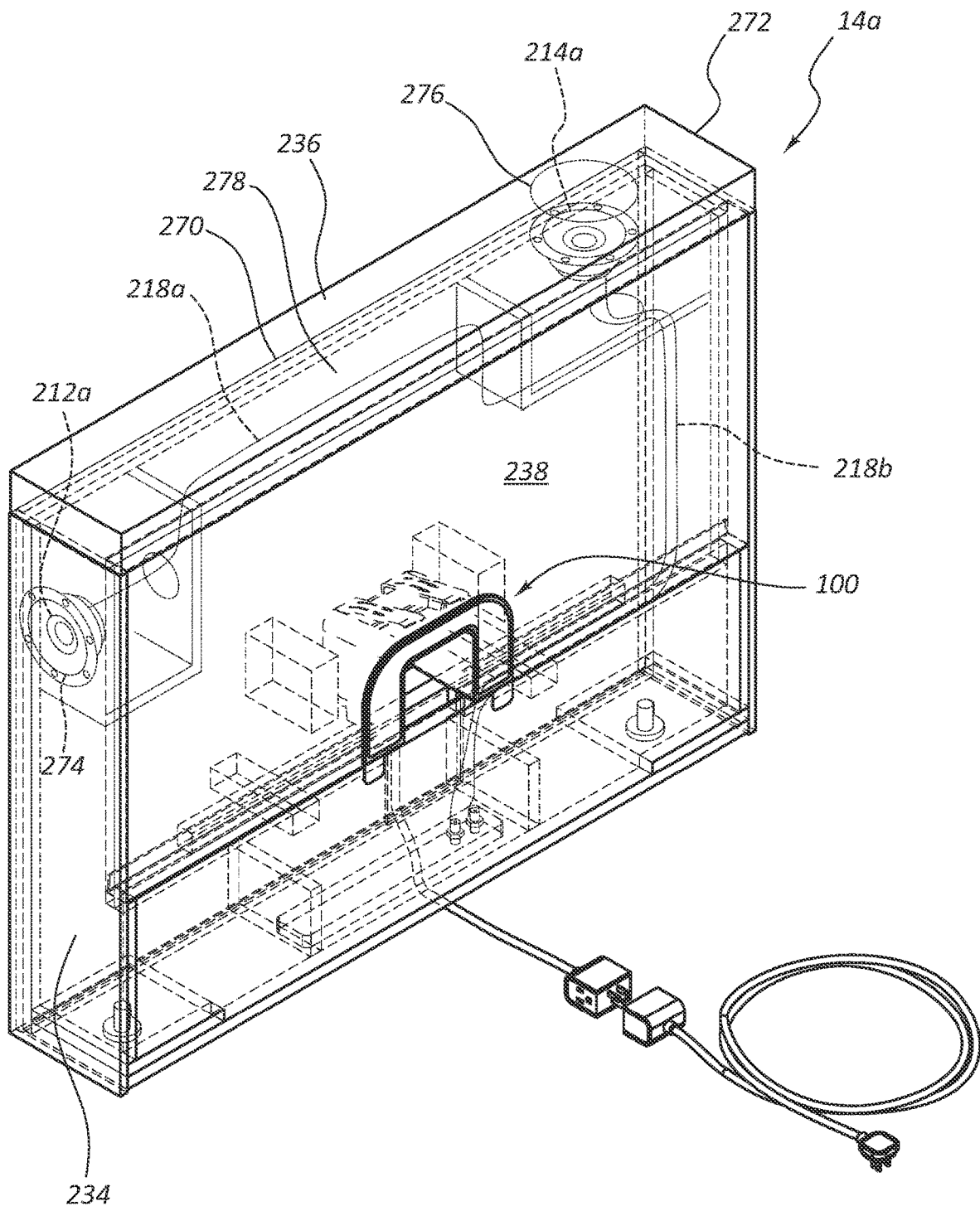
FIGS. 9A-9D demonstrate the transverse member of FIGS. 1A through FIG. 3 of the present invention and the speaker system mounted within the frame of the transverse member. The electrical hub 100, which is selectively mounted within the transverse member, is shown mounted within the transverse member.
Figure 9B:
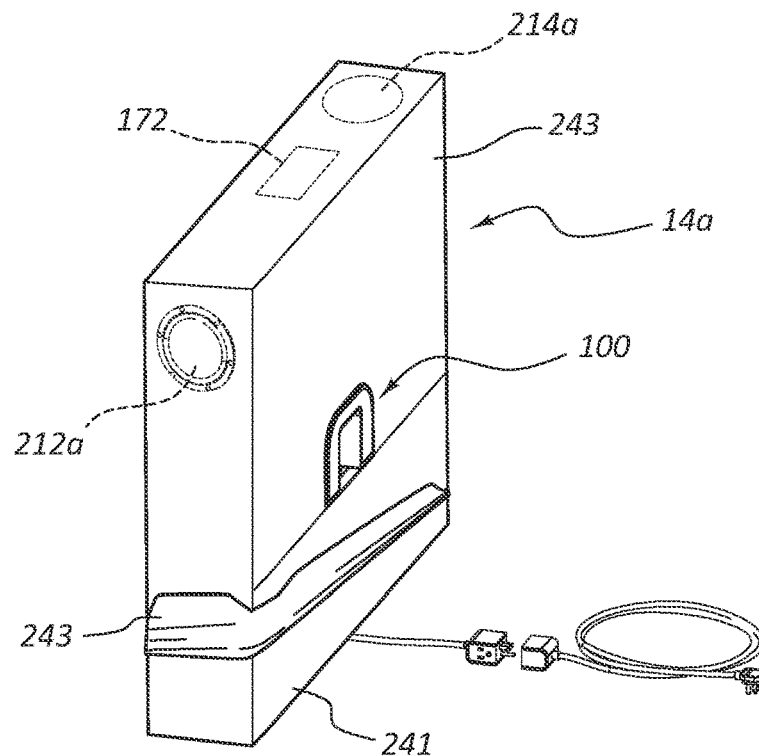
Figure 9C:
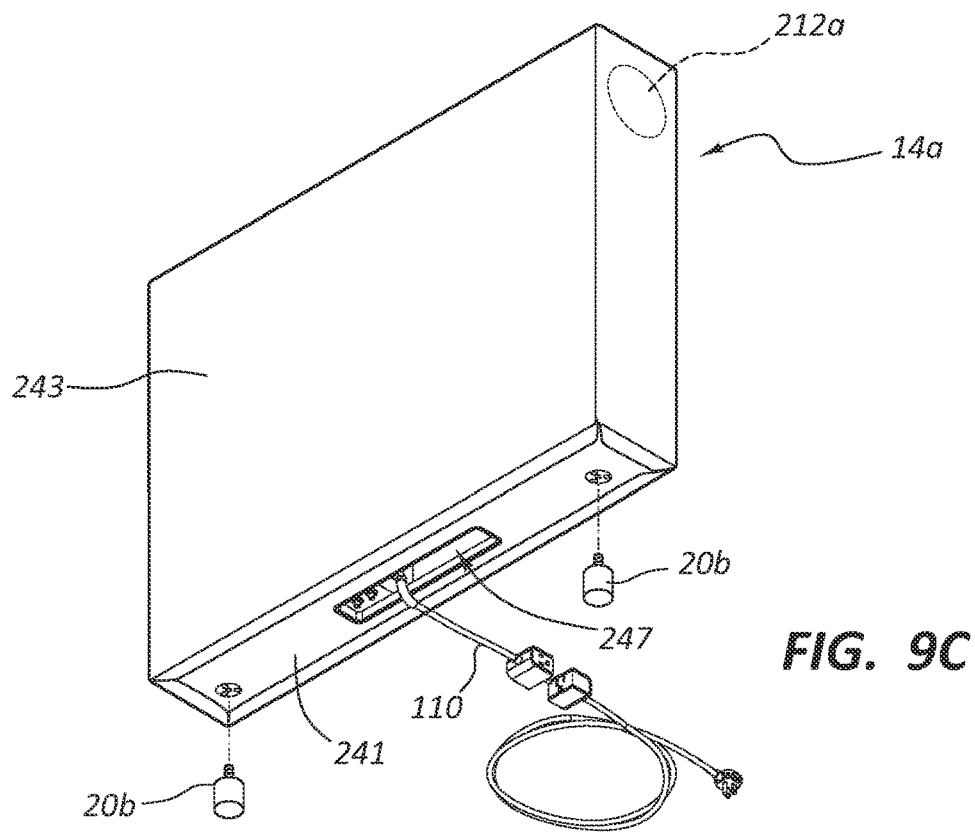

FIGS. 9A-9D demonstrate an example of the transverse member 14a of FIG. 1A through FIG. 3 of the present invention, with the speakers mounted within the frame of the transverse member 14a. The electrical hub 100, which is selectively mounted within the transverse member 14a, is shown mounted within the transverse member 14a. Depictions of inner and outer covers 241, 243 of the transverse member 14a are shown in FIGS. 9B-9C. Covers 241, 243 are not depicted in FIGS. 9A and 9D.

FIGS. 9A-9D illustrate transverse member 14a having two speakers embedded therein. FIGS. 9A-D illustrates the mounting of front speaker 212a on and within the frame 270 of transverse member 14a and the rear, upwardly facing surround speaker 214a mounted on and within the frame 270 of transverse member 14a. FIG. 9A shows how front speakers and rear speakers 212a-b, 214a-b of FIG. 1 may be mounted to the framing 270 within transverse member 14a.

As shown in FIG. 9A, an exemplary mounting configuration for mounting surround sound speakers 214a and front speaker 212a to frame 270, is shown. For example, speaker 212a is screwed onto, bolted or otherwise secured to plywood, other wood, or other material of the frame 270 of the transverse member 14a, as shown. The frame 270 of the transverse member 14a is comprised of vertical and horizontally oriented members that define and create an internal speaker cavity within frame 270. Frame is covered on one or more exterior surfaces thereof by a cushioning material 272, e.g., a polyurethane foam material for providing cushioning to frame 270.

Holes 274, 276 are formed through the frame 270 and cushioning material 272 through which the sound of respective speakers 212a, 214a is emitted. A layer of polyurethane or other foam is typically present around the top, sides and front and back faces of frame 270 of transverse member 14a. Holes 274, 276 extend through such foam and frame 270 through which respective speakers 212a, 214a adjacent the respective holes 274, 276 emit sound.

An inner fabric cover 241 extends over the foam 272 and frame 270 of transverse member 14 and connects on the bottom of frame 270, as illustrated in FIGS. 9B-9C. In one embodiment, such fabric extends over the holes 274, 276, protecting the respective speakers 212a, 214a. An outer removable upholstery fabric cover 243 is selectively placed over the inner cover 243. The frequencies generated by the speakers are tuned such that the sound emitted from the speakers 212a-b is tuned to compensate for the sound passing through the inner and outer covers 241, 243, which covers are typically not acoustically transparent materials.

In another embodiment, a fabric inner cover may be mounted within the holes of the polyurethane or other foam material and/or the plywood frame member, after which the speakers are secured to the frame member. The outer upholstery fabric cover then extends over the transverse member, including the speakers 212a, 214a, hiding the speakers from view.

Rear surround speaker 214a can be mounted in the same or similar manner as speaker 212a, or in a different manner. For example, speaker 214a can be secured to a plywood or other frame member of transverse member 14a and mounted adjacent a hole in the frame member. A hole is also provided through the polyurethane or other foam around the top surface of transverse member 14a through which surround speaker 214a is mounted. Inner and outer fabric covers similarly extend over and/or about rear surround speaker 214a.

In one embodiment, the transverse member frame 270 is surrounded entirely by cushioning material 272, except possibly on the bottom surface of frame 270 and possibly within the cavity 26 where the coupler 15 and hub 100 are mounted.

The front speaker 212a and rear surround speaker 214a of FIGS. 9A-9D are mounted within compartments within the frame 270 of transverse member 14a and are coupled to the frame 270, e.g., with screws or bolts. Holes 274, 276 in the frame 270 and foam 272 correspond to the inner diameter of the respective speaker cone. As indicated, the interior cover 241 can either be covering the outer portion of the holes 274 to thereby cover the speakers, or can tucked into the holes created in the frame and foam that house the speakers.

The speakers 212a, 214a of FIGS. 9A-9D of the speaker-containing transverse members 14a are thus each positioned within the frame 270 thereof with the drivers of the speakers screwed or bolted to the frame 270 and with the inner diameter of the cones of the speakers 212a, 214a placed adjacent respective circular holes through the frame and adjacent foam.

The holes in the outer foam covering may be covered by an inner cover 241 (FIG. 9B) which covers the transverse member frame and/or by an outer cover 243 (e.g., washable) that is selectively purchased by a user according to color, fabric, etc. and which selectively is placed over the inner cover 241. The speakers 212a-214a are tuned in order to emit sound in a high quality manner through the upholstery fabrics of the covers 241, 243. For example, frequencies that are preferentially absorbed by the fabric covers (altering the loudness of a given frequency as it passes through the fabric cover) may be boosted to compensate for loss as such frequency passes through the cover(s). Relatively higher frequencies are typically more drastically attenuated by such fabric passage than relatively lower frequencies, such that the tuning may comprise preferentially boosting higher frequencies (as compared to little or no boosting of lower frequencies), in order to provide a "flat" frequency response across the frequency spectrum as heard on the other side of the fabric (i.e., at the listener's ears).

The drivers of transverse members 14a may optionally be covered by a metal or plastic mesh or caging material mounted within the holes within the cushioning material and/or frame, for additional protection beyond that provided by the fabric covers.

The front-facing speaker 212a of FIGS. 9A-9D is shown positioned adjacent the front face 234 of transverse member 14a. Front speaker 212a is shown as being positioned near the top of the front face 234. Upwardly facing rear surround speaker 214a is shown as being embedded adjacent a top surface 236 of transverse member 14a. Surround speaker 214a is shown as being positioned within transverse member 14 near a rear end of upper surface 236 of member 14a.

The structure and positioning and tuning of speakers 212a, 214a is strategically useful to the sound and fidelity of the speakers as the speakers are covered by one or more covers 241, 243.

Such placement is advantageous as it positions speaker 212a, 214a well above the floor on which the couch assembly 200 is placed, while also positioning rear surround speaker 214a near to, and perhaps behind the ears of a user seated on couch 200. Such positioning is also advantageous as it helps to protect speakers 212a and 214a from damage that might otherwise occur if the speakers were near the floor.

For example, positioning speakers 212a, 214a closer to the floor surface might result in a user inadvertently kicking the speaker, thereby damaging it. Positioning of surround speaker 214a at or near a rear end of the upper surface 236 of transverse member 14 is also advantageous as a user is less likely to spill a drink at this location or even position an arm or hand over the speaker, damaging the speaker and/or muffling sound generated thereby.

The interior furniture cavities of the base and transverse members of the present invention are utilized to potentially enhance the audio quality by resonance and positioning. The volume of the transverse member itself (or an enclosure within such space) may be used as the speaker enclosure, creating the desired resonance. Speakers are tuned for speaker output through the fabric covers covering the frames of the speakers, which is highly useful.

Removable, outer cover 243 may selectively be mounted on transverse member frame 270 (and the at least partially surrounding foam 272) and/or on interior cover 241 through the use of a two part attachment assembly, such as VELCRO, or other two part attachment assembly.

The inner and outer covers 241, 243 may be comprised of a variety of different upholstery fabrics, such fabrics comprising fibers, such as polyester fibers, or other fibers. The fabric of covers 241, 243 may be woven or non-woven. Typically, such fabrics are not acoustically transparent, e.g., they affect sound waves at one or more frequencies from 20 Hz to 20 kHz by attenuating (or boosting) any such frequency more than 3 dB (i.e., ± more than 3 dB). For example, such upholstery fabrics are relatively heavy fabrics, which may typically attenuate particularly the higher sound frequencies at more than 3 dB. As a result of such attenuation by the fabric, the sound generated at any such speaker hidden behind the upholstery fabric may be tuned to increase the volume of the attenuated frequencies to compensate for the attenuation that occurs as the sound passes through the fabric. For example, if the fabric attenuates sounds at 2 kHz by 6 dB, the tuning may increase the volume of sounds at 2 kHz by 6 dB to compensate. There may typically be several frequencies which may be boosted to compensate for such fabric induced attenuation.

Examples of the upholstery materials for the inner and/or outer cover 243 include polyester, chenille, tweed, linen, velvet, leather, polyester linen, cotton, cotton blend, denim, twill, faux fur, leather, and the like, for example. Such materials can also be used for outer covers for base member 12a, and all of which are examples of upholstery fabrics, although a variety of different fabrics may be employed.

Examples of weights of upholstery fabrics that can be used as interior covers and/or outer covers for the bases and/or transverse members of the present invention include, for example: fabrics having weights in a range of approximately 50 grams per square meter (GSM) to approximately 1500 grams per square meter (GSM), for example, such as approximately 100 GSM to approximately 1000 GSM, or such as approximately 190 GSM to approximately 800 GSM, although a variety of different interior and exterior fabrics may be employed. The speakers of the present invention are adjusted and tuned in order to emit sound through such fabrics in a manner that attenuation due to such fabric is compensated for.

In one embodiment, the inner cover of base 12a and/or the inner cover of transverse member 14a are comprised of a thin cover comprising an approximately 90 percent polyester and approximately 10 percent cotton blend, for example.

In one embodiment, with respect to tuning the speakers through the upholstery fabric of covers 241, 243 through which the sound is emitted, the upholstery fabric used in transverse member 14a is in one embodiment not an acoustically transparent fabric, but rather is upholstery fabric configured to be employed in upholstery, chairs, couches and other furniture.

For this reason, the front speakers and the surround speakers can be tuned to accommodate for the dynamic that the sound generated from such speakers is required to pass through the upholstery fabric.

For example, relatively higher frequencies (e.g., 200 Hz or more, 400 Hz or more, 800 Hz or more, 2 kHz or more, 4 kHz or more, etc.) generated from such speakers are often affected by passage through such fabric, and may have some degree of attenuation associated therewith, which attenuation may increase with increasing frequency. As a result of this, the speaker can be tuned by boosting such higher frequencies before they pass through the fabric so that once the speaker sound passes through the fabric, it is approximately at a volume as it is intended to be heard and received by a listener (e.g., so that the overall tuned output is within ±3 dB of the un-attenuated "target" value).

As mentioned, examples of the upholstery materials for the inner and/or outer cover 243 include chenille, tweed, linen, velvets, leather, polyester linen, cotton, cotton blend, denim and others used in furniture upholstery, for example. Tuning of the frequencies of the speakers to provide the sound through such upholstery fabrics is a unique and novel aspect of the present invention.

Such positioning hides speakers 212a and 214a within transverse member 14 so as to not be readily seen by a user or other person, but also allows a high quality sound from the speakers.

Such hiding of the speakers is particularly advantageous in at least some embodiments. For example, many users dislike the appearance of speakers within a room in locations such as a bookshelf, or on stands located some distance from a couch, which is often typical.

The present configurations are advantageous in that they allow complete hiding of the speakers, sometimes even all of the speakers associated with a surround sound system.

Each of speakers 212a and/or 214a may be mounted within transverse member 14 in any manner desired. For example, they may each include a dedicated housing enclosure similar to that described above, with respect to the subwoofer assembly. Such a housing enclosure could be attached to the frame assembly within transverse member 14a. In another embodiment, the speaker driver associated with speakers 212a and/or 214a can simply be mounted to frame members internally disposed within transverse member 14a, employing the cavity associated with transverse member 14a for one or both of speakers 212a and/or 214a.

Figure 9D:
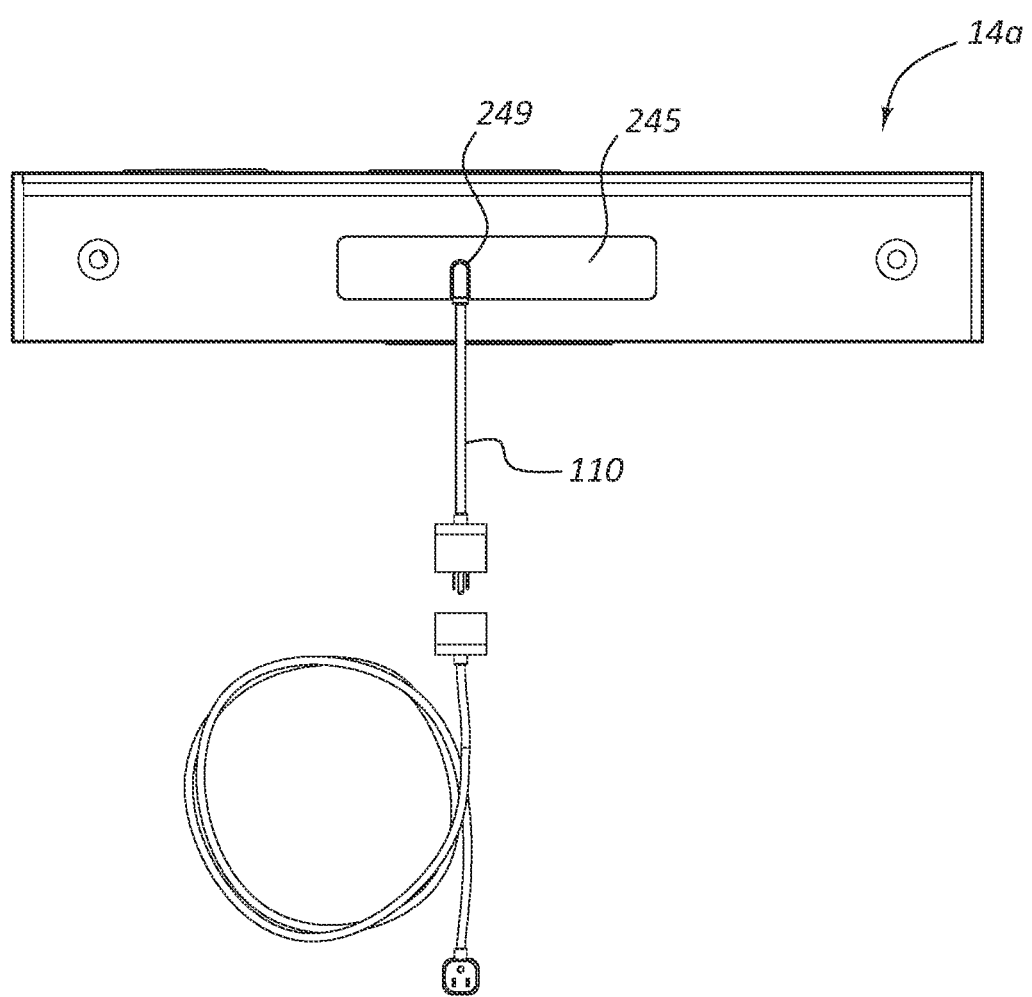

With regard to FIG. 9D, a hole cover 245 may be employed as a plug to cover electronics of the interior systems within the transverse member 14a as shown in FIG. 9D. For example, FIG. 9C illustrates hole or opening 247 in a bottom face of transverse member 14a, through which cord 110 passes. As shown in FIG. 9D, hole 247 is shown covered by hole covering 245. A relatively small slot 249 may be provided through covering 245, to permit cord 110 to extend therethrough.

As shown in FIG. 9A, wiring 218a, 218b provides power and/or signal to embedded speakers 212a and/or 214b as appropriate. Wire 218a provides at least part of an electrical connection between an amplifier 217 (see FIG. 15), which may be mounted in base 12a on, near, or within housing 228 for example, and front speaker 212a. It will be appreciated that cable or wiring 218a-b may be provided in a plurality of sections to preserve the modular nature of furniture assembly 200. For example, coupling between such wiring sections could be provided at or near the hub 100 disposed within transverse member 14.

For example, it will be appreciated that a first section of such wiring or cabling may extend from a base member 12a and amplifier 217 to a location of the base member 12a that is near or adjacent to the coupler 15 and/or hub 100.

This first section of wiring or cabling could be terminated at this location with an appropriate RCA or other type coupling jack. The transverse member 14a may similarly include another section of wiring 218a which extends from speaker 212a through transverse member 14 to another jack coupling at or near hub 100. Once the modular furniture assembly 200 has been assembled with transverse member 14a positioned adjacent to and coupled to base member 12a, a coupling or cabling can be extended between two such jacks (bridging wiring within transverse member 14a and base 12a), providing an effective, wired connection from amplifier 217 to speaker 212a.

A similar multi-section wiring or cabling configuration can similarly be provided between rear, surround speaker 214a and a jack at or near the hub 100 and from the amplifier 217 to a location at or near the hub 100, with a bridging coupling or wiring between wiring in base 12a with wiring in the transverse member 14a.

In another configuration, such internal wiring spanning the base members and the transverse members may not necessarily be required. For example, signals could be transmitted to the speakers from receiver 217 (e.g., an audio or home theater receiver) and/or transmitter 224 through wireless transmission.

In such embodiments, the signal may be transmitted wirelessly to speaker 212a and/or speaker 214a. In such embodiments, it may still be necessary to provide power to speaker 212a and/or 214a, e.g., through use of hub 100 Such wireless transmission of signals may eliminate the need for any wiring or electrical coupling for power or signals from base 12a to transverse member 14a, at least for speakers 212a and 214a.

Where jumper connections are desired for power and/or signal transmission, such may be achieved through any suitable configuration. For example, quick connect ports (e.g., RCA, banana plugs, or other) for such speaker wire or cable may be located on a bottom side of transverse member 14a (FIG. 9C) for connecting a jumper cable, for example, from the transverse member 14a to the base member 12a.

In one embodiment, an induction charger 172 (such as that in FIG. 6) is mounted on an upper surface of the frame 270 of the transverse member 14a, embedded within the foam 272 on top of the frame 270, for example, and located below the inner cover 241 (and possibly below a portion of foam) mounted on the frame 270. Induction charger 172 is electrically coupled to an interior outlet of the electrical hub 100.

Induction charger 172 can be mounted in an upper middle portion 278 of transverse member frame 270, for example, between the speakers 212a-214a and above the electrical hub 100. Charger 172 may be in the same top surface 236 as surround speaker 214a, positioned forwardly relative to speaker 214a, e.g., behind speaker 212a positioned in the front surface 234 of transverse member 14a.

Figure 10:
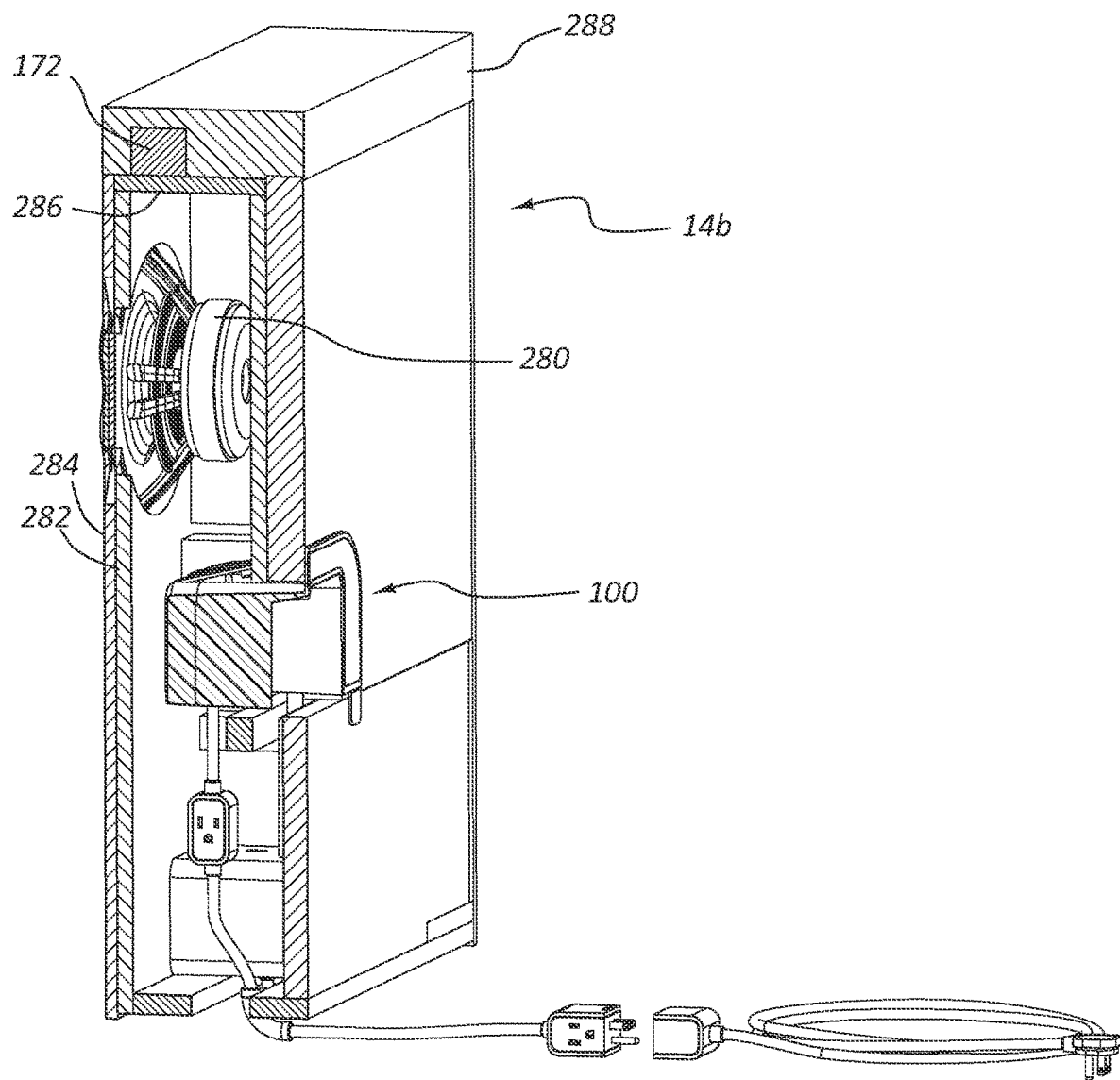
FIG. 10 shows a cutaway view of an alternative speaker-containing transverse member, wherein the speaker is in a different location from the transverse member of FIGS. 9A-9D.
Figure 11:
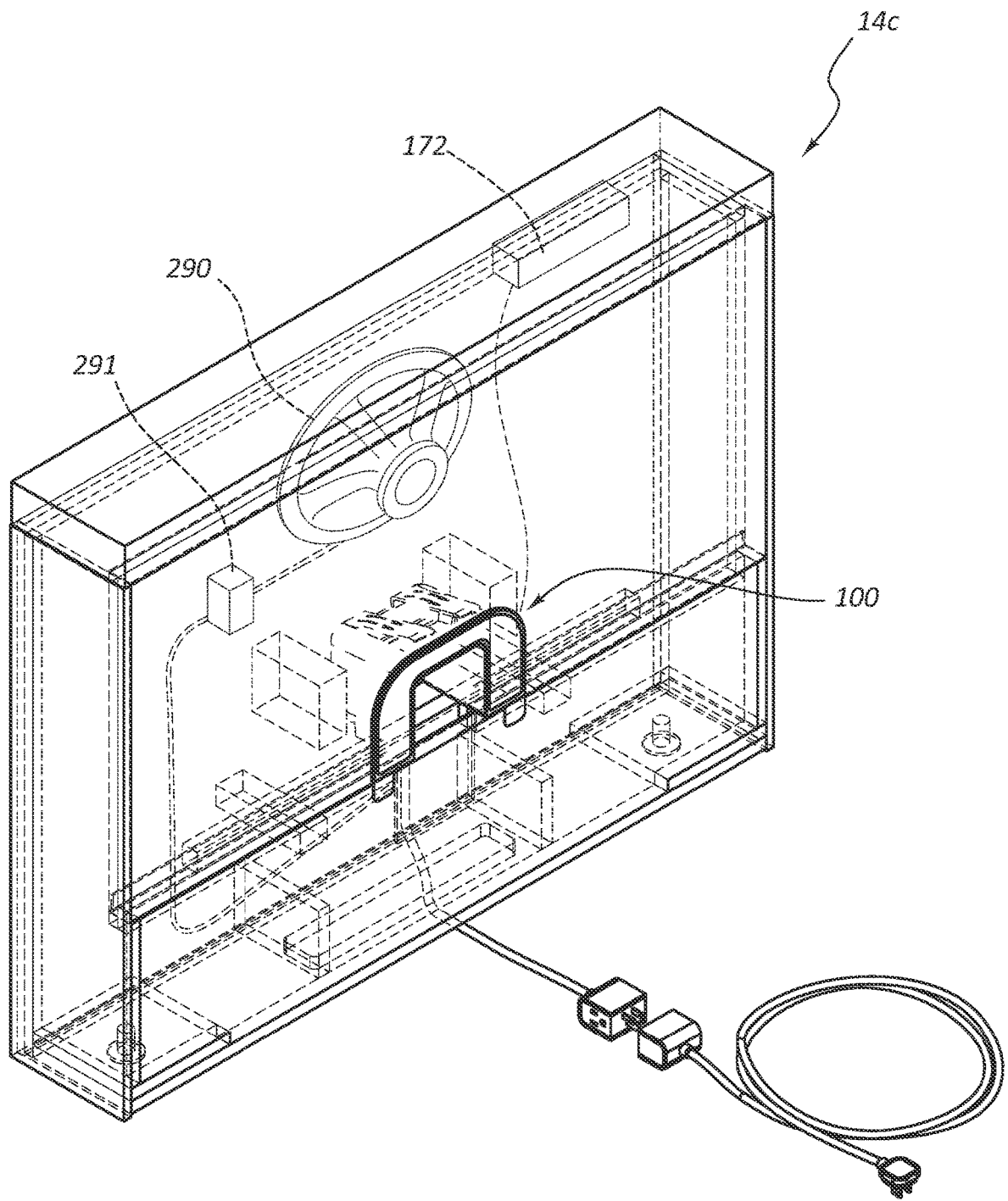
FIGS. 11-12 show alternate transverse members with alternate speaker locations.
Figure 12:
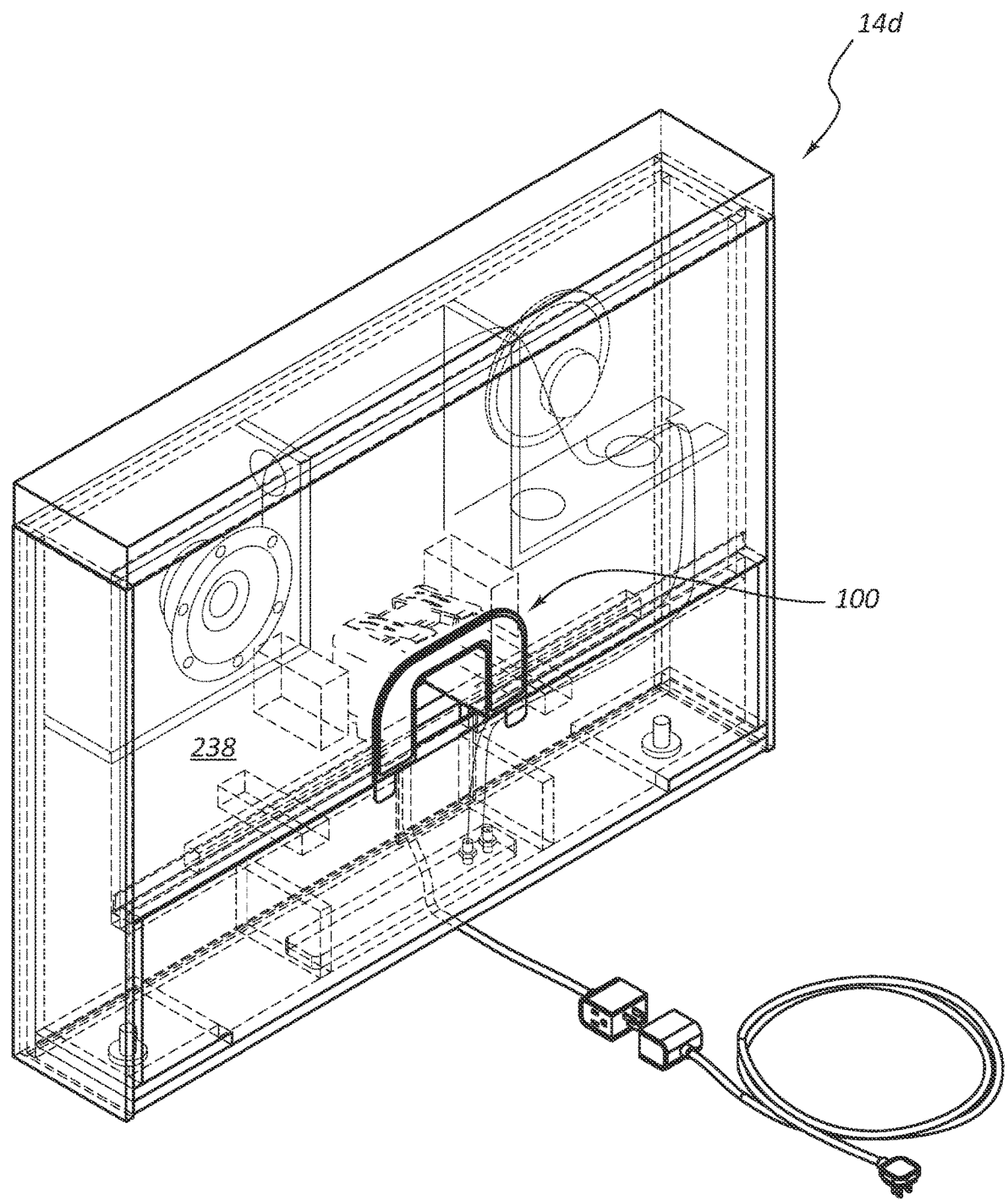

FIGS. 10-12 show alternate transverse members with speaker assemblies of the present invention. FIGS. 10, 11 and 12 illustrate differently configured transverse members 14b-14d in which the speakers embedded therein are differently positioned.

FIG. 10 shows a cutaway view of an alternative speaker-containing transverse member 14b, wherein the speaker 280 is pointing horizontally and away from the hub 100. Speaker 280 is coupled to the frame 282 (e.g., wood, plywood, fiberboard) of transverse member 14a, such that the speaker cone is adjacent a hole in the frame 282 and a corresponding hole in the foam cushioning material 284 adjacent the frame 282.

An induction charger 172 shown in FIG. 10 is mounted on an upper panel 286 of the frame 282 of the transverse member 14b, embedded within (or, optionally, adjacent) the cushioning material 288 on top of the upper panel 286 of the frame 284 of transverse member 14b, for example.

FIGS. 11-12 also show different speaker orientations for the transverse member speakers. It will thus be appreciated that numerous positioning possibilities are possible for positioning and orienting the speakers within transverse members 14c-d.

FIG. 11 shows another alternative which may include perhaps only a single speaker 290 within transverse member 14c which may be oriented and positioned in any desired orientation and position. Speaker 290 is electrically coupled to an amplifier 291 within the frame of the transverse member 14c. Thus, in some embodiments each speaker in each transverse member has its own associated amplifier mounted within the respective transverse member. In another embodiment, a single amplifier 217 for each speaker of the speaker system (all transverse members and base(s) is mounted within or on the housing 228 within base 12a. Where a dedicated amplifier 291 is provided for each speaker or speaker channel, the signal is transmitted through wiring as shown in FIG. 11 to amplifier 291 (and eventually speaker 290), or alternatively the signal is transmitted wirelessly, and power for amplifier 291 can be provided from hub 100 through appropriate wiring. Amplifier 291 sends an amplified signal to speaker 290.

An induction charger 172 is mounted on the upper portion of the frame of transverse member 14c in FIG. 11.

The speakers of FIG. 12 may be wireless speakers so as to receive signals through wireless transmission as described herein from audio receiver 217 and/or transmitter 224. Power for the speakers of FIG. 12 may be provided through a connection with hub 100.

It will thus be appreciated from FIGS. 9A-12 that numerous speaker placement and a number of speaker options are possible. For example, a stereo set up could be provided in which only left and right speakers are provided or a system including left and right speakers and a subwoofer, for example, a 2.1 system. While a single speaker for each channel (front left, front right, surround left, surround right) is principally shown and described, it will be appreciated that more than one speaker can be provided for any given channel (e.g., for front left, front right, left surround, right surround, subwoofer, center, etc.).

Figure 13A:
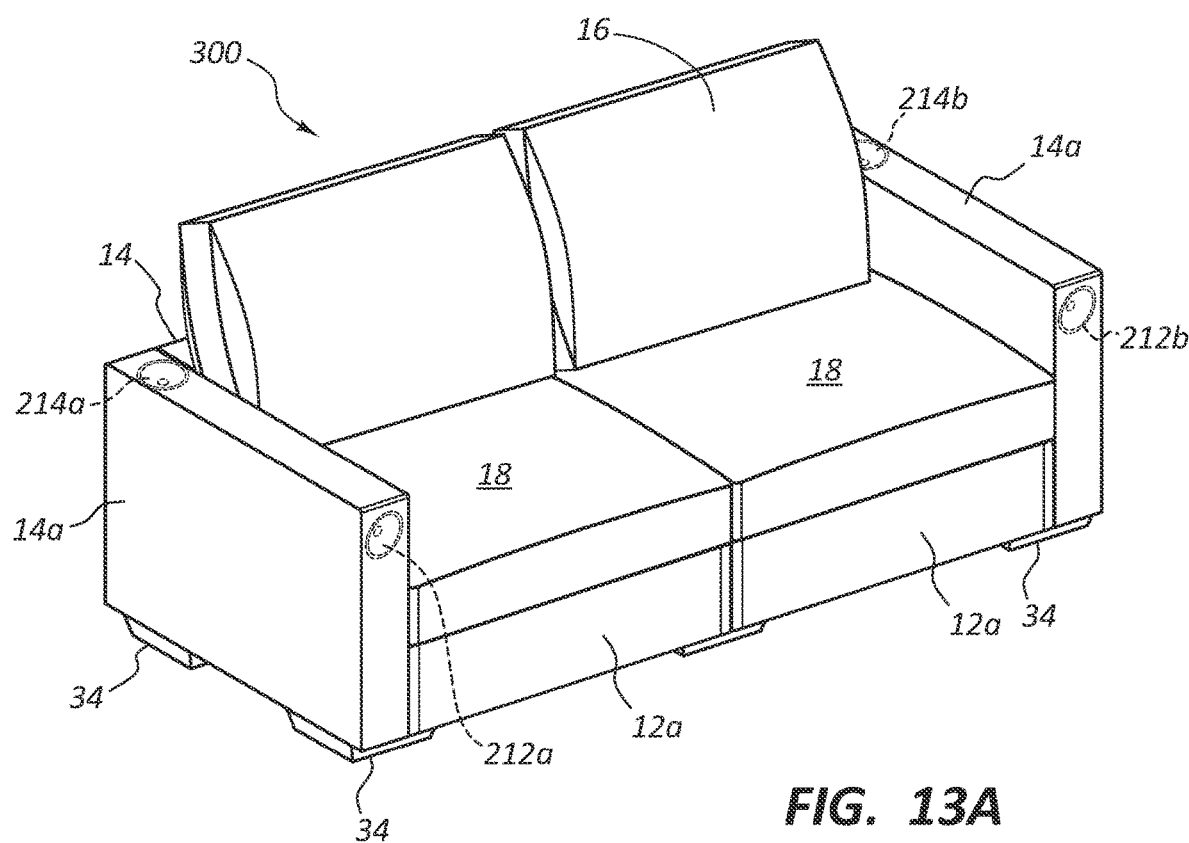
FIGS. 13A-B are perspective views of a sofa similar to that of FIG. 1a with audio speakers in the transverse members (armrests) thereof and subwoofer speakers in the bases thereof to form a surround sound speaker system, the speakers reflected in phantom lines.
Figure 13B:
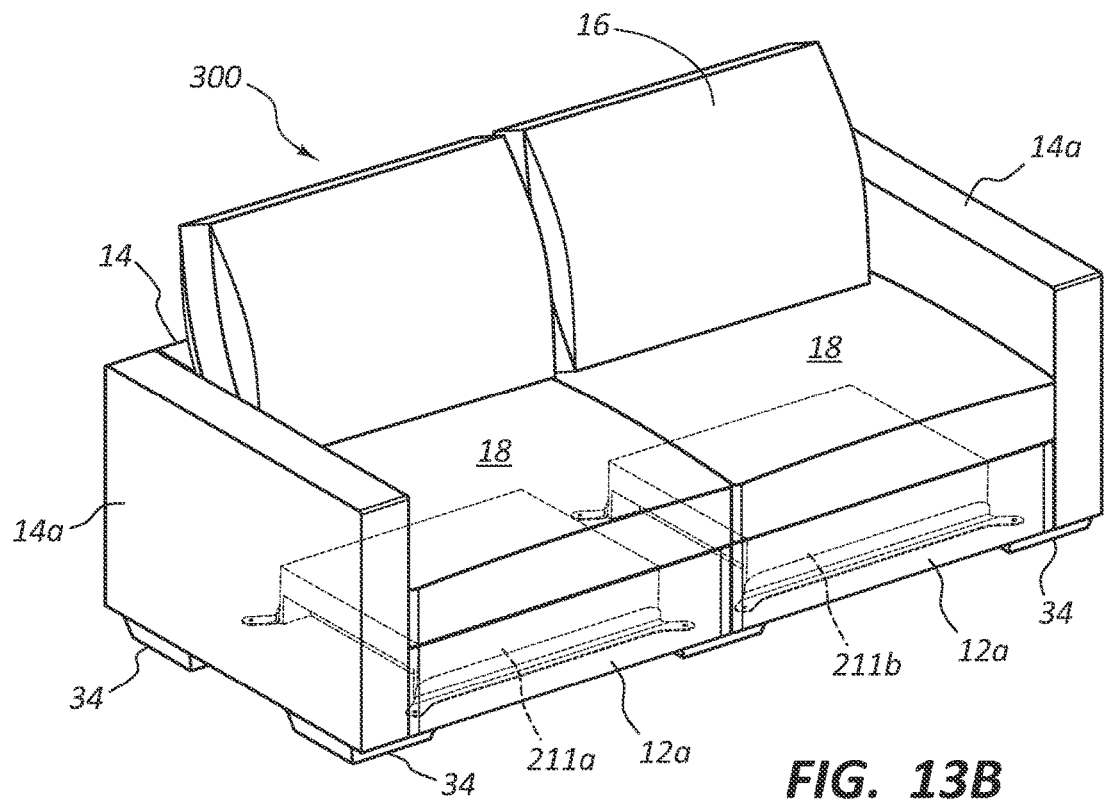
Figure 14:
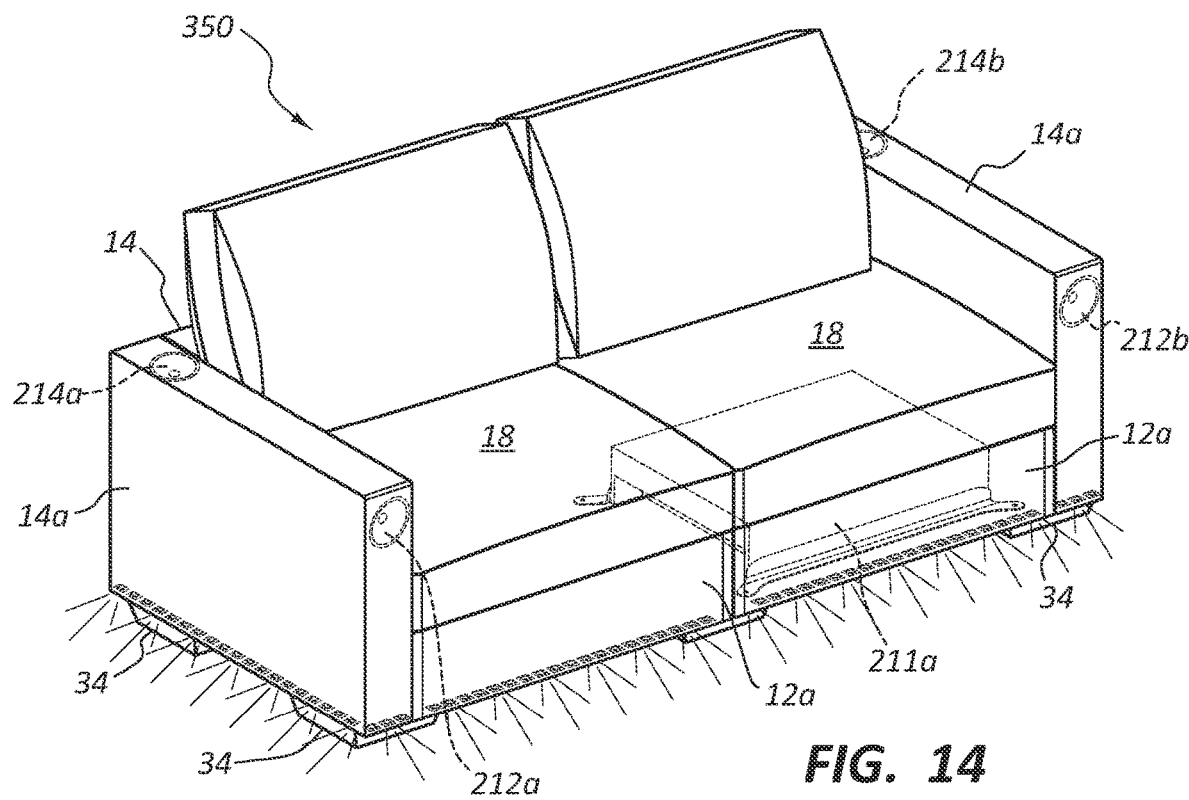
FIG. 14 shows a sofa similar to that of FIGS. 13A-13B. The sofa has night light motion sensors.

FIGS. 13A-14: Modular Sofas with Speakers

FIGS. 13A-13B are perspective views of a modular furniture system 300 of the present invention using the disclosure herein to form a sofa with audio speakers in the transverse members 14a (armrests) thereof and subwoofer speakers in the bases 12a thereof to form a surround sound speaker furniture system 300, the speakers reflected in phantom lines.

Front speakers 212a-b and rear, upwardly facing surround speakers 214a-b are each mounted in a respective transverse members 14a. As shown in FIG. 1B, surround speakers 214a and 214b are shown as being oriented upwards so that the sound directed therefrom may be directed towards the ceiling and reflected off the ceiling, the reflected sound potentially having the advantages of reflected sound, which may, in some embodiments, include improving the sound quality (e.g., creating a diffuse, surround sound).

Each of transverse member speakers 212a, 212b, 214a, 214b are positioned underneath the upholstery fabric of the covers 241, 243 (FIGS. 9A-9C) of the respective transverse member 14a in which the speaker is positioned. Each of these speakers may be tuned so that output from a given speaker accounts for transmission of the sound waves through the upholstery fabric associated with transverse member 14a before reaching the user seated on sofa 300.

Positioning of speakers 212a, 212b, 214a, and 214b is also advantageous as the speakers are positioned in transverse members 14a in a manner such that a user seated on sofa 300 typically will not obstruct sound emanating from any of these speakers.

The particular positioning and orientation of the speakers shown in FIGS. 13A-13B may advantageously create a realistic surround sound environment in which sound from front speakers 212a and 212b is intentionally reflected off a front surface, such as a front wall, television or similar structure, disposed in front of a seated viewer. Sound from rear surround speakers 214a and 214b is similarly directed upwardly toward the ceiling so as to be reflected back down toward a seated viewer sitting on sofa 300, the front and/or ceiling reflected sound potentially having the advantages of reflected sound, which may, in some embodiments, include improving the sound quality, creating a surround sound experience.

The speakers embedded in base member 12a and/or transverse member 14a can be switched or swapped as a user wishes to reconfigure the modular furniture assembly of sofa 300. For example, if a user wished to reconfigure sofa 300 so as to include more or less base members and/or more or less transverse members 14a, the user can simply disassemble that part of sofa 300 and include additional base members 12a and/or transverse members 14a (or remove such), as desired.

Because the speakers are positioned within such modular furniture assembly components, this provides great flexibility to a user in where the speakers can be positioned within a built furniture assembly. For example, any of the furniture assemblies shown in any of the applications already incorporated by reference can be modified to swap out any of the bases or transverse members with bases 12a including a subwoofer, or transverse members 14a including speakers, or any combination thereof. Such modularity of the furniture system thus allows the user extreme flexibility in where the speakers are provided, hidden within the furniture assembly. The modularity of the subwoofer assembly in base 12a can also allow a user to remove the assembly from one base, and install it in another base, if desired.

For example, the modularity of the system allows a user to place base members 12a and transverse members 14a in any place desired. Some base members 12 and some transverse members 14 may be provided which do not include any speakers positioned therein, allowing the user to use these component pieces in configuring any desired modular furniture assembly configuration they desire.

In order for an end user to set up sofa 300 (or system 200 or system 350), no tools are required because the speakers are already mounted within respective base members and transverse members, and wiring can be connected without the use of complicated tools. Therefore, the sofa 300 with its electronic assembly members is highly advantageous, efficient and useful.

FIG. 14 shows a furniture system 350 that is similar to sofa 300 of FIGS. 13A-13B. The sofa 350 has night light motion sensors (i.e., lighting which is motion activated) mounted on the underside of the base 12a and/or transverse members 14a thereof.

FIG. 14 thus illustrates another embodiment of a modular audio enhanced furniture system in the form of sofa 350 which includes motion activated night lights. For example, LEDs or other lights may be embedded or otherwise provided on or within the bottoms surfaces of the frames of base members 12a and/or transverse members 14a so as to illuminate all or a portion of a perimeter of sofa 350 when desired by a user. For example, such lighting may be motion activated so as to illuminate when a user approaches the sofa within any given distance.

Power for such lights may be provided through any of the hubs 100 associated with transverse members 14a as described herein. Such a configuration may provide a night light system which may illuminate an area around sofa 350 in an otherwise dark room, aiding a user in navigating through the room at night or otherwise.

Such lighting may also be desired in other environments where a user is using sofa 350, for example, while watching a movie or other program on a television or other display in a dimly lit room.

Modular furniture assembly 350 is highly useful in a variety of different settings and includes electronic devices embedded in leisure seating such as in upholstery couches, modular seating, sectionals and the furniture known as Sectionals. While illustrated with audio components in the furniture assembly in addition to the motion activated night light system, it will be appreciated that a furniture system without audio components could include the motion activated night light system.

FIG. 14 illustrates an embodiment that might be considered as a 4.1 or 4.2 speaker system, including a front left, a front right, a left surround, and a right surround speaker with a subwoofer speaker 210a embedded in at least one of the bases 12a. Where one subwoofer speaker 210a is included (thus one base 12a, and one regular base 12), a 4.1 system results. If both bases are bases 12a including subwoofer speakers 210a, a 4.2 system can result (e.g., particularly where the subwoofers produce independent sounds). The two subwoofer speakers may produce the same, or different sounds (e.g., 1 or 2 channels).

While no dedicated center channel speaker is illustrated in FIG. 14, it will be appreciated that a virtual center speaker can be provided through sound signals sent to front speakers 212a and 212b (i.e., a virtual center channel can be mimicked by the stereo of speakers 212a and 212b). In another embodiment, a dedicated center channel speaker can be positioned under or above the television, behind a perforated screen, or incorporated into a television, or other display device. A center rear channel can be similarly imitated using right and left surround speakers 214a and 214b, or mounted on a rear wall, as desired, to create 5.1 or 6.1 systems. 7.1 systems or other configurations (e.g., Dolby Atmos) could similarly be provided for.

As shown, sofa 350 includes speakers or other audio components embedded in leisure seating which includes upholstery couches, modular seating, etc. Sofa 350 provides excellent stereo or surround quality sound and provides a high fidelity surround sound experience.

The speakers are hidden from the view of the user and customers within the wooden framing portions of the base 12a and/or transverse member 14a and can be hidden under covers surrounding the wooden framing.

Wiring Diagram

Figure 15A:
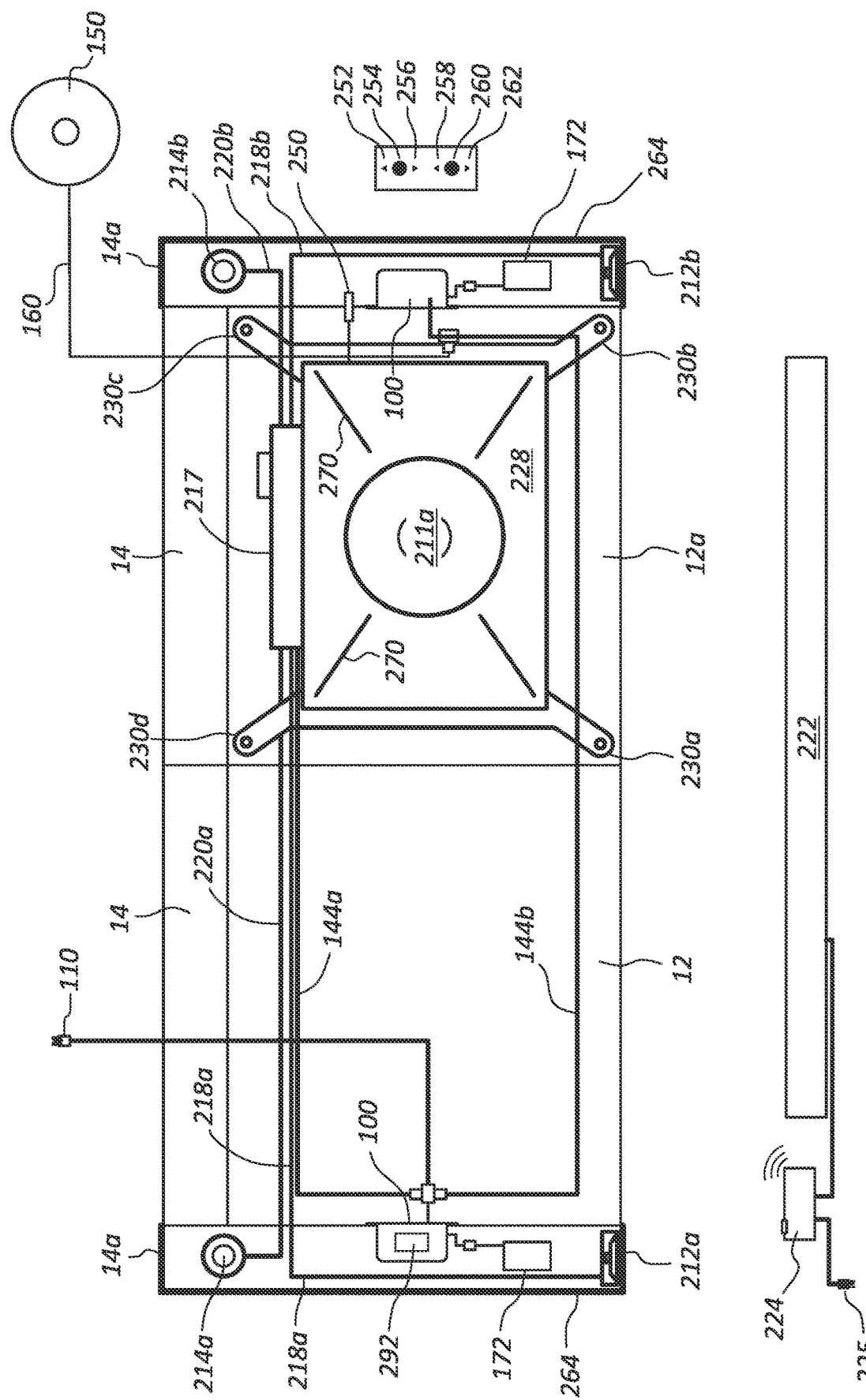
Figure 15C:
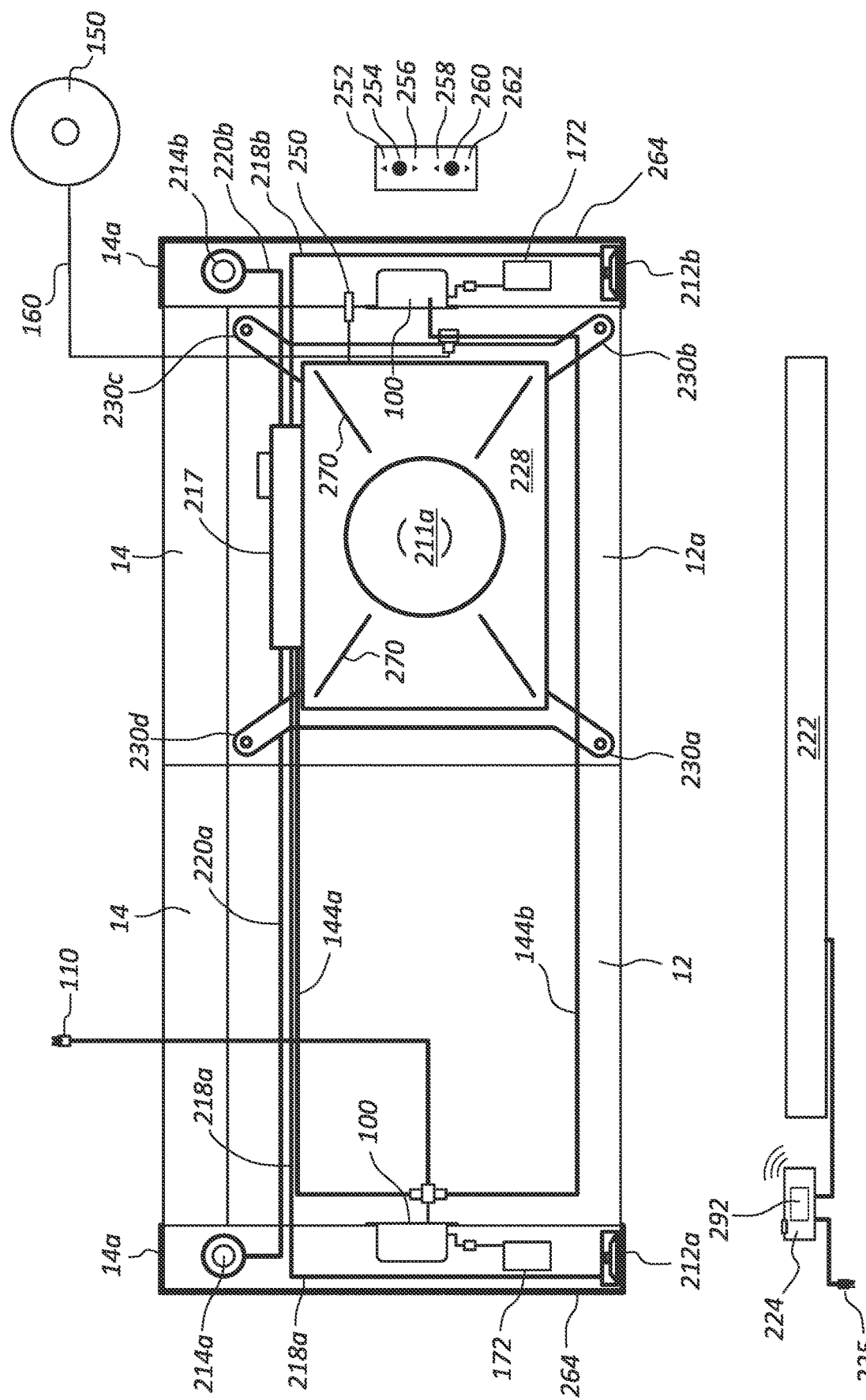
Figure 15D:
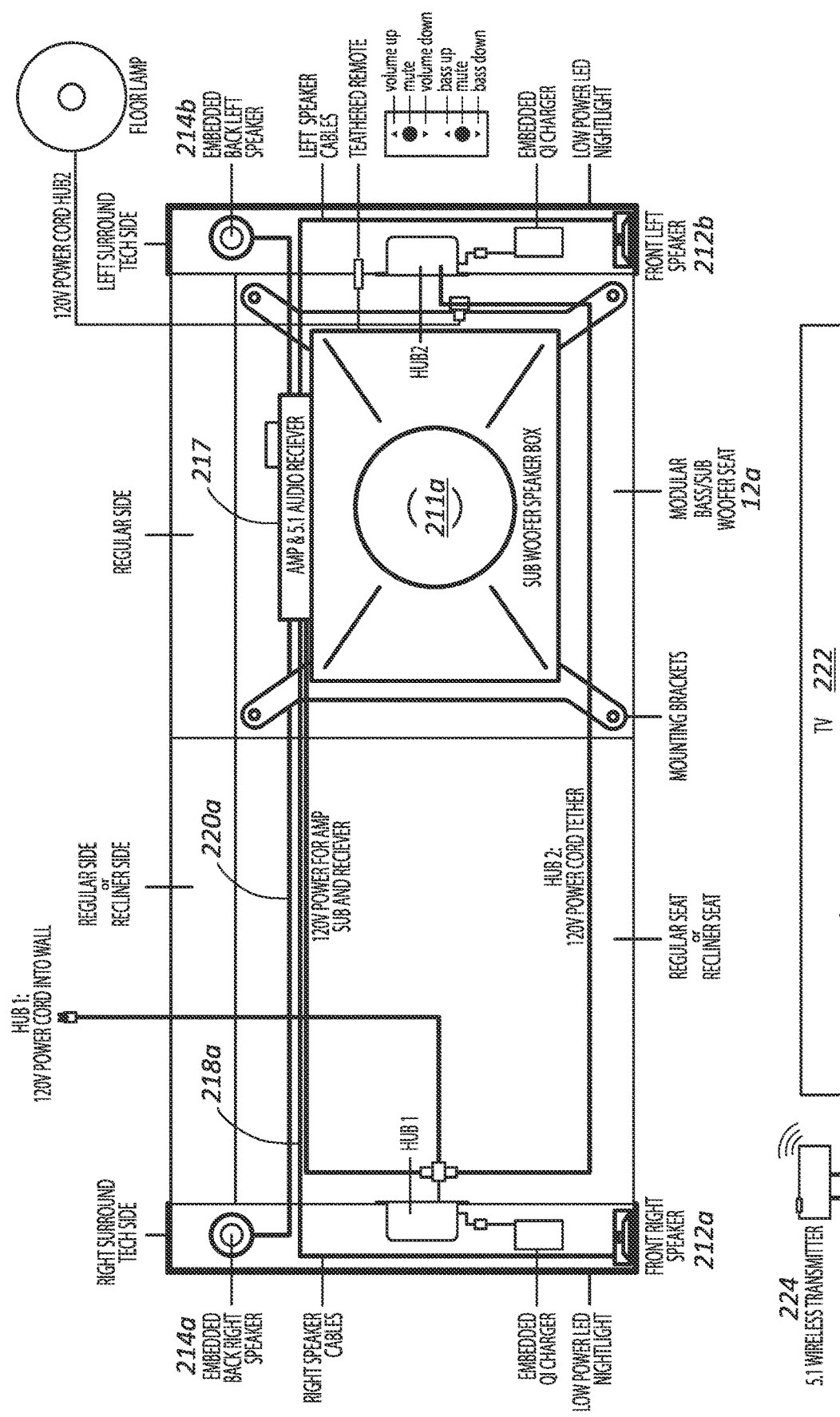
FIG. 15D is another version of the wiring diagram of FIGS. 15A-15C with text descriptions for certain elements identified in the wiring diagram.

FIG. 15 shows an example of a wiring diagram to be used in conjunction with the furniture system 300 or 350 in the form of the sofa of FIGS. 13A-13B or FIG. 14. A table identifying certain elements of the wiring diagram of FIG. 15 is shown below.

FIG. 15 Reference Numbers and Components

| Component | Reference Number |
|---|---|
| Base with subwoofer | 12a |
| Regular base or recliner seat | 12 |
| Transverse member with front and surround speaker | 14a |
| Regular transverse member | 14 |
| Electrical Hub | 100 |
| Hub power cord (e.g., 120 volt) | 110 |
| Power cord for amplifier/receiver 217 | 144a |
| Power cord tether for electrical Hub | 144b |
| Floor lamp | 150 |
| Power cord for floor lamp, connected to hub | 160 |
| Qi induction charger | 172 |
| Subwoofer driver | 211a |
| Front right speaker | 212a |
| Front left speaker | 212b |
| Right surround speaker | 214a |
| Left surround speaker | 214b |
| Multi-channel amplifier and/or audio receiver | 217 |
| Front right speaker wire/cable | 218a |
| Front Left speaker wire/cable | 218b |
| Right surround speaker wire/cable | 220a |
| Left surround speaker wire/cable | 220b |
| TV or other display | 222 |
| Wireless transmitter (e.g., 5.1) | 224 |
| Power cord into wall | 225 |
| Subwoofer enclosure | 228 |
| Mounting brackets | 230a-b |
| Tethered Remote | 250 |
| Volume up function on remote | 252 |
| Mute function on remote | 254 |
| Volume down function on remote | 256 |
| Bass volume up function on remote | 258 |
| Bass mute function on remote | 260 |
| Bass volume down function on remote | 262 |
| Low power LED night light from Hub | 264 |

FIG. 15 illustrates an exemplary wiring diagram for a modular furniture assembly, including a surround sound system positioned therein, such as that shown in FIGS. 1A-1B, 13A-13B, and 14. As shown in FIG. 15, wiring may be provided within the modular furniture assembly to provide signals and/or power to each of speakers 212a, 212b, 214a and 214b.

In the illustrated configuration, amplifier 217 is disposed within base member 12a. Amplifier 217 may be a multi-channel amplifier and/or an audio receiver including such an amplifier and is illustrated as being disposed within base member 12a, for example, adjacent to subwoofer 210a, e.g., mounted on or within housing 228.

As further shown in FIG. 15, wiring 218a and 218b may provide audio signals from amplifier 217 to front right speaker 212a and front left speaker 212b. In the illustrated configuration, the signal sent through wiring 218a and 218b is already amplified as shown.

In an alternative configuration, a signal may be sent from an audio receiver 217 to front right and front left speakers 212a in an 212b in an unamplified configuration where amplification occurs at the speaker 212a or 212b. Unamplified signals can be sent through a wired or wireless connection, as desired.

FIG. 15 further shows wiring 220a and 220b extending from amplifier 217 to right surround speaker 214a and wiring 220b extending from amplifier 217 to left surround speaker 214b. Power for amplifier 217 is provided through electrical connections shown in FIG. 15, for example. For example, power from plug 110 (FIG. 5) may connect to hub 100 and amplifier 217 is in turn plugged into an outlet associated with hub 100, providing power thereto.

In one embodiment, amplifier 217 amplifies at least the subwoofer speaker. In another embodiment, amplifier 217 amplifies the subwoofer speaker and the other speakers, e.g., the transverse member speakers. In another embodiment, the subwoofer may include its own internal amplifier, and amplifier 217 may amplify the other speakers (e.g., speakers 212a, 212b, 214a, 214b) in the furniture assembly. In yet another embodiment, amplifier 217 amplifies the subwoofer speaker and each of transverse member speakers has its own amplifier associated with that speaker.

FIG. 15 shows how additional components may also be powered by hub 100 and/or additional hubs that are present within any of transverse members 14/14a. For example, FIG. 15 shows power being provided from a hub in the right transverse member 14a to the qi (induction) charger 172.

FIG. 15 further shows power from a second hub in left transverse member 14a to another qi charger, as well as to a floor lamp 150. Additional components can be plugged into or otherwise powered by either of such hubs. For example, FIGS. 15-15A show a tethered remote 250 that may be used to provide control over volume (252, 256), the ability to mute (254), the ability to adjust specific frequencies, for example, base up (258) or base down (262), or bass mute (260).

As shown in FIG. 15, one or more of base members 12 may further include a recliner seat whereby power for such recliner could be provided by any of the shown hubs.

FIG. 15 further shows a television 222 or other display. Such a display is positioned or mounted on a front wall in front of sofa 300, 350, allowing a user seated on the sofa to watch television while listening to surround sound provided through the speakers associated with sofa 300 or 350.

In one embodiment, a transmitter 224 is provided at the TV 222, such as a wireless controller transmitting signals for audio through a wireless transmitter to the speaker system of sofa 300 or 350.

For example, as further shown in FIG. 15, it is possible to provide the signals to amplifier or receiver 217 (or wireless speakers 212a, 212b, 214a, 214b themselves) of sofa 300 or 350 through a wireless transmitter 224, for example, shown associated with television 222. Such a wireless transmitter 224 is plugged into the wall at 225 so as to be powered therefrom. Signals from wireless transmitter 224 are wirelessly transmitted to amplifier and/or audio receiver 217 in sofa 300 or 350. Wireless transmission of such audio signals and/or control signals can be through Blue-tooth, WiFi, IR, Wireless Speaker and Audio Technology (WISA) or other mechanisms. Receiver 217 can be used to receive communication from wireless controller/transmitter 224, or a smart phone or tablet app, or the like.

In one embodiment, a wired connection can be provided between a transmitter component 224, and amplifier or audio receiver 217, although wireless transmission as illustrated may be advantageous as no wire or cord is thus required between the location of transmitter 224 and amplifier or audio receiver 217 disposed within sofa 300 or 350.

The hubs 100 provide power to the electronic furniture assembly system of sofa 300 or 350, as well as all of the speakers, components and electronic devices associated with sofa 300 or 350.

As a result of the configuration of sofa 300 or 350, the various transverse members, bases and their associated speakers and electronic components can be removed and upgraded as other speaker systems or electronic components are available.

In one embodiment, the furniture system of the present invention also includes an audio receiver/sound bar and a bridge electrically coupled to the television in order to communicate sound to the speakers of the sofa 300 or 350.

The speakers mounted within the base and transverse member, in addition to providing invisibility from a user/customer, also provides an opportunity for high quality sound. The base and transverse member each provide a large enclosure volume within which the speaker sound can resonate to provide high quality sound while using no additional footprint other than that of the sofa itself.

As shown in FIG. 15, base 12a may further comprise support beams within subwoofer enclosure housing 228, the support beams being reflected at reference numbers 270 in FIG. 15. Support beams are mounted between the upper and lower portions of the enclosure housing 228 so as to provide support within a cavity 226 to prevent any damage to speaker 210a. In one embodiment, a receiver or amplifier 217 is mounted on or within the subwoofer housing 228 of base 12a, which has power in and amplified signal outputs.

FIG. 15A is another example of the wiring diagram of FIG. 15 with text descriptions for certain elements identified it in the wiring diagram.

Figure 16:
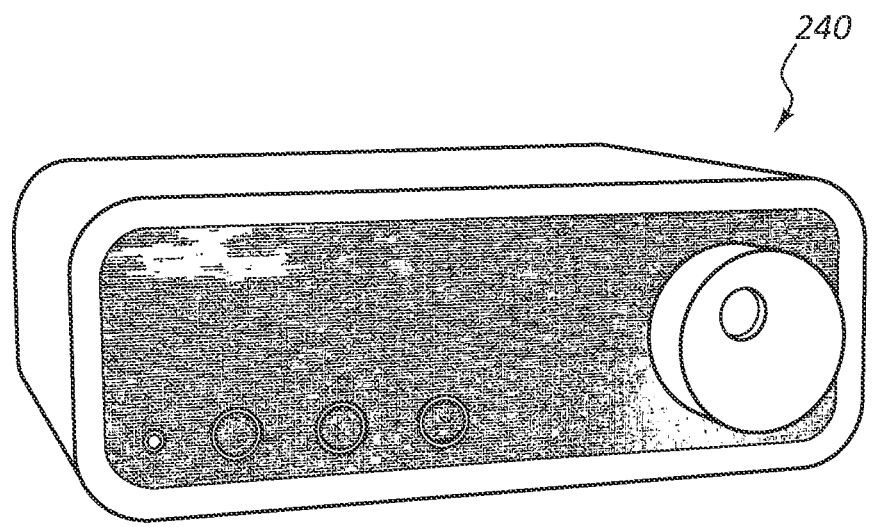
FIG. 16 is a perspective view of a controller or transmitter of the present invention.

FIG. 16: Controllers for Controlling Speakers and Other Components

FIG. 16 is a perspective view of a controller 240 of the present invention. Any of various control mechanisms and components can be provided with the surround sound systems described herein. FIG. 16 shows an exemplary control component 240. Such a component may include one or more knobs, dials, or other controls that a user may use to control various aspects of the sound or other environment.

For example, a user may control overall sound volume, sound volume of one or more of the speakers, frequency boosting (or attenuation) of one of more frequency bands associated with any of the speakers, or other controls that a user may desire to manipulate. Such a control component 240 may transmit signals or instructions through an electrical wired connection or wirelessly from a location that is remote from sofa 300 or 350, for example, adjacent television 222 or elsewhere.

A user may be able to pick up and move such a control component 240 anywhere desired. For example, they may pick it up and take it over to the couch where it may left, if desired, so as to allow control at that point.

In other embodiments, control of any of the desired parameters may be provided through a cellular phone app (smart phone app) or other software application that can be provided in any desired interface. For example, in the smartphone portable device, tablet, or other device accessible to the user which may wirelessly transmit control signals to the receiver 217 or other component, then implement any desired changes to parameters as instructed by a user. Receiver 217 may be capable of receiving and/or transmitting through WiFi, Blue-tooth, or other wireless system, so as to communicate with such an app, to communicate with transmitter 222, etc.

In some embodiments, the audio receiver and/or amplifier 217, which may be positioned within the base member 212a, may include some knobs and/or buttons for controlling any desired parameters thereon. For example, volume controls for each of the speakers could be provided thereon.

Such controls may allow a user to manipulate levels of the different speakers within the surround sound speaker system. For example, where a user wants to calibrate speaker levels of a given surround sound speaker or a given front speaker, or a given subwoofer, controls for increasing or decreasing the sound volume associated with any given individual speaker may thus be provided, allowing a user to make such calibrations or changes.

For example, depending upon the furniture configuration built by the user, a user may wish to boost or attenuate a right front speaker, a left front speaker, a right surround speaker, or a left surround speaker, as numerous furniture assembly possibilities are possible with the modular furniture assemblies.

For example, where a surround speaker or a front speaker may be further away from a given seating position as compared to another surround speaker or another front speaker, a user may wish to boost or decrease volume output from one or more such speakers to even out or calibrate sound volumes from the pair of front, the pair of surround speakers, or across all speakers at a given seating location. Controls as described herein may allow the user to do such.

The speakers and other electronic components of the present invention can be controlled through a variety of different control mechanisms, such as control mechanisms embedded within the sofa, e.g. within the base and/or transverse members or through a controller connected by an electrical cord to the base and/or transverse members or through a remote or wireless setting, such as through the use of a personal cellular phone (e.g., smart phone or tablet). The speakers and other electronics can thus be controlled wirelessly, e.g. through Blue-tooth, WiFi, through internet connections or other wireless connection means. In one embodiment of the present invention, there is no delay through the WISA. For example, sound and video may be correlated to ensure no lip synch problems between produced sound and images (e.g., sound and/or video may be intentionally delayed to ensure proper synchronization).

In one embodiment, a central transmitter such as controller 240 is employed, having a volume knob, wireless communication, ability to select and employ stereo, 4.1, 5.1 etc. with various input capabilities, including an auxiliary port in the jack.

Remote control for the speakers or other audio components or electronic components may be embedded within the furniture system 300 or 350, e.g. within the transverse member 14a or base 12a. Examples of control include wireless control and tethered control. Parameters that can be controlled include volume for the 2.0 system, 2.1 system, the 4.1 system, volume for the 5.1 system, etc., mute, volume level and intensity control.

As mentioned, in one embodiment, a software application is employed to control the electronic devices such as the speakers and other electronic components within sofa 300 or 350 or other devices in the present invention. The software application may be designed to control within the speakers and other electronic components (e.g., television, lamps, etc.) the volume, power, mute, balance, bass/treble, or other features of the system. The software application can also be used for the lights within the sofa, e.g. the tract lighting or LEDs or other lighting features, e.g., lighting power off and on, and can provide sound performance tracking, recliner settings, temperature settings, dimming/controlling lighting fixtures, television channels, and other user preferences.

In another embodiment, a software application may be used to control the speakers and other electrical components. Such software application may have a variety of different features and settings. In on embodiment, the software application controls speaker volume, TV volume, powers the speakers, power for the TV, mute, balance, bass/treble, lights on/off, sound performance tracking, recliner settings, temperature, dimming/controlling of lamps and other lighting, TV channels, etc.

Figure 17:
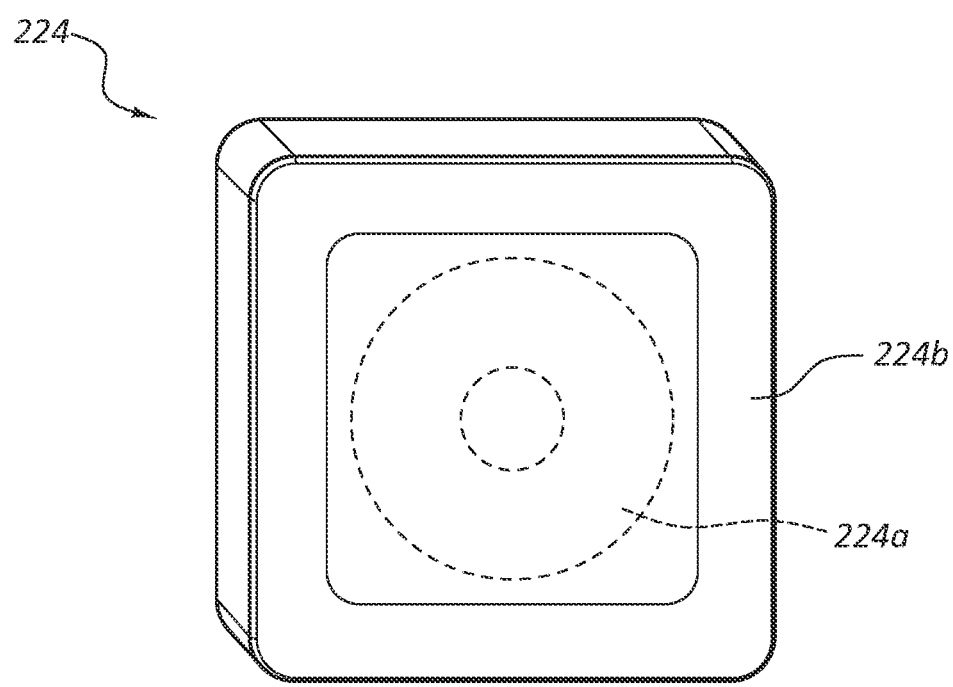
FIG. 17 is an example of a wall-mountable controller or transmitter of the present invention having a speaker (e.g., a center channel speaker).

FIG. 17: Transmitter with Speaker

FIG. 17 shows another example of a transmitter 224 of the present invention, which includes a speaker, for example a center channel speaker, incorporated therein. Transmitter 224 may serve similar functions as controller 240 of FIG. 16 and could be mounted below, or above or behind television or other display 222. In one embodiment, incorporating the center channel speaker 224a into the same housing 224b which houses the transmitter assembly of transmitter 224 simplifies the overall speaker system. Thus, in one embodiment of transmitter 224, the center channel is in the same housing 224b as the controller mechanism.

In another embodiment, transmitter 224, including a built-in channel speaker, can be configured to be wall mounted. For example, it may include mounting structure for such wall mounting.

In one embodiment of the present invention, the furniture assembly can be used as a bed having speakers and other electrical components embedded therein. For example, in one embodiment, base 12a can be used as a bed having speakers integrally mounted therein. Base 12a can be sized large enough to serve as a bed. For example, base 12a can be a stand-alone bed and/or can serve a box spring on which a cushion, such as cushion 18 can be mounted, the combination of base 12a and cushion 18 serving as a bed, wherein the base 12a and cushion 18 are configured to be large enough to serve as bed. A bed of the present invention having one or more speakers therein can thus be comprised of base 12a and/or base 12a and cushion 18. In another embodiment, multiple speakers can be placed within the bed. The present invention thus relates to a variety of different types of furniture having electronic components such as speakers, rechargers, power systems and other electrical components embedded therein.

Artificial Intelligence/Intelligence Augmentation

An embodiment can include artificial intelligence (e.g., such as SIRI, ALEXA, or the like) positioned within or configured for use with the modular furniture assembly. For example, such artificial intelligence could be positioned within the hub, elsewhere within the transverse member, within the base member, or in a transmitter located at or near a TV. FIGS. 15A-15C illustrate three such possible placements. For example, in FIG. 15A, the AI module 292 is shown integrated or positioned within one or more of hubs 100. In FIG. 15B, the AI module 292 is shown integrated or positioned with amplifier 217, or on or within enclosure 228. In other words, the AI module 292 can be included on or within the speaker system components included in base member 12a. FIG. 15C shows another possible alternative, with the AI module 292 positioned on or within the transmitter 224 at or near TV 222.

Such artificial intelligence (AI) can be configured to accept and/or respond to voice or other commands provided by a user. Such AI can be configured to control any function (e.g., volume levels, channels, pause, etc.) associated with the other systems that can be incorporated into the furniture system. In an embodiment, such AI can be configured to control various other components that may not necessarily be incorporated into the furniture system (e.g., implementing a voice command or other command to turn on or off the television, or the like).

By way of further example, the furniture system can be configured for compatibility with Apple Home Kit or similar systems, to accommodate voice control and/or other AI control mechanisms.

Such AI can comprise a command center (e.g., positioned within or accessible from the furniture assembly) that allows control of home or other lighting, control of a television, radio, sound system, or other component. Such AI command center can be configured with a control panel built into the transverse member (e.g., positionable into the cavity of the transverse member), similar to the electrical hub as described herein. As shown in FIG. 15A, the AI command center can be included within at least one of electrical hubs 100. In another embodiment, such an AI command center could be independent of hub 100, but provided in a manner so as to similarly be positionable within the same cavity of the transverse member into which hub 100 is received.

However situated, such AI may provide for voice activated control of any component of the furniture assembly, or other components, that may not specifically be included with the furniture assembly, such as room lights, a TV, HVAC, window shades, or the like.

Such AI can be SIRI or Alexa enabled, e.g., so that a user could ask SIRI or ALEXA to turn on the sound, turn up the sound, turn down the sound, turn on the TV, turn off the TV, dim the lights, turn on the lights, close or open the window shades, or the like.

Such AI of the furniture assembly could include learned or preprogrammed settings, such as room temperature (automatically activating HVAC to heat or cool the room), volume levels, recliner position or other settings, and other configuration settings. For example, the AI may provide the ability for a recliner or other component of the furniture assembly to configure itself (e.g., by voice command) based on past settings implemented by a user. Such learned settings could be per each individual in the home. For example, the AI can recognize the particular individual through voice recognition, or other mechanism, and then apply the particular individual preferences for any given parameters capable of control through the AI.

The AI can be configured to provide timed or timer settings, e.g., such as providing for LED or other illumination at night (e.g., from sunset to sunrise), optionally based on live data provided to the AI. For example, the AI could illuminate a night light within the furniture assembly, or elsewhere within the room or home based on a timed setting, e.g., illuminating the night light at or within a given time of sunset (e.g., 30 minutes after sunset), until a given time relative to sunrise (e.g., 30 minutes before sunrise). Motion sensing could also be incorporated into such a night light, as described elsewhere herein, in combination with the AI control of such night light or other functionality.

Selectively Dockable Speaker

Figure 18:
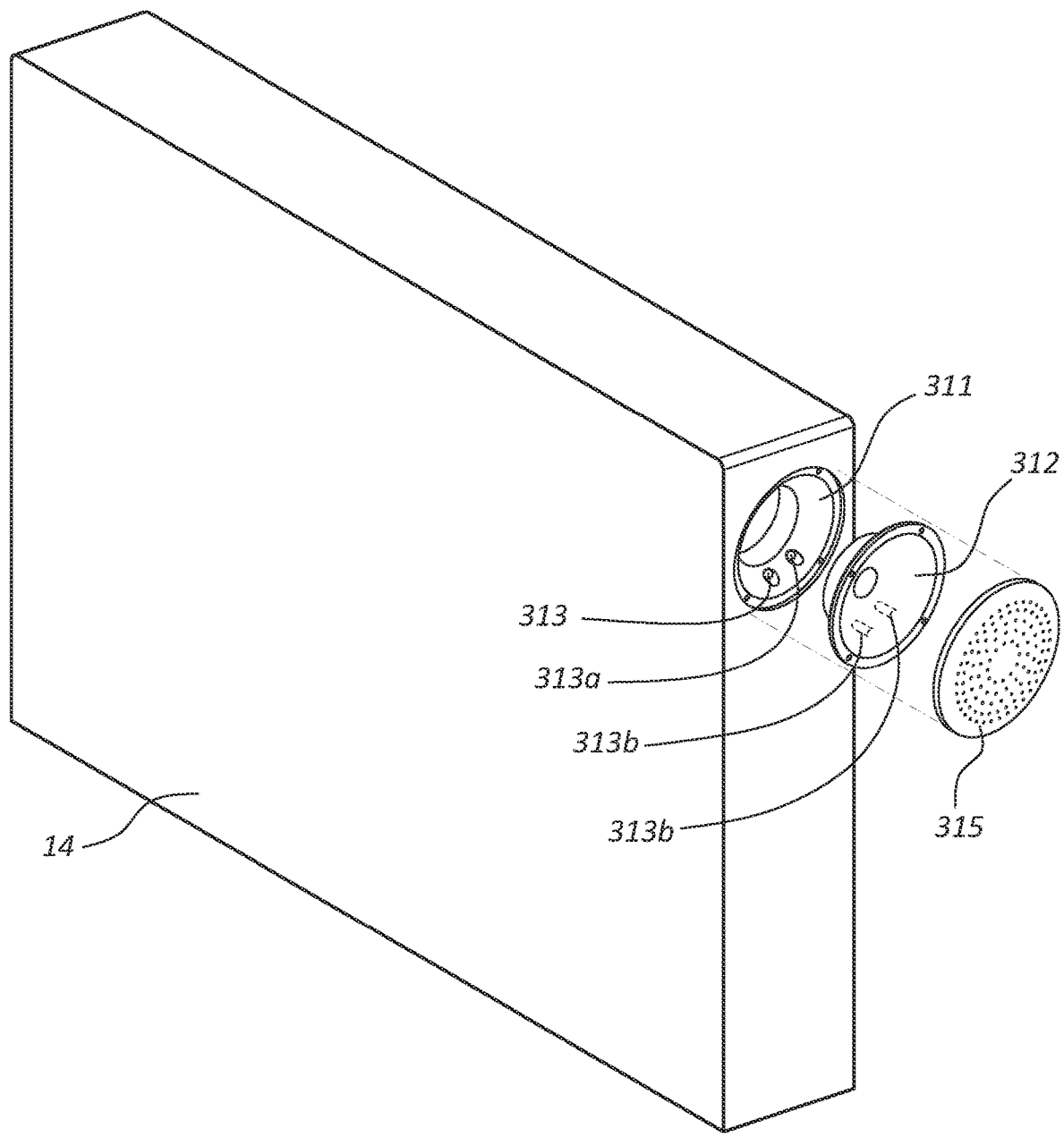
FIG. 18 schematically illustrates an easy-in, easy-out dockable speaker that may be selectively dockable into a portion of the furniture assembly.

FIG. 18 illustrates how a transverse member 14 can include a dockable speaker receptacle 311. As illustrated, transverse member 14 of FIG. 18 includes a receptacle 311 into which speaker 312 can be selectively docked. Receptacle 311 is shown as including contacts 313a, for providing electrical power and contact to corresponding contacts 313b on speaker 312. For example, such electrical contact could be provided through internal wiring, running back to hub 100 (see FIGS. 15A-15C). A speaker grill or other cover 315 can also be provided. Such a dockable speaker 312 may be configured for positioning in the transverse member 14, over any fabric cover of transverse member 14. In another embodiment, the speaker 312 could be docked into receptacle 311, and then a fabric cover associated with member 14 could be positioned over member 14. Such a configuration may be preferred where it is desired to hide the speakers.

While transverse member 14 is shown as including one dockable speaker 312, it will be appreciated that any of the speakers described herein (e.g., 212a, 214a, 212b, 214b, 210, or the like) could be configured as a selectively dockable speaker. Such selective removability can allow a user to remove a speaker, e.g., where it is desired to upgrade a speaker, customize the speaker locations, or the like.

Docking of speaker 312 may not require any tools (e.g., not even a screwdriver, hammer, or the like). For example, speaker 312 can be configured to simply friction fit into place, or to provide a snap fit into receptacle 311, providing electrical contact between contacts 313a and 313b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An artificial intelligence-enhanced furniture system, comprising:
   (i) an assemble-able furniture assembly comprising:
      (A) a base; and
      (B) a transverse member;
   (ii) an electrical hub configured to be mounted within a cavity of the transverse member, the electrical hub comprising an installation clip that removably secures the electrical hub within the cavity so that the electrical hub is hidden from view; and
   (iii) artificial intelligence positioned within the furniture assembly, the artificial intelligence comprising a command center positioned within the electrical hub so that:
      (A) the command center is hidden from view;
      (B) the command center is removably secured within the furniture assembly along with the electrical hub; and
      (C) the command center can be repositioned within the furniture assembly by rearranging the position of the transverse member relative to the base.

2. An artificial intelligence-enhanced furniture system as recited in claim 1 wherein the artificial intelligence receives electrical power from the hub.

3. An artificial intelligence-enhanced furniture system as recited in claim 1, further comprising a speaker system positioned within the furniture assembly, wherein the artificial intelligence is configured to control the speaker system through voice commands provided by a user.

4. An artificial intelligence-enhanced furniture system as recited in claim 1, wherein the furniture assembly has a configuration such that the length X of the base and the length X' of the transverse member are equal to each other and wherein the length X of the base is equal to the width of the base plus the width of the transverse member, such that X=X'=Y+Z.

5. An artificial intelligence-enhanced furniture system as recited in claim 1, further comprising one or more lights on a bottom surface of the base and/or transverse member.

6. An artificial intelligence-enhanced furniture system as recited in claim 5, wherein the one or more lights are configured to be controlled by the artificial intelligence.

7. An artificial intelligence-enhanced furniture system as recited in claim 1, wherein the artificial intelligence is configured to control a component of the furniture assembly, a television, or another component that is not part of the furniture assembly, through voice command.

8. An artificial intelligence-enhanced furniture system as recited in claim 1, further comprising:
a speaker system positioned within the furniture assembly; and
an amplifier for amplifying sound signals, the amplifier configured to be electronically coupled to speakers mounted within the base and/or transverse member;
wherein the artificial intelligence is configured to control the speaker system and/or amplifier through voice commands provided by a user.

9. An artificial intelligence-enhanced furniture system as recited in claim 1, wherein the furniture assembly is a modular furniture assembly.

10. An artificial intelligence-enhanced furniture system as recited in claim 1, further comprising a speaker system positioned within the furniture assembly, wherein the speaker system comprises two front-facing speakers and two surround, upwardly-facing speakers, wherein the artificial intelligence is configured to control the speaker system through voice commands provided by a user.

11. An artificial intelligence-enhanced furniture system as recited in claim 10, wherein the furniture system further comprises a subwoofer speaker.

12. An artificial intelligence-enhanced furniture system as recited in claim 11, wherein the subwoofer speaker is mounted in the base of the furniture assembly and is pointed downward.

13. An artificial intelligence-enhanced furniture system as recited in claim 8, wherein the speaker system comprises at least one selectively dockable speaker.

14. An artificial intelligence-enhanced furniture system as recited in claim 13, wherein the at least one selectively dockable speaker is selectively dockable into a receptacle of the transverse member.

15. An artificial intelligence-enhanced furniture system as recited in claim 14, wherein the at least one selectively dockable speaker comprises electrical contacts and the receptacle of the transverse member comprises corresponding electrical contacts that make electrical contact with the dockable speaker when the dockable speaker is inserted into the receptacle of the transverse member.

16. An artificial intelligence-enhanced furniture system as recited in claim 15, wherein the at least one selectively dockable speaker is held in place by a friction fit or snap fit so as to not require a screwdriver or other tool to dock the dockable speaker into the receptacle.

17. An artificial intelligence-enhanced furniture system, comprising:
(i) a furniture assembly comprising: (A) a base; (B) at least one transverse member; and (C) a coupler for selectively coupling the base to the transverse member;
(ii) an electrical hub configured to selectively reside within the furniture assembly so that the electrical hub is hidden from view, the electrical hub comprising one or more electrical outlets; and
(iii) a speaker system comprising one or more speakers mounted within one or more portions of the furniture assembly, the electrical hub acting as a source of electrical power for the speaker system;
(iv) artificial intelligence positioned within the furniture assembly, wherein the artificial intelligence is configured to control the speaker system, the artificial intelligence comprising a command center positioned within the electrical hub so that:
(A) the command center is hidden from view;
(B) the command center is removably secured within the at least one transverse member of the furniture assembly; and
(C) the command center can be repositioned within the furniture assembly by rearranging the position of the at least one transverse member relative to the base.

18. An artificial intelligence-enhanced furniture system as recited in claim 17, wherein the artificial intelligence is configured to control the speaker system through a voice command provided by a user.

19. An artificial intelligence-enhanced furniture system comprising:
(i) a modular furniture assembly comprising a transverse member and a base;
(ii) a speaker system positioned within the furniture assembly such that the speaker system is hidden from view; and
(iii) artificial intelligence having a command center configured to receive a voice command and positioned within a cavity of a transverse member of the furniture assembly such that the command center is hidden from view, wherein:
the artificial intelligence is configured to control the speaker system, and
the command center is positioned within the furniture assembly so that:
(A) the command center is hidden from view; and
(B) the command center can be repositioned within the furniture assembly by rearranging the position of the transverse member relative to the base.

20. An artificial intelligence-enhanced furniture system as recited in claim 19, wherein the modular furniture assembly comprises a recliner assembly, wherein the artificial intelligence is configured to control the recliner assembly through a voice command provided by a user.

21. An artificial intelligence-enhanced furniture system as recited in claim 19, wherein the modular furniture assembly comprises a recliner assembly, wherein the artificial intelligence is configured to recall a learned setting for the recliner assembly for a given user.

22. An artificial intelligence-enhanced furniture system as recited in claim 19, wherein the artificial intelligence is configured to control a television or other component that is not part of the furniture assembly, through voice command.

* * * * *